(12) United States Patent
Otomo

(10) Patent No.: US 7,673,948 B2
(45) Date of Patent: Mar. 9, 2010

(54) HYDRAULIC BRAKE APPARATUS

(75) Inventor: Akihiro Otomo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 283 days.

(21) Appl. No.: 11/235,148

(22) Filed: Sep. 27, 2005

(65) Prior Publication Data

US 2006/0066146 A1 Mar. 30, 2006

(30) Foreign Application Priority Data

Sep. 30, 2004 (JP) ............................. 2004-285963
Sep. 9, 2005 (JP) ............................. 2005-262973

(51) Int. Cl.
*B60T 8/44* (2006.01)

(52) U.S. Cl. .............. 303/114.1; 303/113.2; 303/113.3; 303/116.1; 303/116.2; 303/119.1; 188/358

(58) Field of Classification Search .............. 303/114.1, 303/116.1, 116.2, 119.1, 113.2, 113.3, 122.12; 188/358

See application file for complete search history.

(56) References Cited

U.S. PATENT DOCUMENTS

| 3,659,905 | A | * | 5/1972 | Goulish | .................. | 303/122.13 |
| 4,395,072 | A | | 7/1983 | Belart | | |
| 4,578,951 | A | | 4/1986 | Belart et al. | | |
| 4,892,364 | A | | 1/1990 | Burgdorf | | |
| 5,568,962 | A | * | 10/1996 | Enomoto et al. | ................ | 303/3 |
| 6,095,622 | A | * | 8/2000 | Oishi et al. | .............. | 303/113.5 |
| 6,149,247 | A | * | 11/2000 | Hofmann et al. | ......... | 303/113.4 |
| 6,315,369 | B1 | * | 11/2001 | Hirose | .......................... | 303/10 |
| 6,322,164 | B1 | | 11/2001 | Sakamoto et al. | | |
| 6,354,672 | B1 | * | 3/2002 | Nakamura et al. | ....... | 303/113.1 |
| 6,733,090 | B2 | * | 5/2004 | Pasterkamp et al. | ...... | 303/114.1 |

(Continued)

FOREIGN PATENT DOCUMENTS

EP 0 928 730 A1 7/1999

(Continued)

*Primary Examiner*—Robert A Siconolfi
*Assistant Examiner*—Mariano Sy
(74) *Attorney, Agent, or Firm*—Oliff & Berridge, PLC

(57) ABSTRACT

A hydraulic brake apparatus for use in a vehicle having wheels and a brake operating member manually operable by a driver, the apparatus including a manual pressure source including (a) a hydraulic booster which boosts an operating source applied by the driver to the brake operating member and produces a first hydraulic pressure corresponding to the boosted operating force, and (b) a master cylinder which produces a second hydraulic pressure corresponding to the boosted operating force as an output of the hydraulic booster; a power pressure source which produces, by utilizing a power, a third hydraulic pressure irrespective of whether the brake operating member is operated; hydraulic brakes which are provided in association with the wheels, respectively, and include respective brake cylinders, and each of which, upon supplying of a hydraulic pressure to a corresponding one of the brake cylinders, applies a hydraulic braking force to a corresponding one of the wheels; a hub portion which is connected to each of the brake cylinders and to which the hydraulic booster, the master cylinder, and the power pressure source are connected in parallel; and a pressure source communication control device which selectively allows at least one of the hydraulic booster, the master cylinder, and the power pressure source to communicate with the hub portion.

43 Claims, 22 Drawing Sheets

U.S. PATENT DOCUMENTS

| | | | |
|---|---|---|---|
| 7,014,277 B2 * | 3/2006 | Soga | 303/122 |
| 7,052,094 B2 * | 5/2006 | Ganzel | 303/114.1 |
| 7,150,508 B2 * | 12/2006 | Ganzel | 303/113.4 |

FOREIGN PATENT DOCUMENTS

| | | |
|---|---|---|
| JP | A-10-315946 | 12/1998 |
| JP | A-11-180294 | 7/1999 |
| JP | A-2000-177550 | 6/2000 |
| JP | A-2001-106056 | 4/2001 |

\* cited by examiner

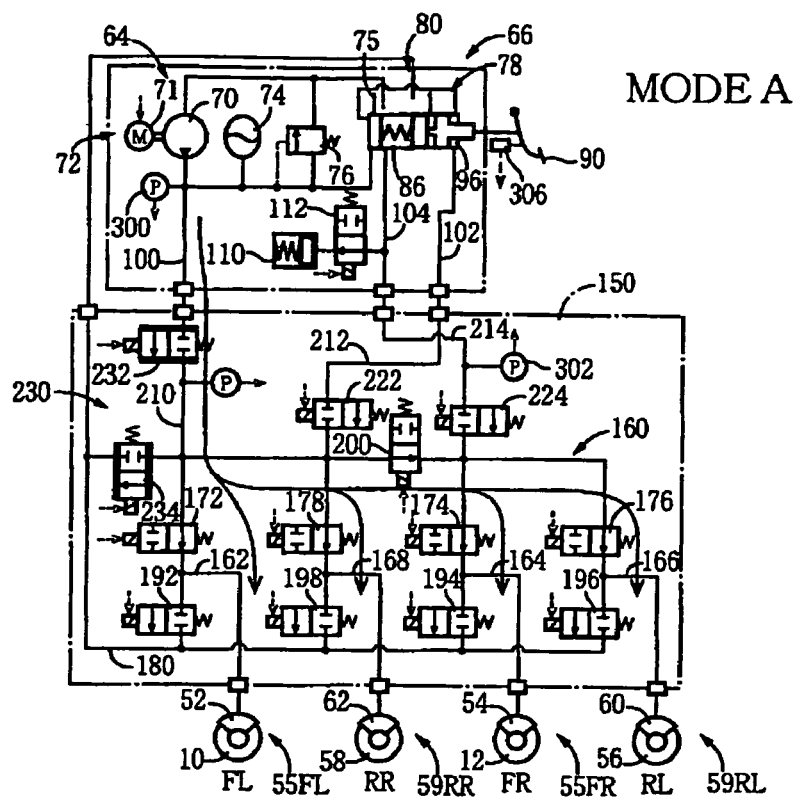
FIG.5 MODE A
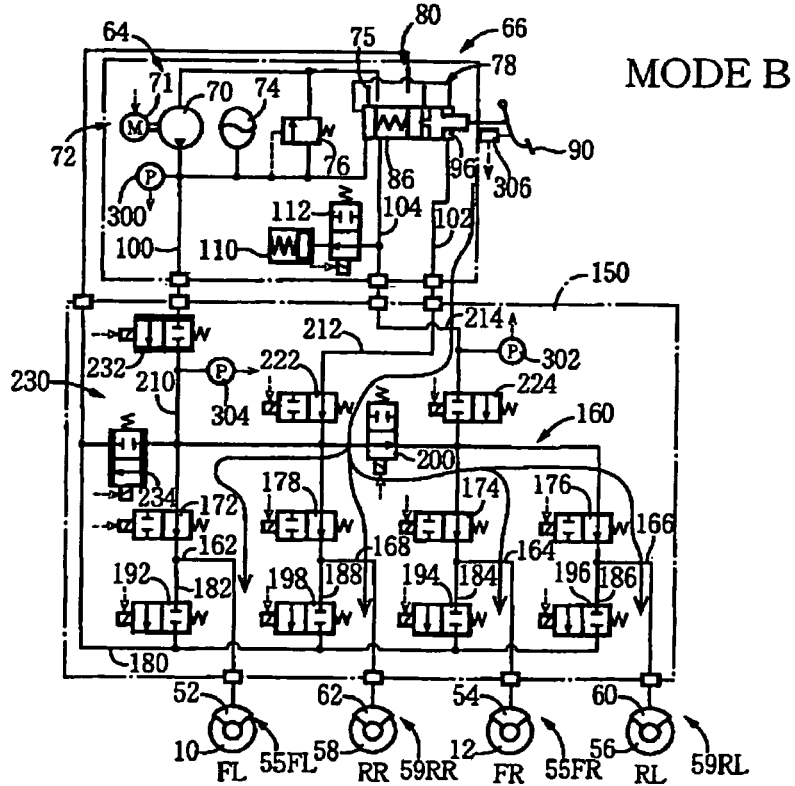
FIG.6 MODE B

MODE C

MODE D

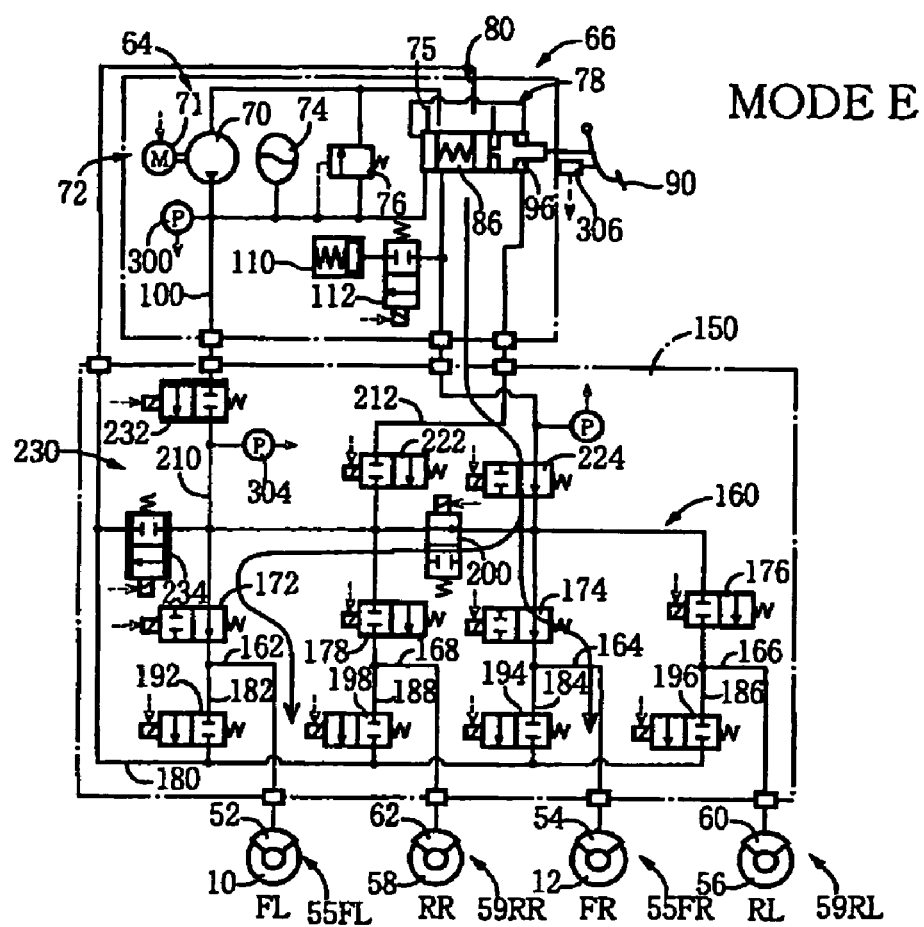
FIG.9   MODE E

FIG.10

| | MODE A | MODE B | MODE C | MODE D | MODE E |
|---|---|---|---|---|---|
| CYLINDER COMMUNICATION CONTROL VALVE 224 | Shut | Shut | Open | Open | Open |
| BOOSTER COMMUNICATION CONTROL VALVE 222 | Shut | Open | Open | Shut | Shut |
| SIMULATOR CONTROL VALVE 112 | Open | Open | Shut | Shut | Shut |
| SEPARATING VALVE 200 | Open | Open | Shut | Shut | Open |
| LINEAR CONTROL VALVE DEVICE 230 | CONTROLLED | NOT CONTROLLED | NOT CONTROLLED | CONTROLLED | NOT CONTROLLED |
| PRESSURE-INCREASE CONTROL VALVES 172,174,176,178 | Open | Open | Open | Open | Open/Shut* |
| PRESSURE-DECREASE CONTROL VALVES 192,194,196,198 | Shut | Shut | Shut | Shut | Shut |
| CONTROL MANNER | CONTROLLED PRESSURE SUPPLIED TO FOUR WHEELS | BOOSTER PRESSURE SUPPLIED TO FOUR WHEELS | CYLINDER PRESSURE SUPPLIED TO TWO WHEELS AND BOOSTER PRESSURE SUPPLIED TO TWO WHEELS | CYLINDER PRESSURE SUPPLIED TO TWO WHEELS AND CONTROLLED PRESSURE SUPPLIED TO TWO WHEELS | CYLINDER PRESSURE SUPPLIED TO TWO FRONT WHEELS ONLY |

*PRESSURE-INCREASE CONTROL VALVES 172,174 CORRESPONDING TO FRONT WHEELS 10,12 ARE OPEN AND PRESSURE-INCREASE CONTROL VALVES 176,178 CORRESPONDING TO REAR WHEELS 56,58 ARE SHUT

FIG.18

| | MODE F | MODE G | MODE H | MODE I | MODE J |
|---|---|---|---|---|---|
| CYLINDER COMMUNICATION CONTROL VALVE 224 | Shut | Shut | Open | Open | Open |
| BOOSTER COMMUNICATION CONTROL VALVE 222 | Shut | Open | Open | Shut | Shut |
| SIMULATOR CONTROL VALVE 112 | Open | Open | Shut | Shut | Shut |
| SEPARATING VALVE 200 | Open | Open | Shut | Shut | Open |
| LINEAR CONTROL VALVE DEVICE 230 | CONTROLLED | NOT CONTROLLED | NOT CONTROLLED | CONTROLLED | NOT CONTROLLED |
| PRESSURE-INCREASE CONTROL VALVES 172,174,176,178 | Open (CONTROLLED) | Open (CONTROLLED) | Open | Open | Open |
| PRESSURE-DECREASE CONTROL VALVES 192,194,196,198 | Shut (CONTROLLED) | Shut (CONTROLLED) | Shut | Shut | Shut |
| CONTROL MANNER | CONTROLLED PRESSURE SUPPLIED TO FOUR WHEELS | BOOSTER PRESSURE SUPPLIED TO FOUR WHEELS | CYLINDER PRESSURE SUPPLIED TO TWO WHEELS AND BOOSTER PRESSURE SUPPLIED TO TWO WHEELS | CYLINDER PRESSURE SUPPLIED TO TWO WHEELS AND CONTROLLED PRESSURE SUPPLIED TO TWO WHEELS | CYLINDER PRESSURE SUPPLIED TO FOUR WHEELS |

FIG.19 MODE F
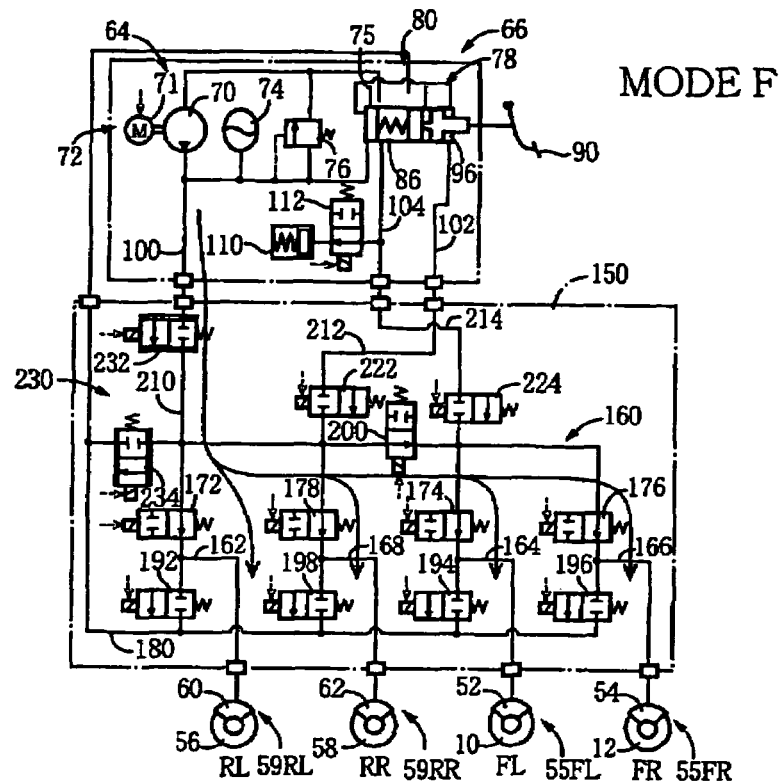
FIG.20 MODE G
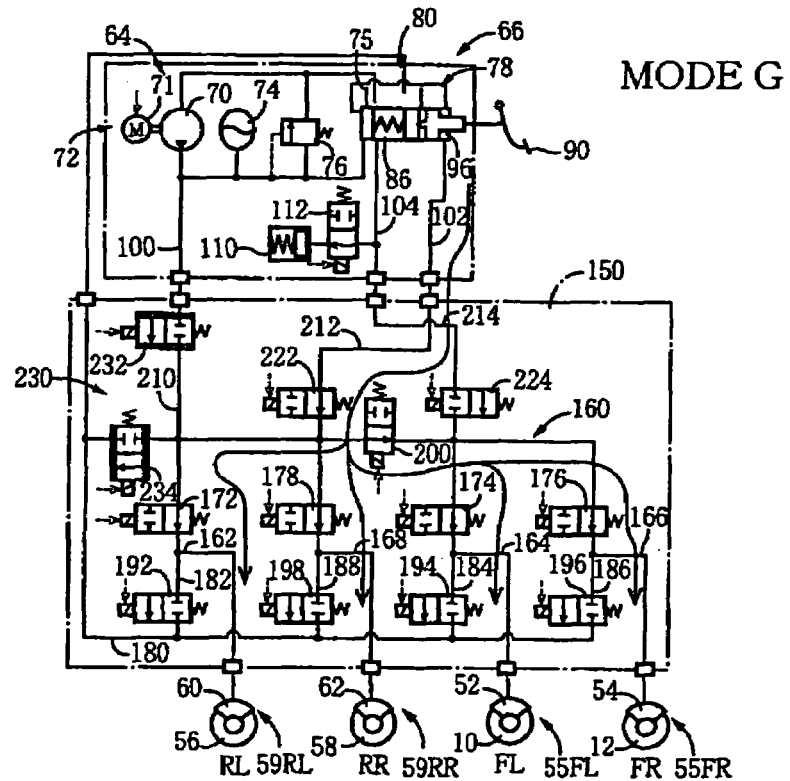

MODE H

MODE I

FIG.23 MODE J

HYDRAULIC BRAKE APPARATUS

The present application is based on Japanese Patent Application No. 2004-285963 filed on Sep. 30, 2004 and Japanese Patent Application No. 2005-262973 filed on Sep. 9, 2005, the contents of which are incorporated herein by reference.

BACKGROUND OF THE INVENTION

1. Field of the Invention

The present invention relates to a hydraulic brake apparatus including a hydraulic booster, a master cylinder, a power hydraulic-pressure source, and a plurality of brake cylinders.

2. Discussion of Related Art

Each of Patent Document 1 (Japanese Patent No. 3,396,694), Patent Document 2 (Japanese Patent Application Publication No. 2000-177,550), Patent Document 3 (Japanese Patent Application Publication No. 10-315,946), and Patent Document 4 (Japanese Patent Application Publication No. 11-180,294) discloses a hydraulic brake apparatus including, in addition to a hydraulic booster, a master cylinder, a power hydraulic-pressure source, and a plurality of brake cylinders, a main passage to which all the brake cylinders are connected.

In particular, the hydraulic brake apparatus disclosed by Patent Document 1 is constructed such that the power pressure source is connected to the main passage but the hydraulic booster or the master cylinder is not connected to the main passage. The hydraulic brake apparatus disclosed by Patent Document 2 is constructed such that the master cylinder and the power pressure source are connected to the main passage but the hydraulic booster is connected to a branch passage connected to a connection passage via which the power pressure source is connected to the main passage. The hydraulic brake apparatus disclosed by Patent Document 3 or 4 is constructed such that the hydraulic booster that utilizes the hydraulic pressure produced by the power pressure source, is connected to the main passage but the power pressure source or the master cylinder is not connected to the main passage.

SUMMARY OF THE INVENTION

It is therefore an object of the present invention to provide a hydraulic brake apparatus that selectively allows at least one of a hydraulic booster, a master cylinder, and a power hydraulic-pressure source to communicate with a plurality of brake cylinders, and thereby enjoys improved controllability.

Hereinafter, some examples of various modes of the present invention that are recognized as being claimable in the present application hereinafter, referred to as the claimable modes, where appropriate) will be described and explained. The claimable modes include at least respective modes corresponding to the appended claims, but may additionally include broader or narrower modes of the present invention or even one or more different inventions than the claimed inventions. Each of the following modes (1) through (35) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith and but also the detailed description of the preferred embodiments of the invention, and that in additional claimable modes, one or more elements or one or more technical features may be added to, or deleted from, any of the allowing modes.

(1) A hydraulic brake apparatus for use in a vehicle having a plurality of wheels and a brake operating member manually operable by a driver of the vehicle, the apparatus comprising:

a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;

a power pressure source which produces, by utilizing a power, a third hydraulic pressure irrespective of whether the brake operating member is operated by the driver;

a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion which is connected to each of the respective brake cylinders of the hydraulic brakes and to which the hydraulic booster, the master cylinder, and the power pressure source are connected in parallel with each other; and a pressure-source communication control device which selectively allows at least one of the hydraulic booster, the master cylinder, and the power pressure source to communicate with the hub portion.

In the hydraulic brake apparatus in accordance with the mode (1), the hub portion is connected to the plurality of brake cylinders, and the three pressure sources, i.e., the hydraulic booster, the master cylinder, and the power pressure source are connected, in parallel, to the hub portion. Since the hydraulic booster, the master cylinder, and the power pressure source are connected in parallel with each other, at least one of the three pressure sources can be selectively communicated with the hub portion, and accordingly can be selectively communicated with at least one of the brake cylinders. Thus, in the present hydraulic brake apparatus, the hub portion is connected to not only the plurality of brake cylinders but also the plurality of pressure sources, and the plurality of pressure sources are connected in parallel with each other to the hub portion. Therefore, the present apparatus can enjoy a simplified construction and an improved controllability. The power pressure source may be one that utilizes a non-human power, such as an electric power.

In addition, in the present hydraulic brake apparatus, all the brake cylinders of the vehicle can be connected to the hub portion. In this case, each of the brake cylinders can be selectively communicated with at least one of the hydraulic booster, the master cylinder, and the power pressure source.

In the present hydraulic brake apparatus, the power pressure source can produce a high pressure, i.e., a hydraulic pressure that can hydraulically operate the plurality of brake cylinders.

The hydraulic booster may be one that boosts the operating force applied to the brake operating member (e.g., a brake pedal), by utilizing the hydraulic pressure produced by the power pressure source that is connected in parallel with the booster and the master cylinder, or one that boosts the operating force by utilizing a hydraulic pressure produced by another power pressure source than the power pressure source connected to the hub portion.

(2) The hydraulic brake apparatus according to the mode (1), wherein the pressure-source communication control device comprises a mechanical booster-and-cylinder communication portion which mechanically shuts off the power pressure source from the hub portion and mechanically allows each of the hydraulic booster and the master cylinder to communicate with the hub portion.

The pressure-source communication control device can mechanically allow each of the hydraulic booster and the master cylinder to communicate with the hub portion. In this case, the brake cylinders are supplied with the hydraulic pressure from the two pressure sources, i.e., the hydraulic booster and the master cylinder, so that the hydraulic brakes may be operated.

For example, the pressure-source communication control device may include three solenoid-operated communication control valves each of which is provided between the hub portion and a corresponding one of the hydraulic booster, the master cylinder, and the power pressure source, and each of which is opened and closed by controlling an electric current supplied to a solenoid thereof In this case, each of the solenoid-operated communication control valve provided between the hub portion and the hydraulic booster (that can be called "the booster communication control valve"), and the solenoid-operated communication control valve provided between the hub portion and the master cylinder (that can be called "the cylinder communication control valve") may be of a normally open type, and the solenoid-operated communication control valve provided between the hub portion and the power pressure source (that can be called "the power-pressure-source communication control valve") may be of a normally closed type. When no electric currents are supplied to the respective solenoids of the three solenoid-operated communication control valves, those communication control valves mechanically allow the hydraulic booster and the master cylinder to communicate with the hub portion, and mechanically shut off the power pressure source from the hub portion. Meanwhile, the power-pressure-source communication control valve may be one that can function as a hydraulic-pressure control valve that controls a hydraulic pressure produced or outputted by the power pressure source.

In addition, when i.e., immediately after) an ignition switch of the vehicle is switched from an OFF state to an ON state, the pressure-source communication control device can mechanically allow the hydraulic booster and the master cylinder to communicate with the hub portion, and mechanically shut off the power pressure source from the hub portion. In this state, an initial checking operation may be performed. During the initial checking operation, it is possible to check at least one of an electric system of the present hydraulic brake apparatus as a whole; the power pressure source shut off from the hub portion {e.g., a pump motor, a hydraulic-pressure control valve device that can electrically control the hydraulic pressure as the output of the power pressure source [this hydraulic-pressure control valve device is provided between the hub portion and the power pressure source, and is readable on a linear control valve device 230 (i.e., a pressure-increase linear control valve 232 and a pressure-decrease linear control valve 234) described in DETAILED DESCRIPTION OF PREFERRED EMBODIMENTS OF THE INVENTION], or a power-pressure sensor that detects the hydraulic pressure produced by the power pressure source}; and a computer that outputs commands to control respective hydraulic pressures in the plurality of brake cylinders.

(3) The hydraulic brake apparatus according to the mode (1) or the mode (2), wherein the pressure-source communication control device comprises a booster-and/or-cylinder communication portion which, when the hydraulic brake apparatus has filed, shuts off at least the power pressure source from the hub portion and allows at least one of the hydraulic booster and the master cylinder to communicate with the hub portion.

When the present hydraulic brake apparatus has failed (irrespective of which sort of failure has occurred, or when a predetermined sort of failure has been detected), at least one of the hydraulic booster and the master cylinder is communicated with the hub portion, so that at least one of the hydraulic booster and the master cylinder may operate the hydraulic brakes. The power pressure source may be shut off from the hub portion, while the hydraulic booster and the master cylinder are communicated with the hub portion; the power pressure source and the master cylinder may be shut off from the hub portion, while the hydraulic booster is communicated with the hub portion; or the power pressure source and the hydraulic booster may be shut off from the hub portion, while the master cylinder is communicated with the hub portion.

The pressure-source communication control device may include a normal-state-related power-pressure-source communication portion that, when the present hydraulic brake apparatus is in a normal state, shuts off the hydraulic booster and the master cylinder from the hub portion and allows the power pressure source to communicate with the hub portion. When the present hydraulic brake apparatus is normal, it is preferred that the hydraulic pressure produced by the power pressure source be utilized to control the brake-cylinder hydraulic pressures to a value that produces a required hydraulic braking force corresponding to a current condition of the vehicle.

Since at least one of the hydraulic booster and the master cylinder is communicated with the hub portion, an amount of energy needed to operate the hydraulic brakes can be reduced, and a reliability of the present hydraulic brake apparatus can be improved.

(4) The hydraulic brake apparatus according to any of the modes (1) through (3), wherein the pressure-source communication control device comprises a failure-related booster-and/or-cylinder communication portion which, when the hydraulic pressure in at least one of the brake cylinders is not electrically controllable, shuts off at least the power pressure source from the hub portion and allows at least one of the hydraulic booster and the master cylinder to communicate with the hub portion.

For example, in the case where the power pressure source includes an output-pressure control device that can electrically control the hydraulic pressure as the output of the power pressure source, so that the controlled hydraulic pressure is supplied to the brake cylinders, it can be said that the respective hydraulic pressures in the brake cylinders are electrically controlled. Meanwhile, in the case where one or more independent hydraulic-pressure control devices are provided between the power pressure source and the brake cylinders (for example, a plurality of individual hydraulic-pressure control devices each of which can control the hydraulic pressure in at least one of the brake cylinders are provided), the hydraulic-pressure control devices control by utilizing the hydraulic pressure produced by the power pressure source, the respective hydraulic pressures in the brake cylinders. In this case, too, it can be said that the respective hydraulic pressures in the brake cylinders are electrically controlled.

In each of the above-indicated cases, when the output-pressure control device or the hydraulic-pressure control devices (this device or these devices can be said as the "control system") has or have ailed, at least one of the hydraulic booster and the master cylinder is communicated with the hub portion, so that the hydraulic pressure corresponding to the brake operating force (i.e., the operating force applied to the brake operating member) may be supplied to the brake cylinders.

As will be described later, when the power pressure source has failed to output the high pressure (this failure can be said as the "power system's failure"), at least one of the hydraulic booster and the master cylinder may be communicated with the hub portion.

(5) The hydraulic brake apparatus according to any of the modes (1) through (4), wherein the pressure-source communication control device comprises a non-control-related booster-and/or-cylinder communication portion which, when the respective hydraulic pressures in the brake cylinders are not electrically controlled, shuts off at least the power pressure source from the hub portion and allows at least one of the hydraulic booster and the master cylinder to communicate with the hub portion.

(6) The hydraulic brake apparatus according to any of the modes (1) through (5), wherein the pressure-source communication control device comprises a stopped-state-related booster-and/or-cylinder communication portion which, when the vehicle is in a stopped state, shuts off at least the power pressure source from the hub portion and allows at least one of the hydraulic booster and the master cylinder to communicate with the hub portion.

When the respective hydraulic pressures in the brake cylinders are not electrically controlled, i.e., when the hydraulic pressure produced by the manual pressure source is directly supplied to the brake cylinders, at least one of the hydraulic booster and the master cylinder is communicated with the hub portion.

When the vehicle is in the stopped state, it is not necessarily required that the respective hydraulic pressures in the brake cylinders be minutely or finely controlled by utilizing the hydraulic pressure produced by the power pressure source. In addition, in view of reduction of energy consumption, it is preferred not to use the hydraulic pressure of the power pressure source. Hence, when the vehicle is in the stopped state, the brake-cylinder hydraulic pressures are not controlled by utilizing the hydraulic pressure of the power pressure source, but the brake cylinders are communicated with at least one of the hydraulic booster and the master cylinder.

(7) The hydraulic brake apparatus according to any of the modes (1) through (6), wherein the pressure-source communication control device comprises a failure-related cylinder communication portion which, when the power pressure source has failed to produce the third hydraulic pressure, shuts off the hydraulic booster and the power pressure source from the hub portion and allows the master cylinder to communicate with the hub portion.

The power pressure source may be one including a device that can produce a high hydraulic pressure i.e., a hydraulic-pressure producing device; e.g., a pump device), or one including not only a hydraulic-pressure producing device (e.g., a pump device), but also a device or portion (e.g., an accumulator) that can accumulate or store a hydraulic liquid in a state in which the hydraulic liquid is pressurized. Those devices can be said as the "power system". When the power system has failed, the power pressure source fails to produce the high hydraulic pressure.

In the case where the hydraulic booster boosts the brake operating force by utilizing the hydraulic pressure produced by the power pressure source, if the power pressure source cannot produce the high hydraulic pressure, then the hydraulic booster cannot boost the brake operating force. In this case, it is preferred that the hydraulic booster be shut off from the hub portion and the master cylinder be communicated with the hub portion.

However, even if the pump device may fail the hydraulic booster can continue boosting the brake operating force, so long as some hydraulic liquid remains in the accumulator. In this case, it is advantageous to allow the hydraulic booster to communicate with the hub portion.

In the state in which the master cylinder is communicated with the hub portion, if the driver operates the brake operating member, the master cylinder produces the hydraulic pressure corresponding to the brake operating force, so that the produced hydraulic pressure is supplied to the brake cylinders. Thus, the vehicle can be stopped with improved reliability.

In addition, for example, when a frictional coefficient, $\mu$, of a road surface on which the vehicle is running or moving is low, and one or more wheels of the vehicle is or are brought into a blocked (locked) state, a certain braking force can be applied to the remaining wheel or wheels. For instance, when front non-drive wheels of a rear-drive vehicle are brought into a blocked state, a braking force can be applied against a creep torque exerted to rear drive wheels of the vehicle, if the rear wheels are not in the blocked state. Thus, an amount of movement of the vehicle can be reduced.

(8) The hydraulic brake apparatus according to any of the modes (1) through (7), the pressure-source communication control device comprises a cylinder-and/or-power-pressure-source communication portion which, when the hydraulic booster has mechanically failed, shuts off at least the hydraulic booster from the hub portion and allows at least one of the master cylinder and the power pressure source to communicate with the hub portion.

When the hydraulic booster has mechanically failed, the hydraulic booster and the master cylinder may be shut off from the hub portion, while the power pressure source is communicated with the hub portion; the hydraulic booster and the power pressure source may be shut off from the hub portion, while the master cylinder is communicated with the hub portion; or the hydraulic booster may be shut off from the hub portion, while the master cylinder and the power pressure source are communicated with the hub portion.

(9) The hydraulic brake apparatus according to any of the modes (1) through (8), further comprising:

a communication device which receives information sent from an external device; and an information-dependent hydraulic-pressure control device which controls, based on the information received by the communication device, the hydraulic pressure in each of the brake cylinders by utilizing the third hydraulic pressure produced by the power pressure source, wherein the pressure-source communication control device comprises a booster-and/or-power-pressure-source communication portion which, when the communication device has failed to normally receive the information, shuts off at least the master cylinder from the hub portion and allows at least one of the hydraulic booster and the power pressure source to communicate with the hub portion.

When the communication device has failed to normally receive information, the hydraulic booster and the master cylinder may be shut off from the hub portion, while the power pressure source is communicated with the hub portion; or the master cylinder and the power pressure source may be shut off from the hub portion, while the hydraulic booster is communicated with the hub portion.

When the communication device can normally receive information, the respective hydraulic pressures in the brake cylinders can be electrically controlled based on the information received by the communication device, by utilizing the hydraulic pressure produced by the power pressure source. In contrast, when the communication device has failed, for example, when an amount of the received information is excessively large, or information to be received is not received, the brake-cylinder hydraulic pressures cannot be appropriately controlled based on the information.

In this case, it is appropriate to shut off the power pressure source from the hub portion and allow the hydraulic booster to communicate with the hub portion, because the brake-cylinder hydraulic pressures can be controlled to a value corresponding to the brake operating force. In addition, as compared with the case where the master cylinder is communicated with the hub portion, an increasing amount of the operating stroke of the brake operating member can be reduced.

Alternatively, the brake-cylinder hydraulic pressures can be controlled by utilizing the hydraulic pressure of the power pressure source, without using the information received by the communication device. For example, the brake-cylinder hydraulic pressures can be controlled to a value corresponding to the required hydraulic pressure.

(10) The hydraulic brake apparatus according to any of the modes (1) through (9), wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel, wherein the hydraulic brake apparatus further comprises:

a communication device which receives, from the regenerative-braking-force control device, information representing an actual regenerative braking force applied to said at least one drive wheel; and a regeneration cooperative control device which controls, based on the actual regenerative braking force represented by the information received by the communication device, the hydraulic pressure in at least one of the brake cylinders that corresponds to said at least one drive wheel, so that a total braking force including the regenerative bring force and the hydraulic braking force that are applied to said at least one drive wheel may be equal to a required braking force corresponding to a current operation state of the brake operating member, and wherein the pressure-source communication control device comprises a failure-related booster-and/or-power-pressure-source communication portion which, when the regenerative-braking-force control device has failed, shuts off at least the master cylinder from the hub portion and allows at least one of the hydraulic booster and the power pressure source to communicate with the hub portion.

When the regenerative-braking-force control device has failed, or when the above-described communication device has failed, it is common to end the regeneration cooperative control, so that the regenerative braking force may be zeroed and only the hydraulic braking force may meet the required braking force. In this case, a transitional control may be performed to restrain an abrupt change of the braking force from that in the regeneration cooperative control to that in the hydraulic-pressure control. According to the transitional control the regenerative braking force may be continuously or stepwise lowered, while the hydraulic braking force is continuously or stepwise raised. In this case, it is preferred that the brake-cylinder hydraulic pressures be controlled by utilizing the hydraulic pressure of the power pressure source.

(11) The hydraulic brake apparatus according to any of the modes (1) through (10), wherein the pressure-source communication control device comprises a booster-and-lower-pressure-source communication portion which, when a quick response of the hydraulic brakes is being required, shuts off the master cylinder from the hub portion and allows each of the hydraulic booster and the power pressure source to communicate with the hub portion.

When the quick response of the present hydraulic brake apparatus is needed, both the hydraulic booster and the power pressure source are communicated with the hub portion, so that a larger amount of hydraulic liquid may flow into the brake cylinders. Thus, the brake-cylinder hydraulic pressures can be quickly increased. In addition, since the two pressure sources are communicated with the hub portion, the pressure-increase gradient in the brake cylinders can be increased irrespective of constructional restrains of the present hydraulic brake apparatus (e.g., a diameter of an outlet port of a hydraulic-pressure control valve that can control the output hydraulic pressure of the power pressure source), or restrains with respect to the speed of response of the above-described control system of the present apparatus.

For example, when the gradient of increasing of the required braking force corresponding to the operation state of the brake operating member being operated by the driver is significantly high, when a deviation obtained by subtracting an actual braking force from the required braking force is not smaller than a reference value, or when it is judged, based on the running condition of the vehicle, that the braking force needs to be quickly increased (e.g., when a vehicular distance between the present vehicle and another vehicle running in front thereof is significantly small, or when an approaching speed of the present vehicle is significantly high), it may be judged that the quick response is needed.

When the quick response is needed, the hydraulic booster may be shut off from the hub portion, while the master cylinder and the power pressure source are communicated with the hub portion. For example, in the case where one or more of the brake cylinders is or are communicated with the master cylinder and the remaining brake cylinder or cylinders is or are communicated with the power pressure source, the number of the brake cylinder or cylinders communicated with the master cylinder or the power pressure source can be reduced. Thus, as compared with the case where all the brake cylinders are communicated with the master cylinder or the power pressure source, a larger amount of hydraulic liquid can be supplied to each one of the brake cylinders.

(12) The hydraulic brake apparatus according to any of the modes (1) through (11), wherein the pressure-source communication control device comprises an anti-block-control-related booster communication portion which, when an anti-block control is being performed, shuts off the master cylinder and the power pressure source from the hub portion and allows the hydraulic booster to communicate with the hub portion.

When the anti-block (anti-lock) control is being performed, the brake-cylinder hydraulic pressures are controlled by utilizing the hydraulic pressure produced by the hydraulic booster.

When the anti-block control is being performed, it is possible to control the brake-cylinder hydraulic pressures by utilizing the hydraulic pressure produced by the power pressure source. However, when the anti-block control is being performed, the brake operating member is being operated by the driver, and it is desirable to utilize the hydraulic pressure corresponding to the current operation state of the brake operating member. If the hydraulic pressure of the hydraulic booster is utilized, the consumption of energy can be reduced as such, while the hydraulic pressure corresponding to the operation state of the brake operating member is utilized. Meanwhile, when the anti-block control is being performed, no hydraulic pressures higher than the pressure corresponding to the operation state of the brake operating member are needed. From all of those reasons, it is appropriate to utilize the hydraulic pressure produced by the hydraulic booster.

(13) The hydraulic brake apparatus according to any of the modes (1) through (12), wherein the pressure-source communication control device comprises an air-detection-related booster communication portion which, when an air has been detected, shuts off the master cylinder and the power pressure source from the hub portion and allows the hydraulic booster to communicate with the hub portions.

When air has been detected, or when it is estimated that an amount of consumption of the hydraulic liquid would be large, the hydraulic booster is communicated with the hub portion. In this case, as compared with the case where the power pressure source is communicated with the hub portion, an amount of consumption of energy can be reduced, and an increased amount of hydraulic liquid can be supplied to the brake cylinders. In addition, as compared with the case where the master cylinder is communicated with the hub portion, the increasing amount of the operating stroke of the brake operating member can be reduced.

(14) The hydraulic brake apparatus according to any of the modes (1) through (13), wherein the pressure-source communication control device comprises a traction-control-related power-pressure-source communication portion which, when a traction control is being performed, allows each of (a) at least one of the hydraulic booster and the master cylinder, and (b) the power pressure source to communicate with the hub portion.

The traction control is for controlling drive wheels of the vehicle. Therefore, the brake cylinders corresponding to the drive wheels are communicated with the power pressure source, so that the respective hydraulic pressures in those brake cylinders are controlled by utilizing the hydraulic pressure of the power pressure source. On the other hand, the brake cylinders corresponding to non-drive wheels of the vehicle are shut off from the brake cylinders corresponding to the drive wheels, and are communicated with at least one of the hydraulic booster and the master cylinder. Thus, if the brake operating member is operated during the traction control a hydraulic pressure can be quickly supplied to the brake cylinders corresponding to the non-drive wheels, so that a hydraulic braking force may be applied to the non-drive wheels.

(15) The hydraulic brake apparatus according to any of the modes (1) through (14), further comprising at least one of (a) an operation-state detecting device which detects a value representing an operation state of the brake operating member, (b) a cylinder-pressure sensor which detects a value representing the second hydraulic pressure produced by the master cylinder, and (c) a power pressure sensor which detects a value representing the third hydraulic pressure produced by the power pressure source, and wherein the pressure-source communication control device comprises a failure detecting portion which detects a failure of the hydraulic brake apparatus based on the value detected by said at least one of (a) the operation-state detecting device, (b) the cylinder-pressure sensor, and (c) the power-pressure sensor.

For example, when the power pressure is not higher than a reference value, it can be judged that the power pressure source has failed, e.g., the power system has failed.

In addition, when the power pressure is higher than the reference value but the hydraulic pressure produced by the master cylinder is lower, when the brake operating member takes a certain operation state, than a reference value corresponding to the certain operation state, it can be judged that the hydraulic booster has mechanically failed.

Moreover, in the case where a plurality of brake-cylinder-pressure sensors that detect the respective hydraulic pressures in the brake cylinders are employed, a failure of the control system can be detected. For example, when the power system is normal but one or more of the brake-cylinder hydraulic pressures detected by those sensors is or are deviated from a target pressure by more than a reference value, it can be judged that the control system has failed. The brake-cylinder hydraulic pressure detected by each of those sensors can be used to judge whether air is present in a hydraulic system connected to the brake cylinder corresponding to the each sensor.

(16) The hydraulic brake apparatus according to any of the modes (1) through (15), further comprising:

a plurality of individual pressure control valve devices each of which controls the hydraulic pressure in at least one of the brake cylinders that corresponds to said each individual pressure control valve device; and a brake-cylinder communication control device which selectively controls at least one of the individual pressure control valve devices so as to allow at least one of the brake cylinders that corresponds to said at least one individual pressure control valve device, to communicate with the hub portion.

One or more brake cylinders is or are selectively communicated with the hub portion, by controlling one or more individual pressure control valve devices. That is, one or more brake cylinders is or are selectively communicated with at least one of the hydraulic booster, the master cylinder, and the power pressure source. Thus, a specific combination of at least one brake cylinder and at least one pressure source that are communicated with each other can be selected. One individual pressure control valve device may be associated with one brake cylinder, or two brake cylinders. In the latter case, one individual pressure control valve device can control the respective hydraulic pressures in the two brake cylinders corresponding to, e.g., rear left and right wheels of the vehicle.

(17) The hydraulic brake apparatus according to any of the modes (1) through (16), wherein the hub portion includes a first hub section and a second hub section, and a separating device which is provided between the first and second hub sections and which is selectively switchable to a first operation state thereof in which the separating device allows the first and second hub sections to communicate with each other, and a second operation state thereof in which the separating device shuts off the first and second hub sections from each other.

(18) The hydraulic brake apparatus according to the mode (17), wherein the brake cylinders include a first cylinder group including at least one first-group brake cylinder that is connected to the first hub section, and a second cylinder group including at least one second-group brake cylinder that is connected to the second hub section.

(19) The hydraulic brake apparatus according to the mode (17) or the mode (18), wherein two pressure sources of three pressure sources consisting of the hydraulic booster, the master cylinder, and the power pressure source are connected to the first hub section, and an other pressure source of the three pressure sources is connected to the second hub section.

The three pressure sources are connected in parallel to the hub portion. However, in the case where the hub portion is divided into two portions, i.e., the first and second hub sections, no all the three pressure sources are connected to one of the two hub portions, but the two pressure sources are connected to the first hub section while the other, one pressure source is connected to the second hub section.

Likewise, not all the brake cylinders are connected to one of the two hub sections, but the first-group brake cylinder or cylinders is or are connected to the first hub section while the second-group brake cylinder or cylinders is or are connected to the second hub section. Thus, in the state in which the first and second hub sections are shut off from each other by the separating device, the present hydraulic brake apparatus or circuit defines two hydraulic systems, i.e., constitutes a dual hydraulic system.

The first and second cylinder groups may include two pairs of diagonal wheels, respectively, or a pair of front wheels and a pair of rear wheels, respectively.

The separating device may be one including a solenoid-operated open/close valve that is opened and closed by controlling an electric current supplied to a solenoid thereof In this case, it is preferred that the solenoid-operated open/close valve be of a normally closed type in which the valve is kept closed while no electric current is supplied to the solenoid. Thus, when a failure that no electric current is supplied to the valve occurs, the first and second hub sections are shut off from each other by the separating device, so that the first and second hub sections are independent of each other and constitute the dual hydraulic system.

(20) The hydraulic brake apparatus according to any of the modes (17) through (19), further comprising:

a plurality of individual pressure control valve devices each of which controls the hydraulic pressure in at least one of the brake cylinders that corresponds to said each individual pressure control valve device; and a brake-cylinder communication control device which controls the separating device and controls at least one of the individual pressure control valve devices, so as to selectively allow at least one of the brake cylinders that corresponds to said at least one individual pressure control valve device, to communicate with said at least one of the hydraulic booster, the master cylinder, and the power pressure source.

One or more brake cylinders can be selectively communicated with the hub portion, by controlling one or more individual pressure control valve devices; and the first-group brake cylinder or cylinders can be communicated with the second hub section, or the second-group brake cylinder or cylinders can be communicated with the first hub section, by controlling the separating device. Therefore, in the state in which at least one of the three pressure sources is connected to the hub portion, at least one of the brake cylinders can be selectively communicated with the at least one pressure source, by controlling the corresponding individual pressure control valve device and the separating device.

(21) The hydraulic brake apparatus according to the mode (20), wherein the pressure-source communication control device comprises a one-pressure-source communication portion which shuts off the two pressure sources from the first hub section and allows the other pressure source to communicate with the second hub section, and wherein the brake-cylinder communication control device comprises a cross communication portion which switches the separating device to the first operation state thereof to allow the first and second hub sections to communicate with each other, and controls at least one of the individual pressure control valve devices that corresponds to said at least one first-group brake cylinder, to allow said at least one first-group brake cylinder to communicate with the first hub section, and thereby allow said at least one first-group brake cylinder to communicate with the other pressure source connected to the second hub portion.

When the separating device is in the second operation state thereof i.e., shuts off the first and second hub sections from each other, the first-group brake cylinder or cylinders can be communicated with at least one of the two pressure sources connected to the first hub section; and the second-group brake cylinder or cylinders can be communicated with the one pressure source connected to the second hub section. Thus, the combinations of the pressure source or sources and the brake cylinder or cylinders that can be communicated with each other are automatically determined.

On the other hand, when the separating device is in the first operation state thereof i.e., allows the first and second hub sections to communicate with each other, the first-group brake cylinder or cylinders can be communicated with the one press source connected to the second hub section, by controlling the corresponding individual pressure control valve device or devices.

Otherwise, the one pressure source may be shut off from the second hub section, while at least one of the two pressure sources is communicated with the first hub section. In this case, when the separating device allows the first and second hub sections to communicate with each other, the second-group brake cylinder or cylinders can be communicated with the at least one pressure source connected to the first hub section.

Thus, the controlling of the separating device and the individual pressure control valve devices leads to increasing the degree of freedom of the combinations of pressure source(s) and brake cylinder(s) that are communicated with each other.

(22) The hydraulic brake apparatus according to the mode (20) or the mode (21), wherein the brake cylinders include a first, a second, a third, and a fourth brake cylinder corresponding to a front left, a front right, a rear left, and a rear right wheel of the vehicle, respectively, wherein the first and fourth brake cylinders are connected to the first hub section, and the second and third brake cylinders are connected to the second hub section, wherein the pressure-source communication control device comprises a cylinder communication portion which shuts off the hydraulic booster and the power pressure source from the hub portion and allows the master cylinder to communicate with the hub portion, and wherein the brake-cylinder communication control device comprises a front-left-and-right-wheel-brake-cylinder communication portion which switches the separating device to the first operation state thereof to allow the first and second hub sections to communicate with each other, and controls the individual pressure control valve devices to shut off the third and fourth brake cylinders from the second and first hub sections, respectively, and allow the first and second brake cylinders to communicate with the first and second hub sections, respectively, and thereby shut off the third and fourth brake cylinders from the master cylinder and allow the first and second brake cylinders to communicate with the master cylinder.

In the hydraulic brake apparatus in accordance with the mode (22), the two brake cylinders corresponding to the front left and right wheels are communicated with the master cylinder. Thus, as compared with the case where the two brake cylinders corresponding to the rear left and right wheels are communicated with the master cylinder, a greater braking force can be obtained. In addition, as compared with the case where two brake cylinders corresponding to two diagonal wheels (e.g., the front left wheel and the rear right wheel or the front right wheel and the rear left wheel) are communicated with the master cylinder, a difference between a right-side braking force and a left-side brake force can be reduced.

(23) The hydraulic brake apparatus according to any of the modes (17) through (22), wherein the master cylinder is connected to one of the first hub section and the second hub section, and the hydraulic booster is connected to an other of the first and second hub sections.

In the hydraulic brake apparatus in accordance with the mode (23), two hydraulic systems can be used to supply the hydraulic pressure corresponding to the operating force applied to the brake operating member, e.g., when the control system has failed.

(24) The hydraulic brake apparatus according to any of the modes (17) through (23), wherein the hydraulic booster and the power pressure source are connected to the first hub section, and the master cylinder is connected to the second hub section.

In the hydraulic brake apparatus in accordance with the mode (24), at least one of the hydraulic booster and the power pressure source can be communicated with the first hub section.

(25) The hydraulic brake apparatus according to any of the modes (17) through (21), (23), and (24), wherein the brake cylinders include four brake cylinders consisting a first, a second, a third, and a fourth brake cylinder corresponding to a front left, a front right, a rear left, and a rear right wheel of the vehicle, respectively, wherein the first and second brake cylinders are connected to one of the first hub section and the second hub section, and the third and fourth brake cylinders are connected to an other of the first and second hub sections, wherein the pressure-source communication control device comprises a cylinder-and-power-pressure-source communication portion which allows the master cylinder and the power pressure source to communicate with different ones of the first and second hub sections, respectively, and wherein the hydraulic brake apparatus further comprises:

a shutting-off device which controls the separating device to the second operation state thereof to shut off the first and second hub sections from each other;

a power-pressure sensor which detects a value representing the third hydraulic pressure produced by the power pressure source; and a liquid-leakage detecting portion which detects, based on the value detected by the power-pressure sensor, whether a hydraulic liquid has leaked from at least one hydraulic system connected to the two brake cylinders connected to the power pressure source.

For example, when the hydraulic pressure detected by the power-pressure sensor has lowered by more than a reference amount, it can be judged that some hydraulic liquid has leaked from one hydraulic system associated with the two front or rear wheels that are communicated with the power pressure source.

In the case where the power pressure source includes a hydraulic-liquid pump, a drop of the hydraulic pressure caused by the leakage of the liquid can be more accurately detected in a non-operation state of the pump than in an operation state of the same. However, even if the pump may be in the operation state thereof, a leakage of the hydraulic liquid can be detected if an actual hydraulic pressure detected by the power-pressure sensor is lower by more than a reference amount than a standard power pressure that is estimated from an amount of the liquid outputted by the pump that corresponds to the operation state of the pump.

The brake cylinders corresponding to the two front or rear wheels that are not communicated with the power pressure source are communicated with the master cylinder. Thus, those bake cylinders can be supplied with the hydraulic pressure corresponding to the operation state of the brake operating member.

The leakage of the hydraulic liquid may be detected with respect to either the hydraulic system corresponding to the front wheels, or the hydraulic system corresponding to the rear wheels.

(26) The hydraulic brake apparatus according to any of the modes (17) through (21) and (23) through (25), wherein the brake cylinders include two drive-wheel brake cylinders corresponding to two drive wheels of the vehicle, respectively, and two non-drive-wheel brake cylinders corresponding to two non-drive wheels of the vehicle, respectively, wherein the drive-wheel brake cylinders are connected to the first hub section and the non-drive-wheel brake cylinders are connected to the second hub section, wherein the pressure-source communication control device comprises a traction-control-related cylinder-and-power-pressure-source communication portion which, when a traction control is being performed, allows the power pressure source to communicate with the first hub section and allows the master cylinder to communicate with the second hub section.

When the traction control is being performed, the respective hydraulic pressures in the brake cylinders corresponding to the drive wheels are controlled by utilizing the hydraulic pressure produced by the power pressure source, while the brake cylinders corresponding to the non-drive wheels are communicated with the master cylinder. The brake cylinders corresponding to the drive wheels and the brake cylinders corresponding to the non-drive wheels, that is, the first and second hub sections are shut off from each other by the separating device. Therefore, if the brake operating member is operated during the traction control, the brake cylinders corresponding to the non-drive wheels are quickly supplied with the hydraulic pressure produced by the master cylinder.

However, the construction of the present hydraulic brake apparatus may be modified such that the brake cylinders corresponding to the non-drive wheels are communicated with the hydraulic booster, while the brake cylinders corresponding to the drive wheels are communicated with the power pressure source. In this case, the brake cylinders corresponding to the non-drive wheels are supplied with the hydraulic pressure produced by the hydraulic booster.

The present mode (26) is applicable to a vehicle stability control, if the brake cylinders corresponding to the wheels as objects of the vehicle stability control are communicated with the first hub section to which the power pressure source is connected, and the brake cylinders corresponding to non-object wheels that are not the objects of the vehicle stability control are communicated with the second hub section to which the master cylinder is connected. Thus, if the brake operating member is operated during the vehicle stability control the brake cylinders corresponding to the non-object wheels are quickly supplied with the hydraulic pressure produced by the master cylinder.

(27) The hydraulic brake apparatus according to any of the modes (17) through (26), wherein the hub portion includes a liquid passage to which the hydraulic booster, the master cylinder, and the power pressure source are connected, and which is connected to the brake cylinders, wherein the separating device is provided in the liquid passage and separates the liquid passage into two portions as the first and second hub sections.

In the hydraulic brake apparatus in accordance with the mode (27), the hub portion includes the liquid passage which is connected to the brake cylinders and to which the three pressure sources are connected

(28) The hydraulic brake apparatus according to any of the modes (18) through (21), (23), (24), and (27), wherein the brake cylinders include a first, a second, a third, and a fourth brake cylinder corresponding to a front left, a front right, a rear left, and a rear right wheel of the vehicle, respectively, wherein one of the first and second cylinder groups includes the first and fourth brake cylinders, and an other of the first and second cylinder groups includes the second and third brake cylinders.

(29) The hydraulic brake apparatus according to any of the modes (18) through (21), (23), (24), (26), and (27), wherein the brake cylinders include a first, a second, a third, and a fourth brake cylinder corresponding to a front left, a front right, a rear left, and a rear right wheel of the vehicle, respectively, wherein one of the first and second cylinder groups includes the first and second brake cylinders, and an other of the first and second cylinder groups includes the third and fourth brake cylinders.

(30) The hydraulic brake apparatus according to any of the modes (1) through (29), further comprising:

a plurality of individual pressure control valve devices each of which includes a pressure-increase control valve provided between the hub portion and at least one of the brake cylinders that corresponds to said each individual pressure control valve device, and additionally includes a pressure-decrease control valve provided between said at least one brake cylinder and a reservoir which reserves a hydraulic liquid, and each of which controls the hydraulic pressure in said at least one brake cylinder, and wherein each of the respective pressure-increase valves of the individual pressure control valve devices comprises a normally open solenoid-operated control valve.

One pressure-increase control valve and one pressure-decrease control valve may be associated with one brake cylinder, or two brake cylinders. In the former case, the respective hydraulic pressures in the brake cylinders are controlled independent of each other; and in the latter case, the respective hydraulic pressures in the two brake cylinders are commonly controlled. The reservoir may be one that reserves the hydraulic liquid under an atmospheric pressure.

Each of the pressure-increase control valve and the pressure-decrease control valve may be constituted by a solenoid-operated open/close valve that is opened and closed by supplying (ON), or cutting (OFF), an electric current to, or from, a solenoid of the valve; or a linear control valve a pressure difference across which can be continuously controlled by continuously controlling an electric current supplied to a solenoid of the valve.

The individual pressure control valve devices are provided between the hub portion and the brake cylinders. Since the pressure-increase control valves are of the normally open type, the pressure source or sources connected to the hub portion can supply the hydraulic pressure to the brake cylinders, even in the case where no electric currents are supplied to the respective solenoids of the control valves, so that the present hydraulic brake apparatus may operate.

The controlling of one individual pressure control valve device leads to controlling the hydraulic pressure in at least one of the brake cylinders that corresponds to the at least one individual pressure control valve device. Thus, the individual pressure control valve device or devices can be utilized in each of the anti-block control, the traction control, and the vehicle stability control in each of which a slipping state of each wheel is controlled to a state suitable for a friction coefficient µ of a road surface on which the vehicle is moving. In addition, the individual pressure control valve device or devices can be utilized when the respective hydraulic pressures in the brake cylinders are commonly controlled, for example, when those hydraulic pressures are controlled to a value corresponding to the driver's required braking force determined based on the operation state of the brake operating member.

(31) The hydraulic brake apparatus according to any of the modes (1) through (30), further comprising:

a plurality of individual pressure control valve devices each of which controls the hydraulic pressure in at least one of the brake cylinders that corresponds to said each individual pressure control valve device; and an individual-pressure-control-valve-device-control hydraulic-pressure control device which controls said each individual pressure control valve device so that the hydraulic pressure in said at least one brake cylinder may take a value corresponding to a current condition of the vehicle.

Owing to the controlling of the individual pressure control valve devices, the hydraulic pressure in each of the brake cylinders can be controlled, by utilizing the hydraulic pressure produced by the power pressure source, to a value corresponding to the condition of the vehicle (this value may correspond to the driver's required braking force determined based on the operation state of the brake operating member).

(32) The hydraulic brake apparatus according to any of the modes (1) through (31), wherein the power pressure source comprises an output-pressure control device which controls the third hydraulic pressure as an output hydraulic pressure of the power pressure source, and wherein the hydraulic brake apparatus further comprises an output-pressure-control-device control portion which controls the output-pressure control device so that the hydraulic pressure in at least one of the brake cylinders may take a value corresponding to a current condition of the vehicle.

In the case where the power pressure source includes a pump that pressurizes the hydraulic liquid and a pump motor that drives the pump, the output pressure control device may be one including a drive circuit that drives the pump motor, or one including a hydraulic-pressure control valve device including one or more hydraulic-pressure control valves. When the output hydraulic pressure of the power pressure source is controlled, the respective hydraulic pressures in the brake cylinders can be commonly controlled.

(33) The hydraulic brake apparatus according to any of the modes (1) through (32), wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel, wherein the hydraulic brake apparatus further comprises:

a communication device which receives, from the regenerative-braking-force control device, information representing an actual regenerative braking force applied to said at least one drive wheel; and a regeneration cooperative control device which controls, based on the actual regenerative braking force represented by the information received by the communication device, the hydraulic pressure in at least one of the brake cylinders that corresponds to said at least one drive wheel so that a total braking force including the regenerative braking force and the hydraulic braking force that are applied to said at least one drive wheel may be equal to a required braking force corresponding to a current operation state of the brake operating member.

(34) The hydraulic brake apparatus according to any of the modes (20) through (33), wherein the pressure-source communication control device comprises a power-pressure-source communication portion which shuts off the hydraulic booster and the master cylinder from the hub portion and allows the power pressure source to communicate with the hub portion, and wherein the brake-cylinder communication control device comprises an each-brake-cylinder communication portion which switches the separating device to the first operation state thereof to allow the first and second hub sections to communicate with each other, and controls the individual pressure control valve devices to allow each of the brake cylinders to communicate with the hub portion.

When the respective hydraulic pressures in the brake cylinders corresponding to all the four wheels need to be controlled to a value corresponding to the operation state of the brake operating member, when the deceleration of the vehicle needs to be controlled to a value corresponding to the operation state of the brake operating member, when the regeneration cooperative control is performed, or when an automatic brake is operated (e.g., when the cruise control is performed, when a brake control is performed according to a relative-positional relationship between the present vehicle and another vehicle running in front thereof, or when a brake control is performed when the vehicle is parked), it is desirable that all the four brake cylinders be communicated with the power pressure source.

The respective hydraulic pressures in the brake cylinders corresponding to the four wheels may be commonly controlled, or may be controlled independent of each other.

(35) A hydraulic brake apparatus for use in a vehicle having a plurality of wheels and a brake operating member manually operable by a driver of the vehicle, the apparatus comprising:

a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;

a power pressure source which produces, by utilizing a power, a third hydraulic pressure irrespective of whether the brake operating member is operated by the driver, and which controls the third hydraulic pressure to a value corresponding to a current condition of the vehicle;

a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion including (a) a first hub section which is connected to at least one first brake cylinder of the brake cylinders and to which the hydraulic booster and the power pressure source are connected in parallel with each other, (a) a second hub section which is connected to at least one second brake cylinder of the brake cylinders and to which the master cylinder is connected, and (c) a separating device which is selectively switchable to a first operation state thereof in which the separating device allows the first and second hub sections to communicate with each other, and a second operation state thereof in which the separating device shuts off the first and second hub sections from each other; and a plurality of individual pressure control valve devices each of which includes a pressure-increase control valve provided between the hub portion and at lest one of the brake cylinders that corresponds to said each individual pressure control valve device, and additionally includes a pressure-decrease control valve provided between said at least one brake cylinder and a reservoir which reserves a hydraulic liquid, and each of which controls the hydraulic pressure in said at least one brake cylinder, wherein each of the respective pressure-increase valves of the individual pressure control valve devices comprises a normally open solenoid-operated control valve.

The hydraulic brake apparatus in accordance with the mode (35) may be combined with one or more of the respective technical features in accordance with the above-described modes (1) through (34).

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 5 is a view for explaining an operation mode, Mode A, of the hydraulic brake apparatus;

FIG. 6 is a view for explaining another operation mode, Mode B, of the hydraulic brake apparatus;

FIG. 9 is a view for explaining another operation mode, Mode E, of the hydraulic brake apparatus;

FIG. 10 is a table showing respective operation states of various valves in each of the above-indicated operation modes, Modes A through E, of the hydraulic brake apparatus;

FIG. 18 is a table corresponding to FIG. 10, showing respective operation states of various valves in each of five operation modes, Modes F through J, of the hydraulic brake apparatus of FIG. 16;

FIG. 19 is a view for explaining an operation mode, Mode F, of the hydraulic brake apparatus of FIG. 16;

FIG. 20 is a view for explaining another operation mode, Mode G, of the hydraulic brake apparatus of FIG. 16;

DETAILED DESCRIPTION OF THE PREFERRED EMBODIMENTS

Hereinafter, there will be described in detail preferred embodiments of a hydraulic brake apparatus in accordance with the present invention, by reference to the drawings.

First Embodiment

Figure 1:
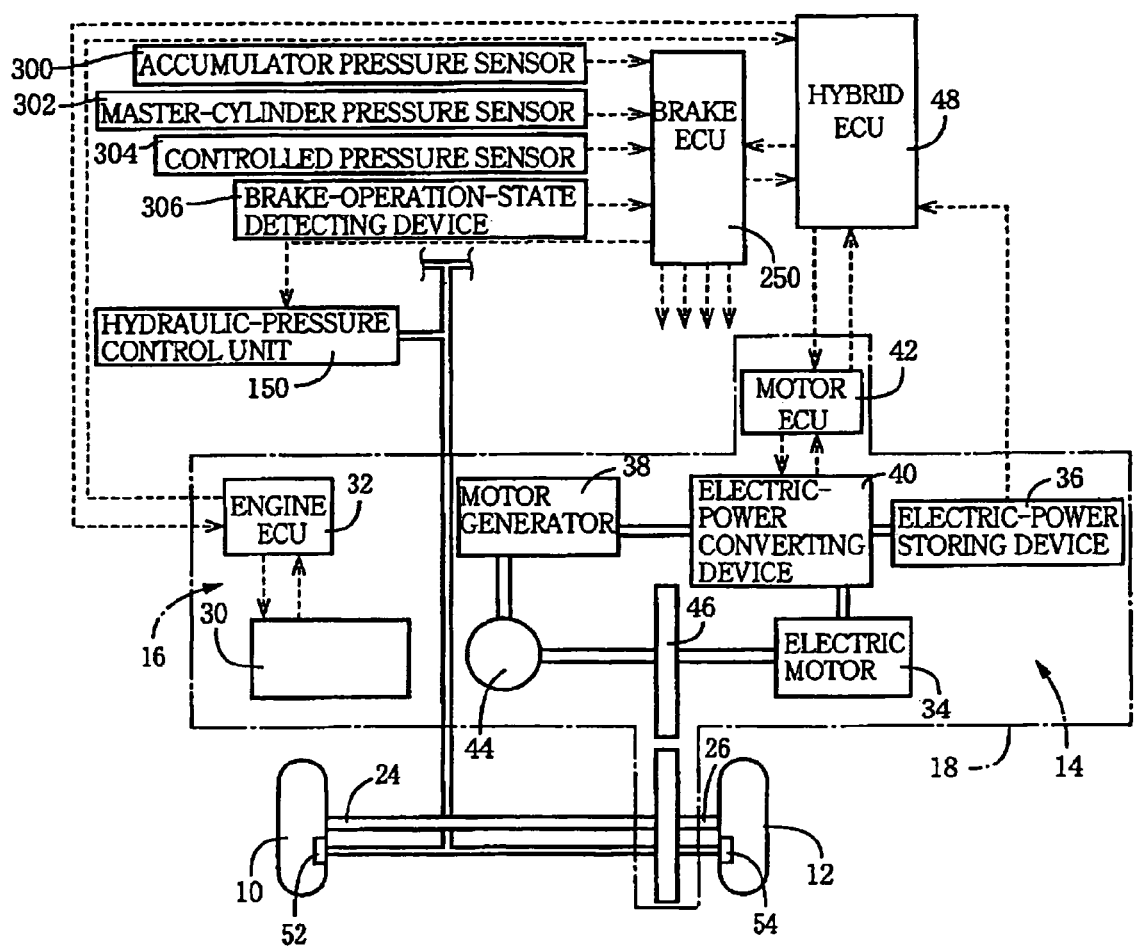
FIG. 1 is a diagrammatic view of an automotive vehicle including a hydraulic brake apparatus to which the present invention is applied.

As shown in FIG. 1, the present hydraulic brake apparatus is employed by a four-wheel "hybrid" automotive vehicle having, as two drive wheels thereof, a left front wheel 10 and a right front wheel 12 that are driven by a "hybrid" drive device 18 including an electric drive device 14 and an internal-combustion drive device 16. A drive power of the hybrid drive device 14 is transmitted to the two front wheels 10, 12 via respective drive shafts 24, 26.

The internal-combustion drive device 16 includes an engine 30, and an engine ECU (electronic control unit) 32 that controls an operation of the engine 30. The electric drive device 14 includes an electric motor 34, a battery 36 as an electric-power storing device, a motor generator 38, an electric-power converting device 40, a motor ECU 42, and a power dividing device 44. The power dividing device 44 employs a planetary gear set including a sun gear, a ring gear, and a carrier, not shown, and the motor generator 38 is connected to the sun gear, an output member 46 is joined, and the electric motor 34 is connected, to the ring gear, and an output shaft of the engine 30 is connected to the carrier. The engine 30, the electric motor 34, and the motor generator 38 are controlled such that the "hybrid" drive device 18 is selectively placed in a first operation state thereof in which only a drive torque of the electric motor 34 is transmitted to the output member 46 and a second operation state thereof in which both a drive torque of the engine 30 and the drive torque of the electric motor 34 are transmitted to the output member 46. The drive power transmitted to the output member 46 is further transmitted to the drive shafts 24, 26 via a reduction gear unit and a differential gear unit, not shown.

The electric-power converting device 40 includes an inverter, and is controlled by the motor ECU 42. Under an electric-current control of the inverter, at least the electric motor 34 is selectively placed in a driving state thereof in which the motor 34 is supplied with electric power (i.e., energy) from the battery 36 and is rotated, and a charging state thereof in which the motor 34 functions as an electric-power generator because of regenerative braking, and charges electric power to the battery 36. In the charging state, a regenerative braking torque is applied to the left and right front wheels 10, 12. Therefore, the electric drive device 14 can be said as a regenerative brake device that applies, owing to the regenerative braking of the electric motor 34, the regenerative braking torque to the two front wheels 10, 12. The motor ECU 42 controls the electric-power converting 40, based on a command received from a hybrid ECU 48.

Figure 2:
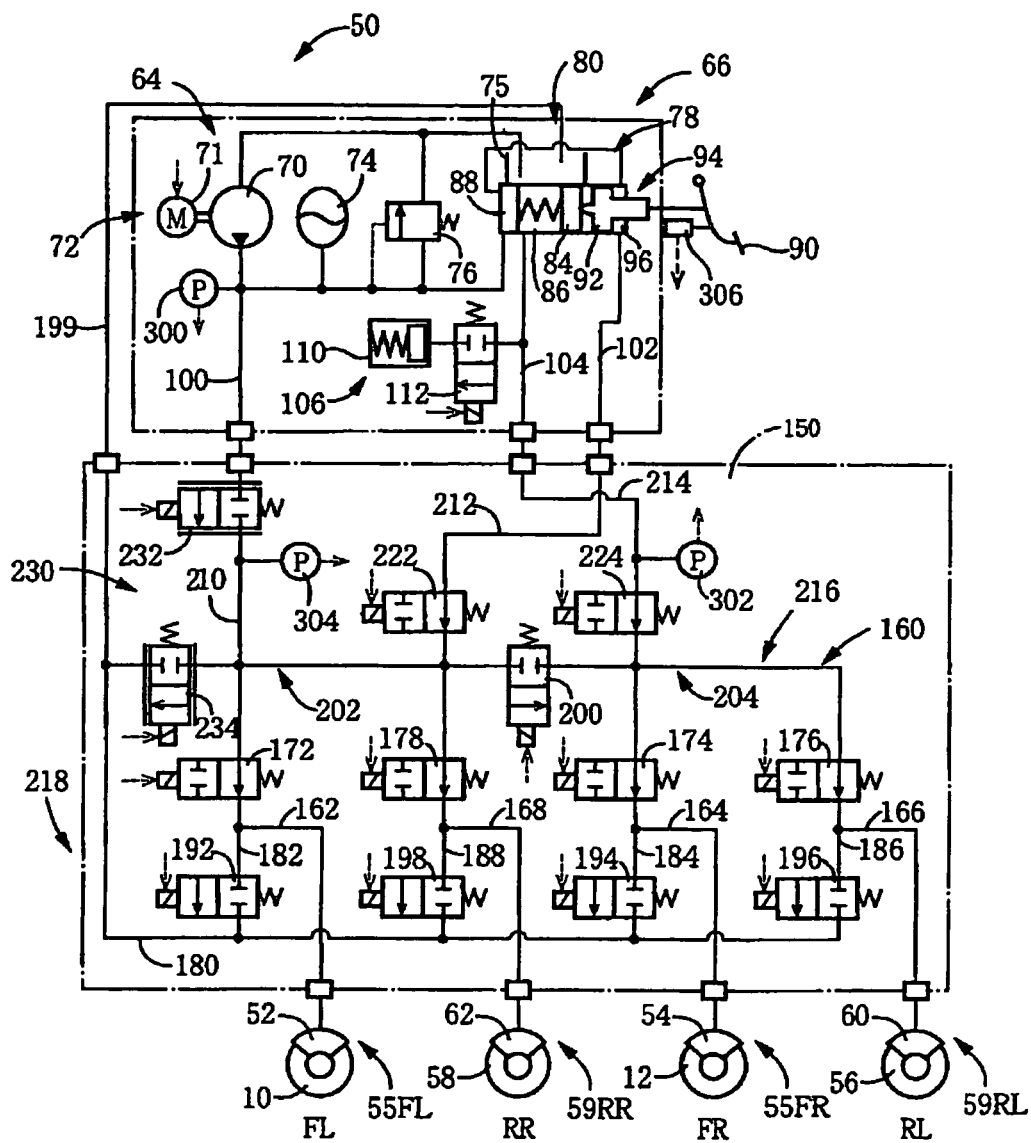
FIG. 2 is a diagrammatic view of a circuitry of the hydraulic brake apparatus.

The present hydraulic brake apparatus includes a hydraulic brake circuit 50 that is mounted as a frictional brake device on the hybrid vehicle. As shown in FIG. 2, the left and right front wheels 10, 12 are provided with respective hydraulic brakes 55FL, 55FR that include respective pads each as a fictional member and respective brake cylinders 52, 54 to each of which a hydraulic pressure is applied to press the corresponding pad against a rotary member that is rotated with the corresponding wheel 10, 12. That is, the two brake cylinders 52, 54 apply respective hydraulic braking torques to the two front wheels 10, 12. Thus, at least one of the hydraulic braking torque and the regenerative braking torque is applied to the two front wheels 10, 12 so as to restrain the respective rotations of the same 10, 12.

As shown in FIG. 2, the hydraulic brake circuit 50 includes, in addition to the two brake cylinders 52, 54 corresponding to the two front wheels 10, 12, respective brake cylinders 60, 62 of two hydraulic brakes 59RL, 59RR corresponding to left and right rear wheels 56, 58; a power hydraulic-pressure source 64; and a master cylinder device 66 (provided with a hydraulic booster) as a manual hydraulic-pressure source.

The power hydraulic-pressure source 64 (hereinafter, referred to as the power pressure source 64) includes a pump device 72 including a pump 70 and a pump motor 71; and an accumulator 74. The pump 70 pumps up a hydraulic liquid from a reservoir 75 as a low-pressure source, and pressurizes the liquid. If a hydraulic pressure on a high-pressure side of the pump 70 exceeds a reference value, then the hydraulic liquid returns to a low-pressure side of the pump 70 via a relief valve 76. The hydraulic liquid outputted from the pump 70 is accumulated by the accumulator 74, and the pump motor 72 is controlled such that a hydraulic pressure in the accumulator 74 remains within a reference range.

The master cylinder device 66 provided with the hydraulic booster (hereinafter, referred to as the manual pressure source 66) includes a hydraulic booster 78 and a master cylinder 80.

The master cylinder 80 includes a housing, and a pressurizing piston 84 that liquid-tightly fits in the housing such that the piston 84 is slideable relative to the housing. As the pressurizing piston 84 is moved forward, a pressure of the hydraulic liquid in a pressurizing chamber 86 is increased.

The hydraulic booster 78 includes a pressure adjusting portion 88 that boosts a driver's operating force applied to a brake pedal 90 as a brake operating member and produces a hydraulic pressure corresponding to the boosted operating force; and an input portion 94 including a power piston 92 associated with the brake pedal 90. A booster chamber 96 is provided in rear of the power piston 92. The pressure adjusting portion 88 includes a spool valve and a pressure adjusting chamber, not shown, and the power pressure source 64 and the reservoir 75 are each connected to the pressure adjusting portion 88. As a spool as a movable member of the spool valve is moved because of movement of the pressurizing piston 84, the pressure adjusting chamber is selectively communicated with the power pressure source 64 or the reservoir 75, so that the hydraulic pressure in the pressure adjusting chamber is adjusted to a value corresponding to the operating force applied to the brake pedal 90. The hydraulic liquid in the pressure adjusting chamber (i.e., the hydraulic liquid whose pressure has been adjusted by the pressure adjusting portion 88) is supplied to the booster chamber 96, so as to apply, to the power piston 92, a forward-direction force and thereby assist the operating force applied to the brake pedal 90.

When the brake pedal 90 is depressed by the driver, the power piston 92 and the pressurizing piston 84 are moved forward, and the booster chamber 96 is supplied with the hydraulic pressure that has been adjusted to the value corresponding to the operating force applied to the brake pedal 90. Thus, the pressurizing piston 84 is moved forward by the force applied to the pedal 90 and an assisting force i.e., a force corresponding to the hydraulic pressure in the booster chamber 96), so that the hydraulic pressure in the pressurizing chamber 86 is increased.

In the present embodiment, the hydraulic brake circuit 50 includes the power pressure source 64 and the manual pressure source 66, and the manual pressure source 66 includes the hydraulic booster 78 and the master cylinder 80. To the power pressure source 64, the booster chamber 96 of the hydraulic booster 78, and the pressurizing chamber 86 of the master cylinder 80, a power-pressure passage 100, a booster-pressure passage 102, and a cylinder-pressure passage 104 are connected, respectively. The cylinder-pressure passage 104 connected to the pressurizing chamber 86 of the master cylinder 80 is associated with a stroke simulator device 106 including a stroke simulator 110 and a simulator control valve 112. The simulator control valve 112 is a normally closed solenoid-operated open/close valve that is kept closed while an electric current is not supplied to the solenoid of the valve 112.

In the present embodiment, between the above-described three pressure sources 64, 78, 80 and the respective brake cylinders 62, 54, 60, 62 of the four wheels 10, 12, 56, 58, there is provided a hydraulic-pressure control unit 150 (hereinafter, referred to as the pressure control unit 150).

Figure 4:
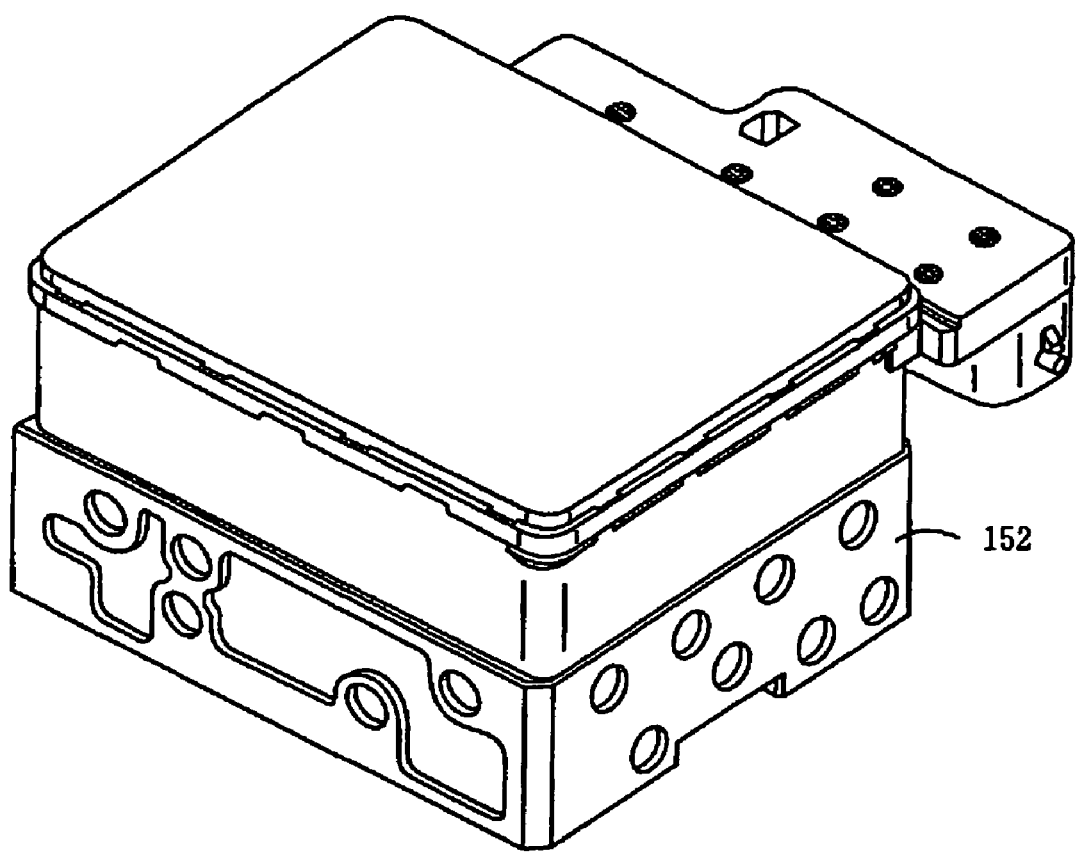
FIG. 4 is a perspective view showing an external appearance of a hydraulic-pressure control unit employed by the hydraulic brake apparatus.

The pressure control unit 150 includes a single block 152, as shown in FIG. 4, that has a plurality of hydraulic-liquid passages and a plurality of solenoid-operated control valves, described below.

The block 152 has a main hydraulic-liquid passage 160, and four individual hydraulic-liquid passages 162, 164, 166, 168 that are connected to the four brake cylinders 52, 54, 60, 62, respectively, an one hand, and are connected to the main passage 160, on the other hand. Thus, the main passage 160 can communicate with the four brake cylinders 52, 54, 60, 62 via the respective individual passages 162, 164, 166, 168. The four individual passages 162, 164, 166, 168 are provided with respective pressure-increase control valves 172, 174, 176, 178 each of which is a normally open solenoid-operated open/close valve that is kept open while an electric current is not supplied to the solenoid of the each control valve. The four brake cylinders 52, 54, 60, 62 are connected to a pressure-decrease passage 180 via respective pressure-decrease individual passages 182, 184, 186, 188 that are provided with respective pressure-decrease control valves 192, 194, 196, 198 each of which is a normally closed solenoid-operated open/close valve that is kept closed while an electric current is not supplied to the solenoid of the each control valve. The pressure-decrease passage 180 is connected to the reservoir 75 via a reservoir passage 199.

The main passage 160 is associated with a separating valve 200, and is separated by the separating valve 200 into two portions, i.e., a first passage 202 to which the two individual passages 162, 168 are connected, and a second passage 204 to which the other, two individual passages 164, 166 are connected. Thus, the first passage 202 can communicate with each of the first brake cylinder 52 corresponding to the front left wheel 10 and the fourth brake cylinder 62 corresponding to the rear right wheel 58; and the second passage 204 can communicate with each of the second brake cylinder 54 corresponding to the front right wheel 10 and the third brake cylinder 60 corresponding to the rear left wheel 56. The separating valve 200 is a normally closed solenoid-operated open/close valve that is kept closed while an electric current is not supplied to the solenoid of the valve.

In addition, to the main passage 160, three liquid passages 210, 212, 214 are connected in parallel with each other. The first liquid passage 210 is connected to the power-pressure passage 100; the second liquid passage 212 is connected to the booster-pressure passage 102; and the third liquid passage 214 is connected to the cylinder-pressure passage 104. Hereinafter the three liquid passages 210, 212, 214 will be referred to as the power-pressure passage 210, the booster-pressure passage 212, and the cylinder-pressure passage 214, respectively, since it is not needed to distinguish the three liquid passages 210, 212, 214 formed in the block 152, from the corresponding passages 100, 102, 104 provided outside the block 152. As shown in FIG. 2, the power-pressure passage 210 and the booster-pressure passage 212 are connected to the first passage 212 as the first portion of the main passage 160; and the cylinder-pressure passage 214 is connected to the second passage 214 as the second portion of the same 160.

In the present embodiment, the main passage 160 (the first and second passages 202, 204) and the separating valve 200 cooperate with each other to constitute a hub portion 216; the first passage 202 corresponds to a first hub portion; and the second passage 204 corresponds to a second hub portion. In addition, the four pressure-increase control valves 172, 174, 176, 178 and the four pressure-decrease control valves 192, 194, 196, 198 cooperate with each other to constitute four individual hydraulic-pressure control valve devices 218, respectively.

The booster-pressure passage 212 is provided with a booster communication control valve 222; and the cylinder-pressure passage 214 is provided with a cylinder communication control valve 224. Each of the two communication control valves 222, 224 is a normally open solenoid-operated open/close valve that is kept open while an electric current is not supplied to the solenoid of the each control valve.

Figure 3:
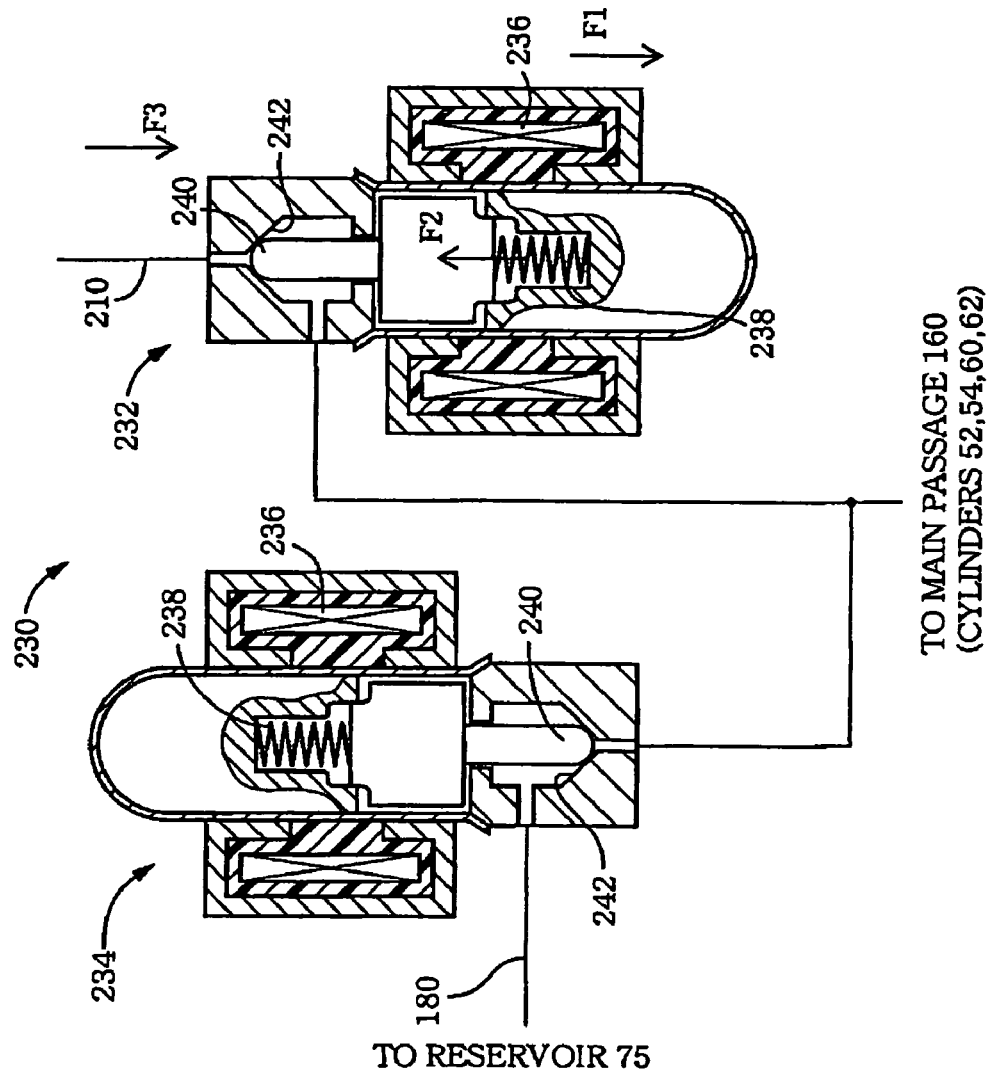
FIG. 3 is a cross-section view of a linear control valve device employed by the hydraulic brake apparatus.

The power-pressure passage 210 is provided with a linear control valve device 230 including, as shown in FIG. 3, a pressure-increase linear control valve 232 and a pressure-decrease linear control valve 234. Each of the two linear control valves 232, 234 includes a solenoid 236, and is a normally closed solenoid-operated open/close valve that is kept closed while an electric current is not supplied to the solenoid 236 of the each control valve. More specifically described, in each of the two linear control valves 232, 234, a position of a valve member 240 relative to a valve seat 242 is defined by a relationship (F1+F3:F2) between an electromagnetic drive force F1 corresponding to an electric current supplied to the solenoid 236, a biasing force F2 of a spring 238, and a pressure-difference-caused operating force F3 corresponding to a difference of respective hydraulic pressures in front of and in rear of the each valve 232, 234. The difference of the respective hydraulic pressures in front of and in rear of the each valve 232, 234 can be continuously controlled by continuously controlling the electric current supplied to the solenoid 236. In particular, the difference of the respective hydraulic pressures in front of and in rear of the pressure-increase linear control valve 232 corresponds to a difference of the respective hydraulic pressures of the power pressure source 64 and the main passage 160; and the difference of the respective hydraulic pressures in front of and in rear of, the pressure-decrease linear control valve 234 corresponds to a difference of the respective hydraulic pressures of the main passage 160 and the pressure-decrease passage 180. In a state in which each of the four pressure-increase control valves 172 through 178 is open and a corresponding one of the four pressure-decrease control valves 192 through 198 is closed, the hydraulic pressure of the main passage 160 corresponds to the hydraulic pressure in a corresponding one of the four brake cylinders 52, 54, 60, 62.

The pressure-increase linear control valve 232 also functions as a power-pressure-source communication control valve that is normally closed, while an electric current is not supplied to the solenoid 236 thereof, so as to shut off the power pressure source 64 from the main passage 160 or the hub portion 216. In addition, since the pressure-decrease linear control valve 234 is a normally closed valve, the control valve 234 shuts of, while an electric current is not supplied to the solenoid 236 thereof, the reservoir 75 from the main passage 160. Thus, it can be said that the reservoir 75 as the low-pressure source is connected to the main passage 160 or the hub portion 216.

The hydraulic-pressure control unit 150 is controlled by a brake ECU 250, shown in FIG. 1. Each of the brake ECU 250, the hybrid ECU 48, the motor ECU 42, and the engine ECU 32 is essentially constituted by a computer including an implementing portion, a program and data storing portion, an input portion, and an output portion. To the hybrid ECU 48, each of the brake ECU 250, the motor ECU 42, and the engine ECU 32 is connected, and information is communicated among those ECUs. Since a manner in which the engine 30 is controlled is not relevant to the present invention, a manner in which information is communicated between the hybrid ECU 48 and the engine ECU 32 is not described here. Hereinafter, a manner in which information is communicated between the hybrid ECU 48 and the other ECUs 250, 42 will be described so long as those communications are relevant to the present invention.

To the input portion of the brake ECU 250, there are connected an accumulator pressure sensor 300 that detects a hydraulic pressure in the accumulator 74; a master-cylinder pressure sensor 302 that detects a hydraulic pressure in an upstream-side portion of the cylinder-pressure passage 214 that is located on an upstream side of the cylinder communication control valve 224; a controlled pressure sensor 304 that detects a hydraulic pressure in a downstream-side portion of the power-pressure passage 210 that is located on a downstream side of the pressure-increase linear control valve 232; and a brake-operation-state detecting device 306 that detects an operation state of the brake pedal 90. In addition, to the input portion of the brake ECU 250, there are connected the respective solenoids of the above-described solenoid-operated control valves (i.e., the four pressure-increase control valves 172 through 178, the four pressure-decrease control valves 192 through 198, the separating valve 200, the two communication control valves 222, 224, the two linear control valves 232, 234, and the simulator control valve 112), and the pump motor 71 via respective drive circuits, not shown.

More specifically described, the cylinder pressure sensor 302 detects the hydraulic pressure in the pressuring chamber 86 of the master cylinder 80.

The hydraulic pressure detected by the controlled pressure sensor 304 is a hydraulic pressure on a low-pressure side of the pressure-increase linear control valve 232, and a hydraulic pressure on a high-pressure side of the pressure-decrease linear control valve 234. Therefore, the pressure detected by the sensor 304 can be used to control each of the two linear control valves 232, 234. In addition, in a state in which the two linear control valves 232, 234 and the separating valve 200 are closed, the pressure detected by the sensor 304 indicates the hydraulic pressure in the booster chamber 96. Thus, the pressure detected by the sensor 304 can be used to determine the hydraulic pressure in the booster chamber 96. Moreover, in a state in which the separating valve 200 and the four pressure-increase control valves 172 through 178 are open and the four pressure-decrease control valves 192 through 198 are closed, the pressure detected by the sensor 304 indicates the hydraulic pressure in each of the four brake cylinders 52, 54, 60, 62. Therefore, the pressure detected by the sensor 304 can be used to determine the hydraulic pressure in the each brake cylinder 52, 54, 60, 62.

The brake-operation-state detecting device 306 includes at least one of (a) an operating stroke sensor that detects an operating stroke of the brake pedal 90, (b) an operating force sensor that detects an operating force applied to the brake pedal 90, and (c) a brake switch that detects whether the brake pedal 90 is being depressed or not. Thus, the brake-operation-state detecting device 306 can detect a current operation state of the brake pedal 90.

Hereinafter, there will be described an operation of the present hydraulic brake apparatus constructed as described above.

The present hydraulic brake apparatus performs a regeneration cooperative control in which a total braking torque as a sum of a regenerative braking toque applied to the drive wheels 10, 12 and a frictional braking torque applied to the drive and non-drive wheels 10, 12, 56, 58 is controlled to be equal to a driver's required total braking torque.

To this end, the brake ECU 250 calculates the driver's required total braking torque, based on the value detected by the brake-operation-state detecting device 306 (and, optionally, the value detected by the cylinder pressure sensor 302). In addition, the brake ECU 250 determines, as a required regenerative braking torque, the smallest one of (a) an electric-power-generation-related upper limit as an upper limit of the regenerative braking torque that is determined based on, e.g., a rotation speed of the electric motor 34, (b) an electric-power-storage-related upper limit as an upper limit of the regenerative braking torque that is determined based on, e.g., an electric-power storage capacity of the battery 36, and (c) a brake-operation-state-related upper limit as an upper limit of the regenerative braking torque that is determined based on the driver's operating force applied to the brake pedal 90. The above-indicated sets of information (a), (b) are supplied from the hybrid ECU 48 to the brake ECU 250, and the set of information (c) is obtained as the above-indicated driver's required total braking torque by the brake ECU 250. Information representing the thus determined required regenerative braking torque is supplied from the brake ECU 250 to the hybrid ECU 48.

The hybrid ECU 48 supplies the thus received information representing the required regenerative braking torque, to the motor ECU 42. The motor ECU 42 supplies, to the electric-power converting device 40, a command to control the regenerative braking torque applied by the electric motor 34 to the front left and right wheels 10, 12 so that the regenerative braking torque may be equal to the required regenerative braking torque. The electric motor 34 is controlled by the electric-power converting device 40.

Information representing an actual operation state (e.g., a rotation speed) of the electric motor 34 is supplied from the motor ECU 42 to the hybrid ECU 48. Based on the actual operation state of the electric motor 34, the hybrid ECU 48 determines an actual regenerative braking torque that is actually being applied by the electric motor 34 to the two drive wheels 10, 12 and supplies information representing the actual regenerative braking torque, to the brake ECU 250.

The brake ECU 250 determines a required hydraulic braking torque based on, e.g., a value obtained by subtracting the actual regenerative braking torque from the required total braking torque, and controls the linear control valve device 230 so that the brake-cylinder hydraulic pressures (i.e., the respective hydraulic pressures in the brake cylinders 52, 54, 60, 62) may approach a target hydraulic pressure corresponding to the required hydraulic braking torque.

Hereinafter, a system that performs the above-described regeneration cooperative control and includes, e.g., the hybrid ECU 48 will be referred to as the "hybrid" system.

Figure 13:
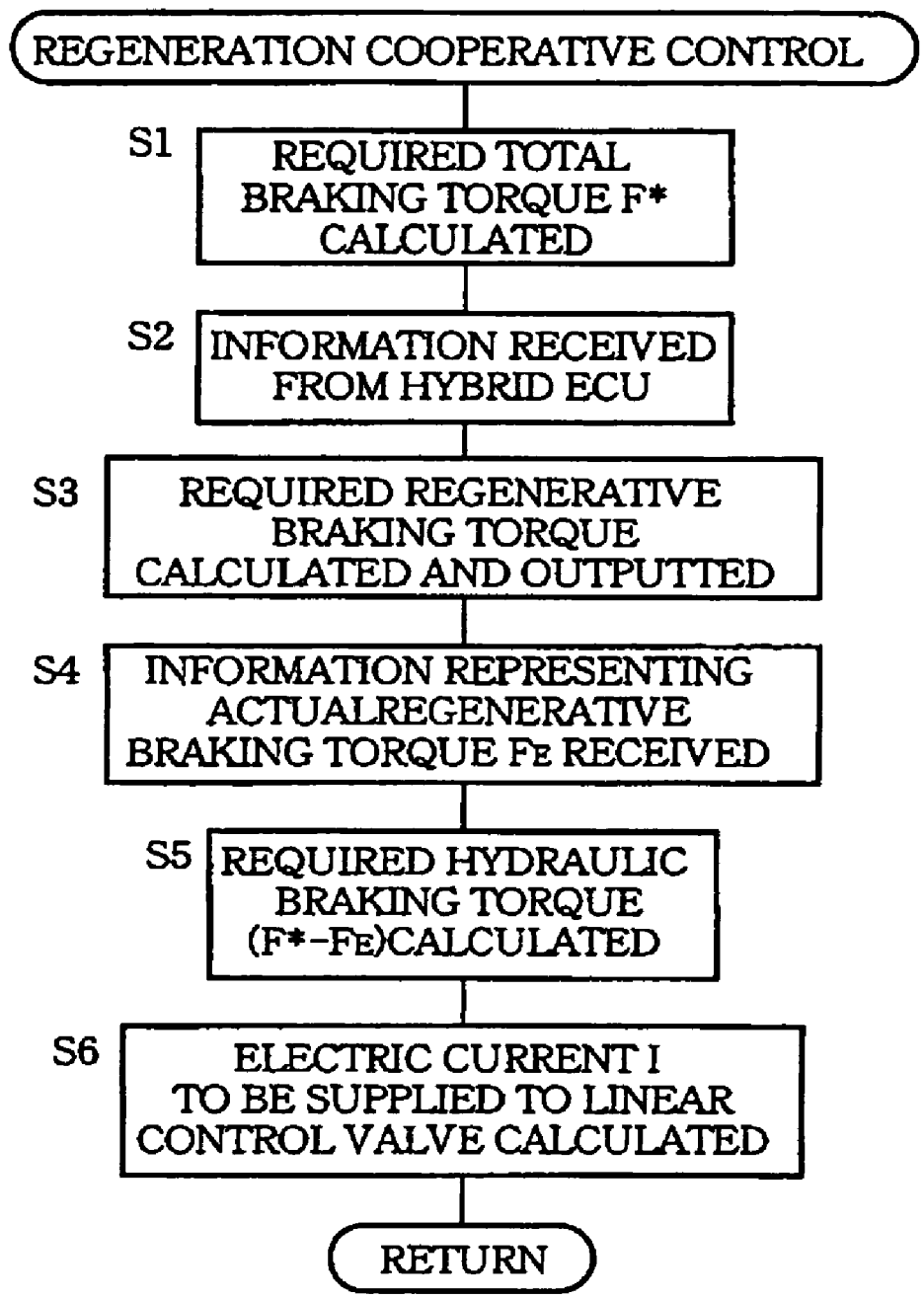
FIG. 13 is a flow chart representing a regeneration cooperative control program that is stored by the storing portion of the brake ECU.

FIG. 13 is a flow chart representing a regeneration cooperative control program that is periodically implemented at a predetermined cycle time only when the regeneration cooperative control is allowed.

First, at Step S1, the brake ECU 250 determines the driver's required total braking torque F*. At Step S2, the brake ECU 250 receives, from the hybrid ECU 48, the information representing the two sorts of upper-limits of the regenerative braking torque. At Step S3, the brake ECU 250 determines the required regenerative braking torque. At Step S4, the brake ECU 250 receives, from the hybrid ECU 48, the information representing the actual regenerative braking torque $F_E$. At Step S5, the brake ECU determines the required hydraulic braking torque (F*–$F_E$) based on the actual regenerative braking torque and the required total braking torque; and, at Step S6, the brake ECU 250 produces the control command or value (i.e., the electric current I), and outputs the control value to the linear control valve device 230 so as to produce the required hydraulic braking torque.

Figure 14A:
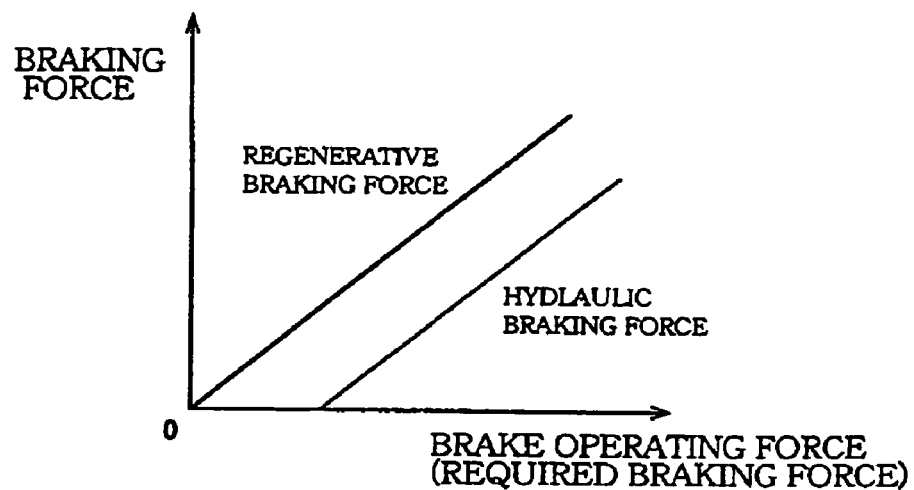
FIG. 14A is a graph showing a first relationship between (a) brake operating force and (b) breaking force controlled according to the regeneration cooperative control program.
Figure 14B:
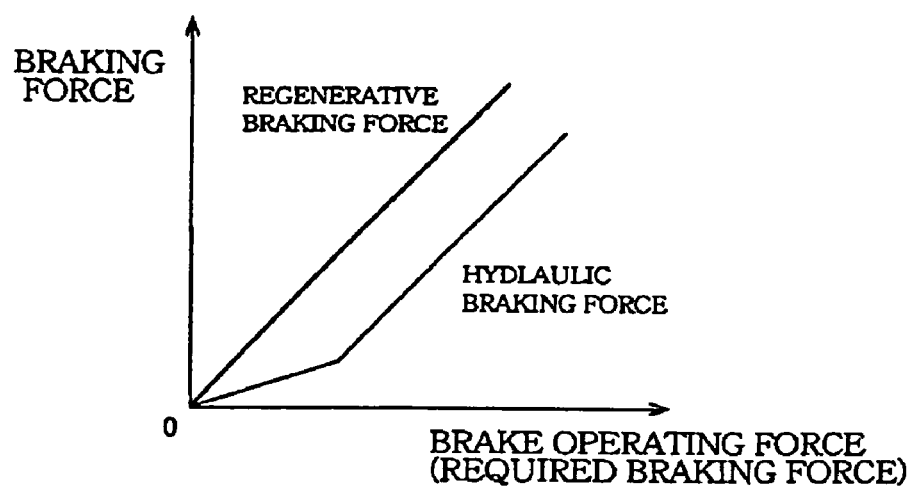
FIG. 14B is a graph showing a second relationship between (a) brake operating force and (b) braking force controlled according to the regeneration cooperative control program.

As described above, in the regeneration cooperative control the target hydraulic pressure for the respective hydraulic pressures in the brake cylinders 52, 54, 60, 62 is determined according to the required hydraulic braking torque determined based on the actual regenerative braking torque and the required total braking torque, and the respective electric currents to be supplied to the respective solenoids of the pressure-increase and pressure-decrease linear control valves 232, 234 are determined. To this end, there are two control manners. FIG. 14A shows the first control manner in which the regenerative brake i.e., the electric motor 34) is operated with priority and a shortage of the required total braking torque is compensated by the hydraulic brake, mainly the operation of the pressure-increase linear control valve 232; and FIG. 14B shows the second control manner in which the hydraulic brake is operated first and the hydraulic braking torque is decreased by the operation of the pressure-decrease linear control valve 234, by an amount corresponding to the actual regenerative braking torque. In the present embodiment, either one of the two control manners can be selected. Therefore, even if one of the pressure-increase linear control valve 232 and the pressure-decrease linear control valve 234 may fail, the regeneration cooperative control can be performed with a desirable control accuracy.

The present hydraulic brake apparatus can be selectively operated in one of Modes A, B, C, D, and E. FIG. 10 shows respective operation states of the solenoid-operated control valves 112, 172 through 178, 192 through 198, 200, 222, 224, 230 (232, 234) in each of those modes.

In Mode A, shown in FIG. 5, both the booster communication control valve 222 and the cylinder communication control valve 224 are closed (shut), the simulator control valve 112 is open, and the separating valve 200 is open. The four pressure-increase control valves 172 through 178 are open, and the four pressure-decrease control valves 192 through 198 are closed (shut). In Mode A, the electric currents supplied to the solenoids 236 of the linear control valve device 230 are controlled.

Thus, the four brake cylinders 52, 54, 60, 62 are shut off from not only the master cylinder 80 but also the hydraulic booster 78, and the stroke simulator 110 is communicated with the pressurizing chamber 86 of the master cylinder 80. All the brake cylinders 52, 54, 60, 62 are communicated with the power pressure source 64 via the linear control valve device 230, and the respective hydraulic pressures in the brake cylinders 52, 54, 60, 62 are controlled by controlling the linear control valve device 230. The hydraulic brakes 55FL, 55FR, 59RL, 59RR are operated by the thus controlled hydraulic pressures. Since the stroke simulator 110 is communicated with the pressurizing chamber 86 of the master cylinder 80, the driver's feeling of operation of the brake pedal 90 can be kept sufficiently stable. Meanwhile, in the hydraulic brake device disclosed by Patent Document 3 or Patent Document 4, a linear control valve device is provided between a hydraulic booster and brake cylinders, and a hydraulic pressure in the booster is used to control respective hydraulic pressures in the brake cylinders. Thus, an amount of the hydraulic liquid supplied to the linear control valve device is unstable, and accordingly a pressure controlled by the linear control valve largely fluctuates. That is, the conventional hydraulic brake device suffers a low degree of controllability. In contrast, in the present embodiment, since the hydraulic liquid accumulated by the accumulator 74 is supplied to the linear control valve device 230, the hydraulic brake circuit 50 can more stably supply the hydraulic liquid than the conventional hydraulic brake device disclosed by Patent Document 3 or Patent Document 4. That is, the hydraulic brake circuit 50 can reduce the fluctuations of the controlled pressure and accordingly can enjoy an improved degree of controllability.

In Mode B, shown in FIG. 6, the cylinder communication control valve 224 is closed (shut), the booster communication control valve 222 is open, the simulator control valve 112 is open, and the separating valve 200 is open. The four pressure-increase control valves 172 through 178 are open, and the four pressure-decrease control valves 192 through 198 are closed (shut). In Mode B, the electric currents supplied to the solenoids 236 of the linear control valve device 230 are not controlled.

Since no electric currents are supplied to the solenoids 236 of the linear control valve device 230, the pressure-increase linear control valve 232 is closed, and accordingly the four brake cylinders 52, 54, 60, 62 are shut off from the power pressure source 64. Therefore, the four brake cylinders 52, 54, 60, 62 are shut off from both the master cylinder 80 and the power pressure source 64, and are communicated with the booster chamber 96 only. To all the brake cylinders 52, 54, 60, 62, the hydraulic pressure in the booster chamber 96 is supplied so as to operate all the hydraulic brakes 55FL, 55FR, 59RL, 59RR.

Figure 7:
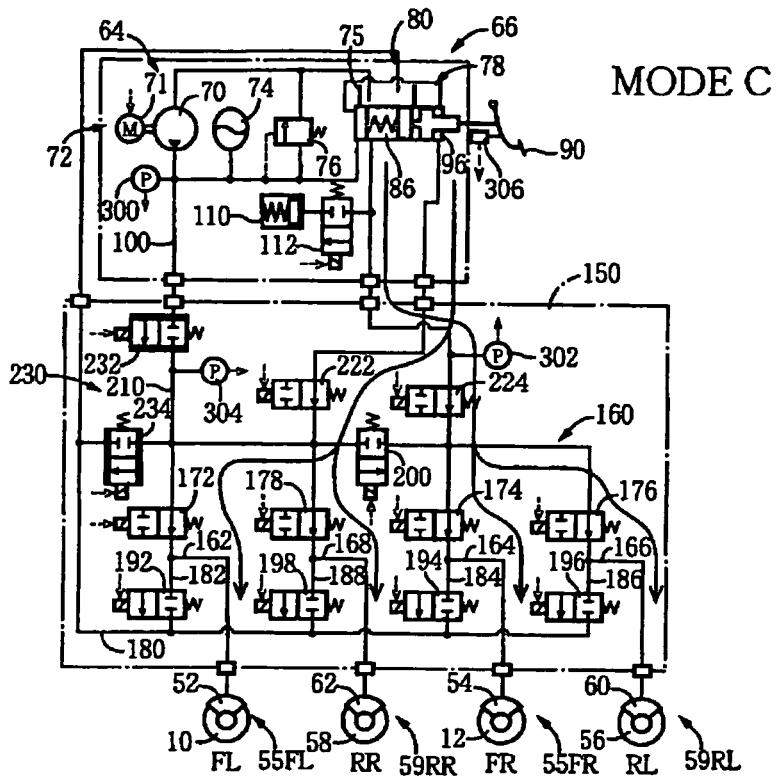
FIG. 7 is a view for explaining another operation mode, Mode C, of the hydraulic brake apparatus.

In Mode C, shown in FIG. 7, both the cylinder communication control valve 224 and the booster communication control valve 222 are open, the simulator control valve 112 is closed (shut, and the separating valve 200 is closed (shut). The four pressure-increase control valves 172 through 178 are open, and the four pressure-decrease control valves 192 through 198 are closed (shut). In Mode C, the electric currents supplied to the solenoids 236 of the linear control valve device 230 are not controlled.

The first and fourth brake cylinders 52, 62 corresponding to the front left wheel 10 and the rear right wheel 55 are communicated with the booster chamber 96, so that the booster pressure is used to operate the hydraulic brakes 55FL, 59RR; and the second and third brake cylinders 54, 60 corresponding to the front right wheel 12 and the rear left wheel 56 are communicated with the master cylinder 80, 80 that the master-cylinder pressure is used to operate the hydraulic brakes 55FR, 59RL. Since the separating valve 200 is closed, the above-described two hydraulic systems are independent of each other and cooperate with each other to constitute a diagonal or cross ("X") hydraulic system. In addition, since the pressure-increase linear control valve 232 is closed, the four brake cylinders 52, 54, 60, 62 are shut off from the power pressure source 64.

Figure 8:
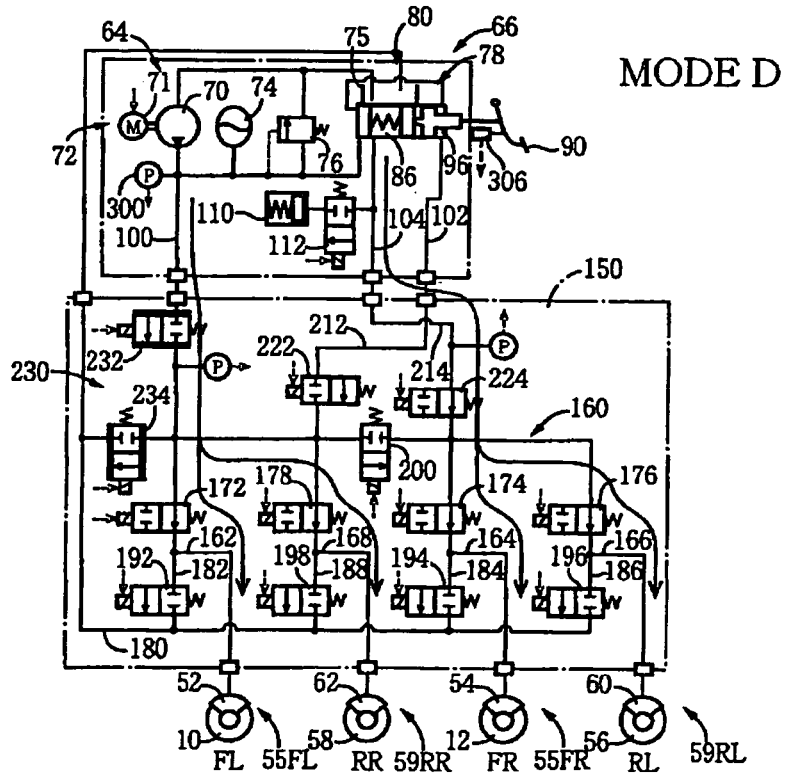
FIG. 8 is a view for explaining another operation mode, Mode D, of the hydraulic brake apparatus.

In Mode D, shown in FIG. 8, the cylinder communication control valve 224 is open, the booster communication control valve 222 is closed (shut), the simulator control valve 112 is closed (shut), and the separating valve 200 is closed shut). The four pressure-increase control valves 172 through 178 are open, and the four pressure-decrease control valves 192 through 198 are closed (shut). In Mode D, the electric currents supplied to the solenoids 236 of the linear control valve device 230 are controlled.

The second and third cylinders 54, 60 corresponding to the front right wheel 12 and the rear left wheel 56 are communicated with the master cylinder 80, and the first and fourth brake cylinders 52, 62 corresponding to the front left wheel 10 and the rear right wheel 58 are communicated with the power pressure source 64 via the linear control valve device 230. The respective hydraulic pressures in the first and fourth brake cylinders 52, 62 corresponding to the front left wheel 10 and the rear right wheel 58 are controlled by controlling the electric currents supplied to the solenoids 236 of the linear control valve device 230.

In Mode E, shown in FIG. 9, the cylinder communication control valve 224 is open, the booster communication control valve 222 is closed (shut), the simulator control valve 112 is closed (shut), and the separating valve 200 is open. The two pressure-increase control valves 172, 174 corresponding to the front left and right wheels 10, 12 are open, and the other, two pressure-increase control valves 176, 178 corresponding to the rear left and right wheels 56, 58 are closed (shut). Thus, the first and second brake cylinders 52, 54 corresponding to the front left and right wheels 10, 12 are communicated with the master cylinder 80, so that the hydraulic brakes 55FL, 55FR are operated by the master-cylinder pressure. The third and fourth brake cylinders 60, 62 corresponding to the rear left and right wheels 56, 58 are shut off from the master cylinder 80, the hydraulic booster 78, and the power pressure source 64, 80 that the hydraulic brakes 59FL, 59FR are not operated.

Figure 11:
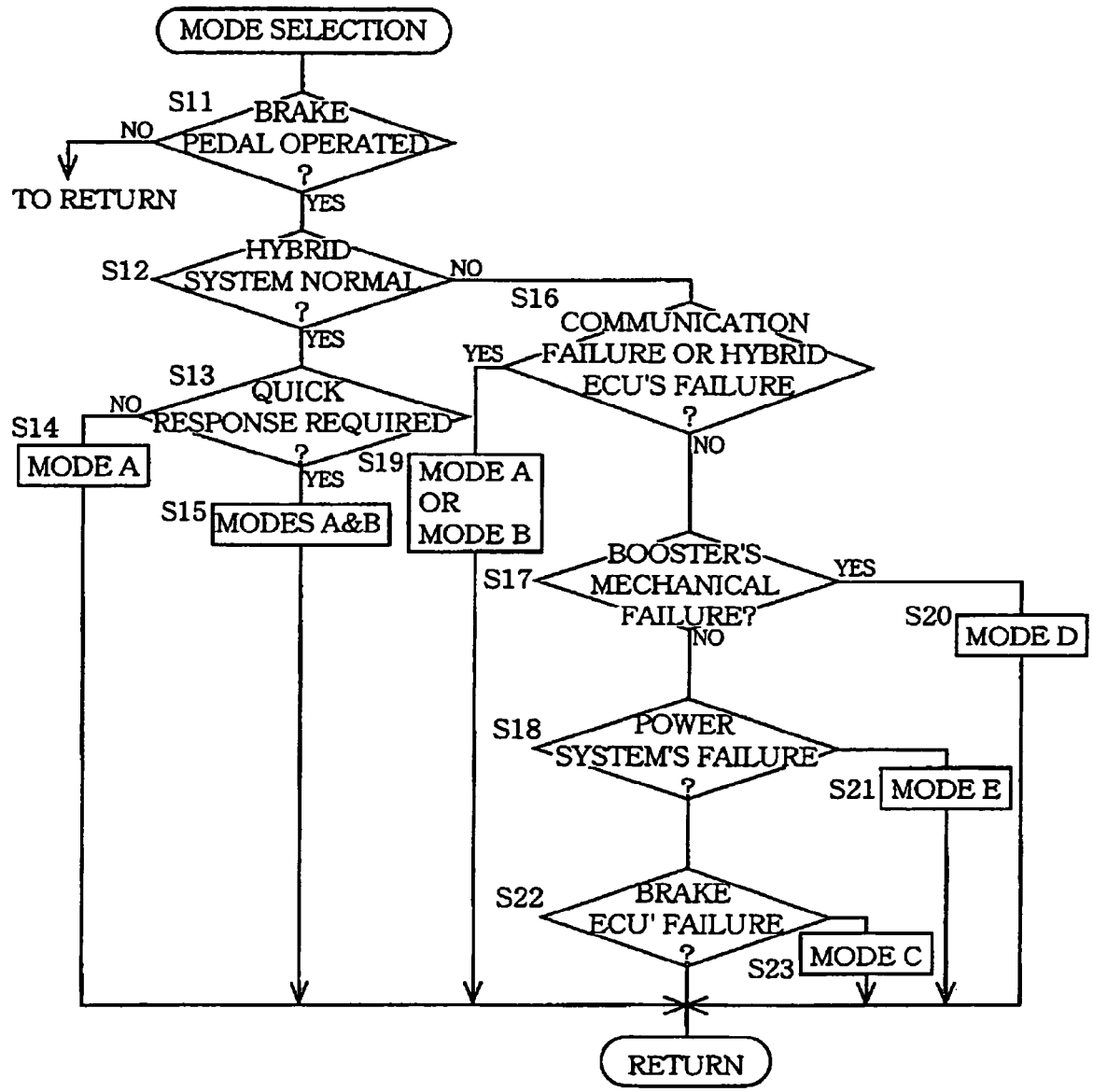
FIG. 11 is a flow chart representing a mode selection program that is stored by a storing portion of a brake ECU (electronic control unit) of the hydraulic brake apparatus.

One or two appropriate modes of the above-described modes, Modes A through E, is or are selected according to a mode selection program represented by a flow chart shown in FIG. 11. The mode selection program is periodically implemented at a predetermined cycle time. According to the selected mode or modes, the supplying of respective electric currents to the respective solenoids of the solenoid-operated control valves, shown in the table of FIG. 10. More specifically described, according to a control-valve control program represented by a flow chart shown in FIG. 12, the solenoid-operated control valves are controlled.

According to the control-valve control program, at Steps S51, S52, S53, S54, and S55, the brake ECU 250 judges whether the selected mode or modes is or include Mode A, whether the selected mode or modes is or include Mode B, whether the selected mode is Mode C, whether the selected mode is Mode D, and whether the selected mode is Mode E, respectively. If a positive judgment is made at Step S51, the control goes to Step S56 to judge whether the selected mode or modes is or include Mode B.

If Mode A has been selected but Mode B has not been selected, i.e., if a negative judgment is made at Step S56, the control goes to Step S57 to control the hydraulic brake circuit 50 in Mode A. That is, the supplying of respective electric currents to the respective solenoids of the solenoid-operated control valves are controlled according to Mode A, shown in FIG. 10. In Mode A, if the hybrid system is normal the regeneration cooperative control is performed with respect to the linear control valve device 230; but, if the hybrid system is not normal, the solenoid-operated control valves are so controlled as to obtain brake-cylinder hydraulic pressures corresponding to the driver's required braking force.

If both Mode A and Mode B have been selected, i.e., if a positive judgment is made at Step S56, the control goes to Step S58 to control the hydraulic brake circuit 50 in Modes A & B. In this mode, the cylinder communication control valve 224 is closed, the booster communication control valve 222 is open, the simulator control valve 112 and the separating valve 200 are open, and the linear control valve device 230 is controlled.

If only Mode B has been selected, i.e., if a positive judgment is made at Step S52, the control goes to Step S59 to control the hydraulic brake circuit 60 in Mode B. Likewise, if Mode C has been selected, i.e., if a positive, judgment is made at Step S53, the control goes to Step S60 to control the hydraulic brake circuit 50 in Mode C; if Mode D has been selected, i.e., if a positive judgment is made at Step S54, the control goes to Step S61 to control the hydraulic brake circuit 50 in Mode D; and if Mode E has been selected, i.e., if a positive judgment is made at Step S55, the control goes to Step S62 to control the hydraulic brake circuit 50 in Mode E. In each of Modes A, B, C, D, and E, the solenoid-operated control valves are controlled according to the table shown in FIG. 10.

In the mode selection program, first, at Step S11, the brake ECU 250 judges whether the brake pedal 90 is being operated. If a positive judgment is made at Step S11, the control goes to Step S12 to judge whether the hybrid system is normal. If a positive judgment is made at Step S12, the control goes to Step S13 to judge whether a quick response of the hydraulic brake circuit 50 is required. For example, if a manner of operation of the brake pedal 90 has largely changed (e.g., an increasing speed of the operating stroke of the brake pedal 90 exceeds a reference value, or an increasing speed of the operating or depressing force applied to the brake pedal 90 exceeds a reference value) or if a deviation as a difference between the actual brake-cylinder hydraulic pressures and the target hydraulic pressure is greater than a reference value, the brake ECU 250 judges that the quick response is needed.

If a negative judgment is made at Step S13, the control goes to Step S14 to select Mode A. In this mode, the pressure controlled by the linear control valve device 230 is supplied to each of the four brake cylinders 52, 54, 60, 62. Since the hybrid system is normal the above-described regeneration cooperative control is performed. Thus, the supplying of electric currents to the solenoids 236 of the linear control valve device 230 are so controlled that the sum of the regenerative braking torque and the hydraulic braking torque may be equal to the driver's required braking torque.

On the other hand, if a positive judgment is made at Step S13, the control goes to Step S15 to select Mode A and Mode B. In this mode, since the brake cylinders 52, 54, 60, 62 are supplied with the hydraulic liquid from both the hydraulic booster 78 and the power pressure source 64, a large amount of hydraulic liquid flows into the brake cylinders 52, 54, 60, 62, and accordingly the brake-cylinder hydraulic pressures can be quickly increased.

If a negative judgment is made at Step S12, the control goes to Step S16 to judge whether the communication function of the brake ECU 250 has failed, or whether the hybrid ECU 48 has ailed, then to Step S17 to judge whether the hydraulic booster 78 has mechanically failed, and then to Step S18 to judge whether a power system has failed.

More specifically described, at Step S16, the brake ECU 250 judges that the communication function thereof has ailed, for example, when information to be received has not been received, or when an amount of received information is too large. In each of those events, the brake ECU 250 may judge that the hybrid ECU 48 has failed. If a positive judgment is made at Step S16, the control goes to Step S19 to select Mode A, or Mode B. When the failure of the communication function or the failure of the hybrid ECU 48 is found, it would be common to end the regeneration cooperative control. However, in this event, if Mode A or Mode B is selected, the hydraulic pressure in the power pressure source 64 can be utilized to some extent.

In the case where Step S19 is programmed to select Mode A, the linear control valve device 230 is so controlled that the hydraulic pressures in the brake cylinders 52, 54, 60, 62 can produce the hydraulic braking force corresponding to the driver's required braking force. Since the hybrid system is not normal, the regeneration cooperative control is not performed. However, the linear control valve device 230 is so controlled as to obtain the hydraulic braking force corresponding to the driver's required braking force determined based on the manner of operation of the brake pedal 90.

In the case where Step S19 is programmed to select Mode B, each of the brake cylinders 52, 54, 60, 62 is supplied with the hydraulic liquid by the hydraulic booster 78. When each of the brake cylinders 52, 54, 60, 62 is communicated with the hydraulic booster 78, the each brake cylinder 52, 54, 60, 62 is supplied with the hydraulic pressure corresponding to the operating force applied to the brake pedal 90, and accordingly the amount of increasing of operating stroke of the brake pedal 90 can be reduced as compared with the case where the each brake cylinder 52, 54, 60, 62 is communicated with the master cylinder 80.

In this case, however, the regeneration cooperative control may be ended, and a transitional control in which the regenerative braking torque is gradually decreased and the hydraulic braking torque is gradually increased, may be performed. The transitional control may be performed in At Step S17, the brake ECU 250 judges that the hydraulic booster 78 has mechanically ailed, e.g., when the electric system is normal, the power pressure (i.e., the hydraulic pressure in the accumulator 74) is normal, but the hydraulic pressure in the booster 78 or the master cylinder 80 is significantly lower than a normal value corresponding to a current operation state of the brake pedal 90. In this case, the control goes to Step S20 to select Mode D.

In Mode D, the second brake cylinder 54 corresponding to the front right wheel 12 and the third brake cylinder 60 corresponding to the rear left wheel 56 are supplied with the hydraulic liquid by the master cylinder 80, and the first brake cylinder 52 corresponding to the front left wheel 10 and the fourth brake cylinder 62 corresponding to the rear right wheel 68 are supplied with the hydraulic liquid whose pressure has been controlled by the linear control valve device 230. Thus, the linear control valve 230 is so controlled that the respective braking forces supplied to the front left and right wheels 10, 12 are well balanced and additionally the respective braking forces supplied to the rear left and right wheels 56, 58 are well balanced. In addition, since the hydraulic liquid in the master cylinder 80 is supplied to the two brake cylinders 64, 60, not the four brake cylinders 52, 54, 60, 62, the amount of increasing of the operating stroke of the brake pedal 90 can be reduced and accordingly the hydraulic liquid can be quickly supplied to the two brake cylinders 54, 60.

However, Step S20 may be so modified as to select Mode A, or Mode C. In the case where Step S20 is programmed to select Mode A, the linear control valve device 230 is so controlled that the hydraulic pressures in the brake cylinders 52, 54, 60, 62 can produce the hydraulic braking force corresponding to the driver's required braking force. In the case where Step S20 is programmed to select Mode C, the brake cylinder 54 corresponding to the second front right wheel 12 and the brake cylinder 60 corresponding to the third rear left wheel 56 are communicated with the master cylinder 80, though the hydraulic pressure in the booster chamber 96 is significantly lower than a normal value when the booster 78 is normal. Thus, the hydraulic brakes 55FR, 59RL can be reliably operated by the respective hydraulic pressures corresponding to the operating force applied to the brake pedal 90.

At Step S18, the brake ECU 250 judges that the power system has failed (e.g., the pump device 72 has ailed or the hydraulic liquid has leaked from the accumulator 74), e.g., when the accumulator pressure as the power pressure is lower than a reference value. In this case, the control goes to Step S21 to select Mode E. In Mode E, the pressure-increase control valves 176, 178 corresponding to the rear left and right wheels 56, 58 are closed, and accordingly no amounts of the hydraulic liquid are supplied to the two rear wheels 56, 58. Since the brake cylinders 52, 54 corresponding to the front left and right wheels 10, 12 are supplied with the hydraulic liquid from the master cylinder 80, a large baking force can be applied to the two front wheels 10, 12.

If a negative judgment is made at Step S18, then, at Step S22, whether the brake ECU 250 has failed, or whether the brake ECU 250 is supplied with no electric current is judged. If a positive judgment is made at Step S22, then, at Step S23, Mode C is selected. However, the judgment at Step S22 and the selection at Step S23 are not made by the brake ECU 250. In Mode C, if the power pressure is significantly low, the hydraulic booster 78 may not be able to produce a sufficiently high hydraulic pressure. However, as long as a certain amount of hydraulic liquid remains in the accumulator 74, the booster 78 can boost the brake operating force. Anyway, since the second brake cylinder 54 corresponding to the front right wheel 12 and the third brake cylinder 60 corresponding to the rear left wheel 56 are communicated with the master cylinder 80, the hydraulic brakes 55FR, 59RL can be reliably operated by the respective hydraulic pressures corresponding to the operating force applied to the brake pedal 90.

Meanwhile, the brake ECU 250 may be so modified as to select Mode C, e.g., when the linear control valve device 230 has failed i.e., the control system has failed). For example, when the permanent closure of the pressure-increase linear control valve 232 or the pressure-decrease linear control valve 234 is found, the respective hydraulic pressures of the brake cylinders 52, 54, 60, 62 cannot be controlled by using the hydraulic pressure produced by the power pressure source 64. Thus, Mode C is selected.

Meanwhile, when an excessive brake-slip amount of any one of the four wheels 10, 12, 56, 58 is found, an anti-lock (or anti-block) control is performed with respect to the one wheel. In this case, a corresponding one of the four pressure-increase control valves 172 through 178 and/or a corresponding one of the four pressure-decrease control valves 192 through 198 are or is opened or closed, as needed, so that the one wheel is placed in an appropriate slipping condition.

Thus, the present hydraulic brake apparatus can be easily switched by the driver to an appropriate one (or ones) of Modes A through E, owing to the simple circuit 50. Thus, the present apparatus can enjoy improved operability and controllability.

Figure 12:
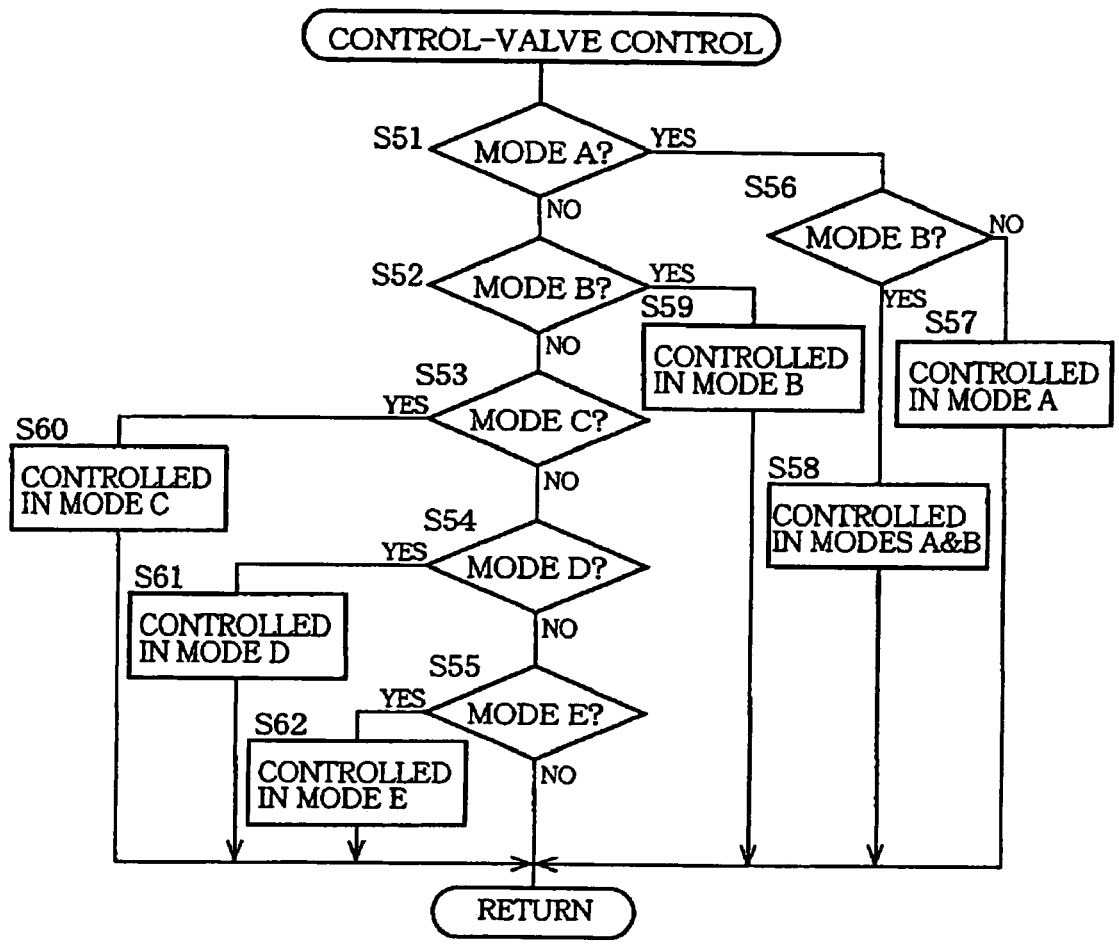
FIG. 12 is a flow chart representing a control-valve control program that is stored by the storing portion of the brake ECU.

As is apparent from the foregoing description of the first embodiment, the booster communication control valve 222, the cylinder (i.e., master cylinder) communication control valve 224, the pressure-increase linear control valve 232, portions of the brake ECU 250 that store and implement the mode selection program represented by the flow chart of FIG. 11, and portions of the brake ECU 250 that store and implement the control-valve control program represented by the flow chart of FIG. 12 cooperate with each other to constitute a pressure-source communication control device. The pressure-source communication control device includes a cylinder-and/or-power-pressure-source communication portion that is constituted by portions of the brake ECU 250 that store and implement Steps S17, S20, and S61; a booster-and/or-power-pressure-source communication portion that is constituted by portions of the brake ECU 250 that store and implement Steps S16, S19, S57, and S59; a booster-and-power-pressure-source communication portion that is constituted by portions of the brake ECU 250 that store and implement Steps S13, S15, and S58; and a failure-related cylinder-and/or-booster communication portion that is constituted by portions of the brake ECU 250 that store and implement Steps S22, S23, and S60.

In addition, portions of the brake ECU 250 that store and implement Steps S21 and S62 constitute a brake-cylinder communication control device. The brake-cylinder communication control device comprises a cross communication control portion and a left-and-right-front-wheel-brake-cylinder communication portion.

Moreover, in the first embodiment, the linear control valve device 230 constitutes an output-pressure control device as a constituent element of the power pressure source 64.

In the first embodiment, the first and fourth brake cylinders 52, 62 corresponding to the front left wheel 10 and the rear right wheel 58 are connected to the first passage 202; and the second and third brake cylinders 64, 60 corresponding to the front right wheel 12 and the rear left wheel 56 are connected to the second passage 204. However, the third and fourth brake cylinders 60, 62 corresponding to the rear left and right wheels 66, 58 may be connected to one of the first and second passages 202, 204; and the first and second brake cylinders 52, 64 corresponding to the front left and right wheels 10, 12 may be connected to the other of the first and second passages 202, 204.

It is possible to omit the linear control valve device 230. In this case, the power pressure source 64 may be modified such that the pump motor 71 controls the output pressure of the pump 70 and thereby controls the respective hydraulic pressures supplied to the brake cylinders 52, 54, 60, 62.

In the first embodiment, one or more appropriate modes is or are selected from Modes A through E. However, this is not essential. For example, it is possible to employ an additional mode in which the master cylinder 80 is communicated with all the brake cylinders 52, 54, 60, 62.

In addition, the four pressure-increase control valves 172 through 178 and the four pressure-decrease control valves 192 through 198 may be each constituted by not the solenoid-operated open/close valve but a linear control valve. In this case, it is preferred that the pressure-increase linear control valves be normally open valves. Moreover, the four pressure-increase control valves 172 through 178 and the four pressure-decrease control valves 192 through 198 may be so controlled that the hydraulic pressures in the brake cylinders 52, 54, 60, 62 may be controlled to meet the driver's required braking force, e.g., in Mode A or Mode B. Though the linear control valve device 230 may be omitted, it is preferred to employ a solenoid-operated control valve that can cause the power pressure source 64 to be communicated with, or shut off from, the main passage 160.

The regeneration cooperative control is not essentially needed. The linear control valve 230 may be so controlled as to obtain the driver's required braking torque.

Figure 15:
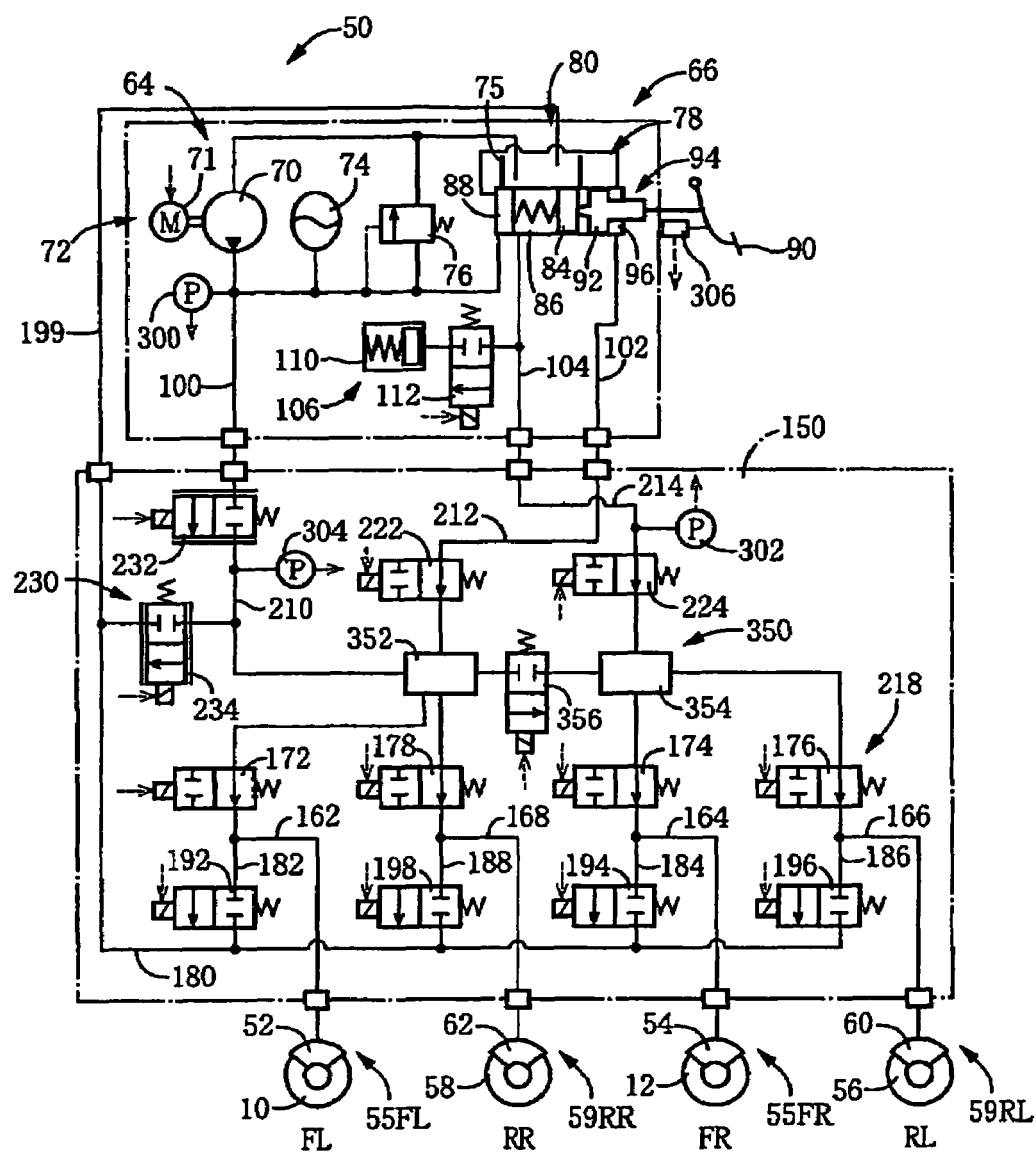
FIG. 15 is a diagrammatic view corresponding to FIG. 2, showing a circuitry of a modified form of the hydraulic brake apparatus shown in FIG. 2.

The hub portion may include not the main passage 160 but a connecting device having two hydraulic-pressure chambers. FIG. 15 shows a modified form of the hydraulic brake circuit 50 including a connecting device 350 that has two separate liquid chambers 362, 354, and a separating valve 356 that is provided in a connection passage connecting between the two liquid chambers 352, 354 and is selectively switchable to a first operation state thereof in which the separating valve 366 allows the two chambers 352, 354 to communicate with each other and a second operation state thereof in which the separating valve 356 shuts off the two chambers 352, 354 from each other. To one 352 of the two liquid chambers 352, 354, the two individual passages 162, 168, the power-pressure passage 210, and the booster-pressure passage 212 are connected; and to the other liquid chamber 354, the other, two individual passages 164, 166 and the cylinder-pressure passage 214 are connected. This modified braking circuit can be switched to an appropriate one (or ones) of Modes A through E, shown in FIG. 10, by controlling the booster communication control valve 222, the cylinder communication control valve 224, the separating valve 356, etc.

In the first embodiment, the front left and right wheels 10, 12 are the drive wheels of the vehicle. However, the present invention is applicable to a vehicle in which rear left and right wheels thereof are drive wheels, or a vehicle in which four wheels thereof are drive wheels.

In the first embodiment, the block 152 is not provided with the power pressure source 64 or the stroke simulator device 106. However, the block 152 may be provided with at least one of the power pressure source 64 and the stroke-simulator device 106.

The first embodiment relates to the hydraulic brake circuit 50 in which the diagonal-type dual hydraulic system is established in Mode C or Mode D. However, the present invention is applicable to a different hydraulic brake apparatus in which a front-and-rear-type dual hydraulic system can be established, for example, a hydraulic brake circuit 454, shown in FIGS. 16 through 26, as a second embodiment of the present invention.

Second Embodiment

Figure 16:
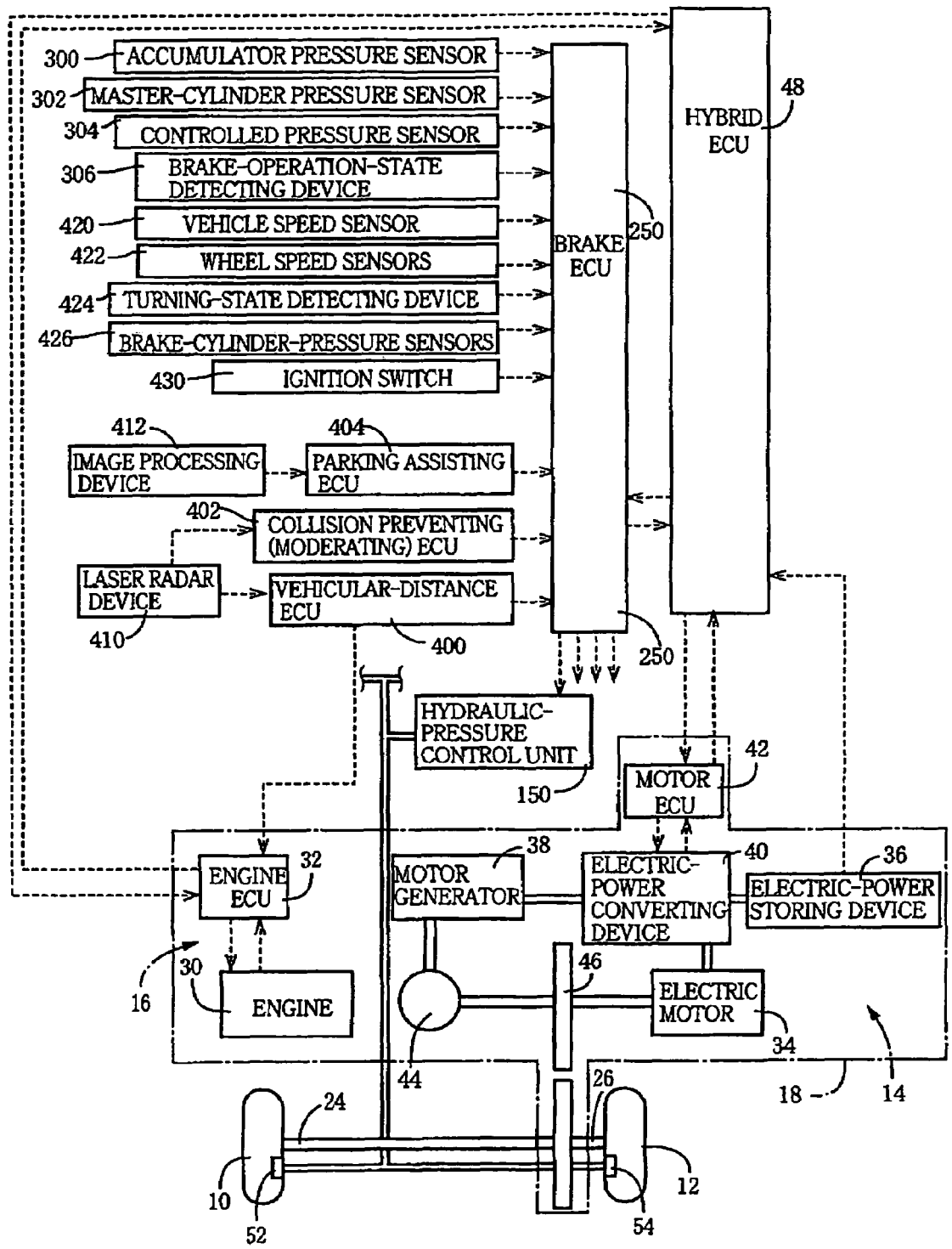
FIG. 16 is a diagrammatic view corresponding to FIG. 1, showing another automotive vehicle including another hydraulic brake apparatus as a second embodiment of the present invention.

As shown in FIG. 16, the second embodiment has a construction similar to that of the first embodiment, and the following description relates to only differences of the second embodiment from the first embodiment. In the second embodiment, an automotive vehicle additionally employs a vehicular-distance control (i.e., a cruise control) ECU 400; a collision preventing (or moderating) ECU 402; and a parking assisting ECU 404. The vehicular-distance control ECU 400 is connected to the engine ECU 32 and the brake ECU 250, and each of the collision preventing ECU 402 and the parking assisting ECU 404 is connected to the brake ECU 250.

A radar laser device 410 is connected to each of the vehicular-distance control ECU 400 and the collision preventing ECU 402, so as to detect an actual relative-positional relationship (e.g., a distance or a relative speed) between the present automotive vehicle and, e.g., another automotive vehicle running in front of the present vehicle The vehicular-distance control ECU 400 controls the engine 30 and various brakes so that the detected actual relative-positional relationship between the present vehicle and the vehicle running in front thereof coincides with a predetermined relationship. For example, even if the brake pedal 90 may not be operated by the driver, the control ECU 400 can automatically operate one or more brakes, as needed.

The collision preventing ECU 402 automatically operates one or more brakes, or assists the driver's operation of the brake pedal 90, when the detected actual relative-positional relationship indicates that the present vehicle and the vehicle running in front thereof may collide with each other. When the collision cannot be avoided, the collision preventing ECU 402 operates for moderating the impact that would be caused by the collision. An image processing device 412, described below, may be connected to the collision preventing ECU 402.

The image processing device 412 is connected to the parking assisting ECU 404, and includes a display device that displays, in response to a driver's parking-assist command, an image or images in front and/or rear of the present vehicle. When the driver inputs, e.g., a parking position (e.g., location and posture) of the prevent vehicle, the parking assisting ECU 404 determines, based on the current location (and posture) and the inputted parking position, a target locus of movement of the present vehicle, and automatically operates one or more brakes and/or controls the difference of left-side and right-side braking forces. In addition, the parking assisting ECU 404 may be adapted to control a steering device, not shown.

In the brake ECU 250, there are connected a vehicle speed sensor 420, four wheel speed sensors 422 respectively provided in association with the four wheels 10, 12, 56, 68, a turning-state detecting device 424 that detects a tuning state of the present vehicle, and four brake-cylinder hydraulic-pressure sensors 426 respectively provided in association with the four brake cylinders 52, 54, 60, 62, and an ignition switch 430. The brake ECU 250 determines, based on the respective speeds detected by the four wheel speed sensors 422, a slipping state of each of the four wheels 10, 12, 56, 58, and performs, based on the detected slipping state of the each wheel, an anti-block (or anti-lock) control and/or a traction control with respect to the each wheel.

The turning-state detecting device 424 includes a steering angle sensor that detects an angle of a steering wheel, a yaw rate sensor that detects a yaw rate of the vehicle, or a lateral-G sensor that detects a lateral G (gravity) exerted to the vehicle. The brake ECU 250 judges, based on the value detected by the sensor employed, whether there is a tendency toward spinning (i.e., whether there is a tendency that the rear wheels 56, 58 laterally slip) or whether there is a tendency toward drifting-out (i.e., whether there is a tendency that the front wheels 10, 12 laterally slip).

When a predetermined condition is initially met after the ignition switch 430 is switched from an OFF state to an ON state, the brake ECU 250 performs an initial checking operation in which the various sensors, the respective solenoids of the various solenoid-operated control valves, and the pump motor 71 are inspected.

In the present embodiment, the two rear wheels 56, 58 are drive wheels, and the two front wheels 10, 12 are not drive wheels. A driving power of the "hybrid" drive device 18 including the electric drive device 14 and the internal-combustion drive device 16 is transmitted to the two rear wheels 56, 58 via respective drive shafts 450, 452.

Figure 17:
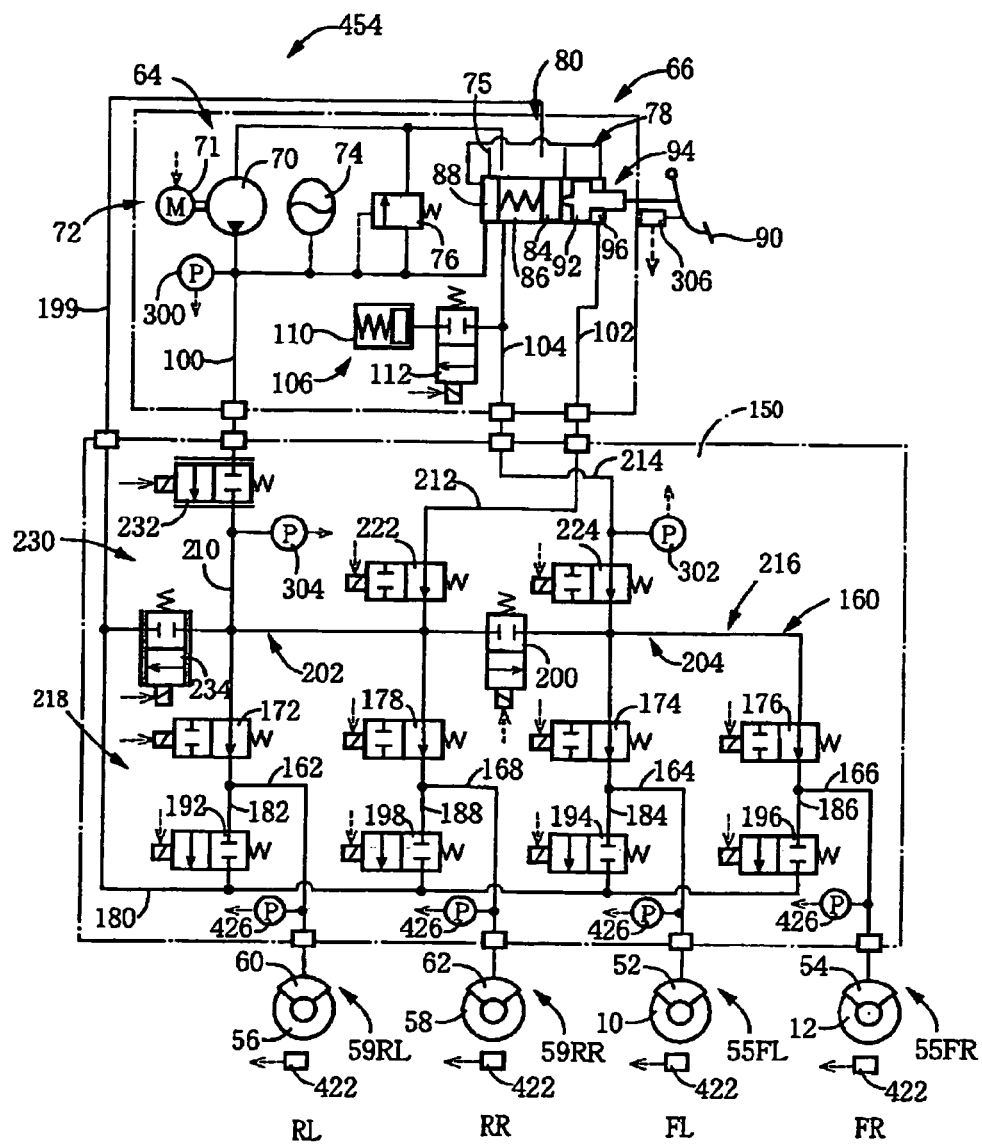
FIG. 17 is a diagrammatic view corresponding to FIG. 2, showing a circuitry of the hydraulic brake apparatus of FIG. 16.

As shown in FIG. 17, the hydraulic brake circuit 454 has a front and a rear hydraulic system and can function as a front-and-rear-type dual hydraulic brake apparatus. More specifically described, the two brake cylinders 52, 54 corresponding to the two front wheels 10, 12 as the non-drive wheels are connected to the second hub portion 204 via the respective individual passages 164, 166; and the two brake cylinders 60, 62 corresponding to the two rear wheels 56, 58 as the drive wheels are connected to the first hub portion 202 via the respective individual passages 162, 168.

The stroke simulator device 106 is designed such that a simulation characteristic thereof as a relationship between consumed hydraulic-liquid amount and hydraulic pressure is the same as a characteristic under a condition that the four brake cylinders 52, 54, 60, 62 are communicated with the master cylinder 80. Thus, the stroke simulator device 106 can effectively prevent the lowering of the driver's fling of operation of the brake pedal 90, when the four brake cylinders 52, 54, 60, 62 are switched from the condition that they are communicated with the master cylinder 80, to a different condition that they are shut off from the same 80.

The present hydraulic brake circuit 454 can be selectively operated in one or two modes out of Modes F, G, H, I, and J. FIG. 18 shows respective operation states of the solenoid-operated control valves 112, 172 through 178, 192 through 198, 200, 222, 224, 230 (232, 234) in each of those modes.

In Mode F, shown in FIG. 19, both the booster communication control valve 222 and the cylinder communication control valve 224 are closed (shut), the simulator control valve 112 is open, and the separating valve 200 is open. In Mode F, the electric currents supplied to the solenoids 236 of the linear control valve device 230 are controlled. In the case where the hydraulic pressure controlled by the linear control valve device 230 is commonly supplied to the four brake cylinders 52, 54, 60, 62, the four pressure-increase control valves 172 through 178 are open, and the four pressure-decrease control valves 192 through 198 are closed (shut). On the other hand, in the case where the respective hydraulic pressures in the four brake cylinders 52, 54, 60, 62 are individually controlled, the four pressure-increase control valves 172 through 178 and the our pressure-decrease control valves 192 through 198 are individually controlled (that is, the four individual pressure control valve devices 218 are controlled).

In Mode G, shown in FIG. 20, the cylinder communication control valve 224 is closed (shut), the booster communication control valve 222 is open, the simulator control valve 112 is open, and the separating valve 200 is open. In Mode G, the electric currents supplied to the solenoids 236 of the linear control valve device 230 are not controlled. In the case where the hydraulic pressure corresponding to the operating force applied to the brake pedal 90 is commonly supplied to the four brake cylinders 52, 54, 60, 62, the four pressure-increase control valves 172 through 178 are open, and the four pressure-decrease control valves 192 through 198 are closed (shut). On the other hand, in the case where the respective hydraulic pressures in the four brake cylinders 52, 54, 60, 62 are individually controlled, the four pressure-increase control valves 172 through 178 and the four pressure-decrease control valves 192 through 198 are individually controlled.

Figure 21:
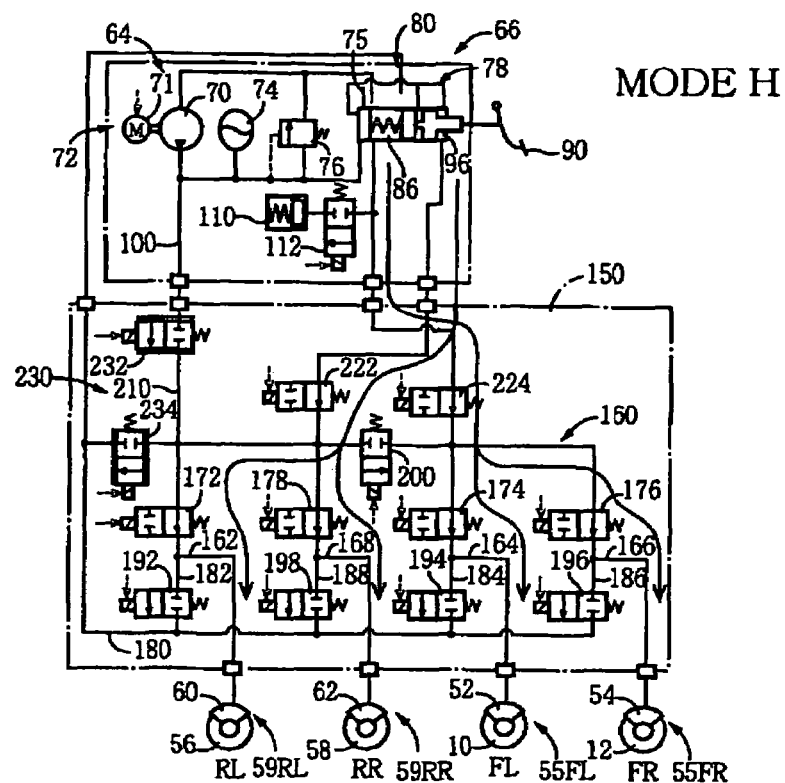
FIG. 21 is a view or explaining another operation mode, Mode H, of the hydraulic brake apparatus of FIG. 16.

In Mode H, shown in FIG. 21, both the cylinder communication control valve 224 and the booster communication control valve 222 are open, the simulator control valve 112 is closed (shut), and the separating valve 200 is closed (shut). The four pressure-increase control valves 172 through 178 are open, and the four pressure-decrease control valves 192 through 198 are closed (shut). In Mode H, the electric currents supplied to the solenoids 236 of the linear control valve device 230 are not controlled. The two brake cylinders 52, 54 corresponding to the front left and right wheels 10, 12 are communicated with the master cylinder 80, and the other, two brake cylinders 60, 62 corresponding to the rear left and right wheel 56, 58 are communicated with the booster chamber 96. Since the separating valve 200 is closed, the above-described two hydraulic systems are independent of each other and cooperate with each other to constitute the front-and-rear-type dual hydraulic braking apparatus.

Immediately after the ignition switch 430 is switched from the OFF state to the ON state, the hydraulic brake circuit 454 is in Mode H. Therefore, the initial checking operation is carried out in Mode H. Thus, in the state in which the power pressure source 64 is shut off from the brake cylinders 52, 54, 60, 62, the pump device 72 can be checked.

Figure 22:
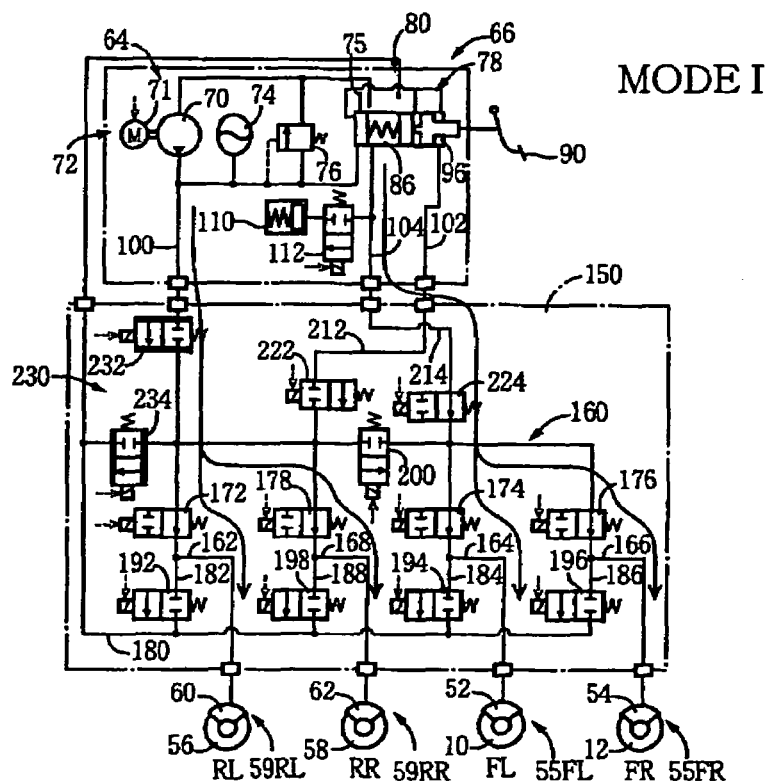
FIG. 22 is a view for explaining another operation mode, Mode I, of the hydraulic brake apparatus of FIG. 16.

In Mode I, shown in FIG. 22, the cylinder communication control valve 224 is open, the booster communication control valve 222 is closed (shut), the simulator control valve 112 is closed (shut), and the separating valve 200 is closed (shut). The four pressure-increase control valves 172 through 178 are open, and the four pressure-decrease control valves 192 through 198 are closed (shut). In Mode I, the electric currents supplied to the solenoids 236 of the linear control valve device 230 are controlled. The two brake cylinders 52, 54 corresponding to the front left and right wheels 10, 12 are communicated with the master cylinder 80, and the other, two brake cylinders 60, 62 corresponding to the rear left and right wheel 66, 68 are communicated with the power pressure source 64 via the linear control valve device 230.

Figure 23:
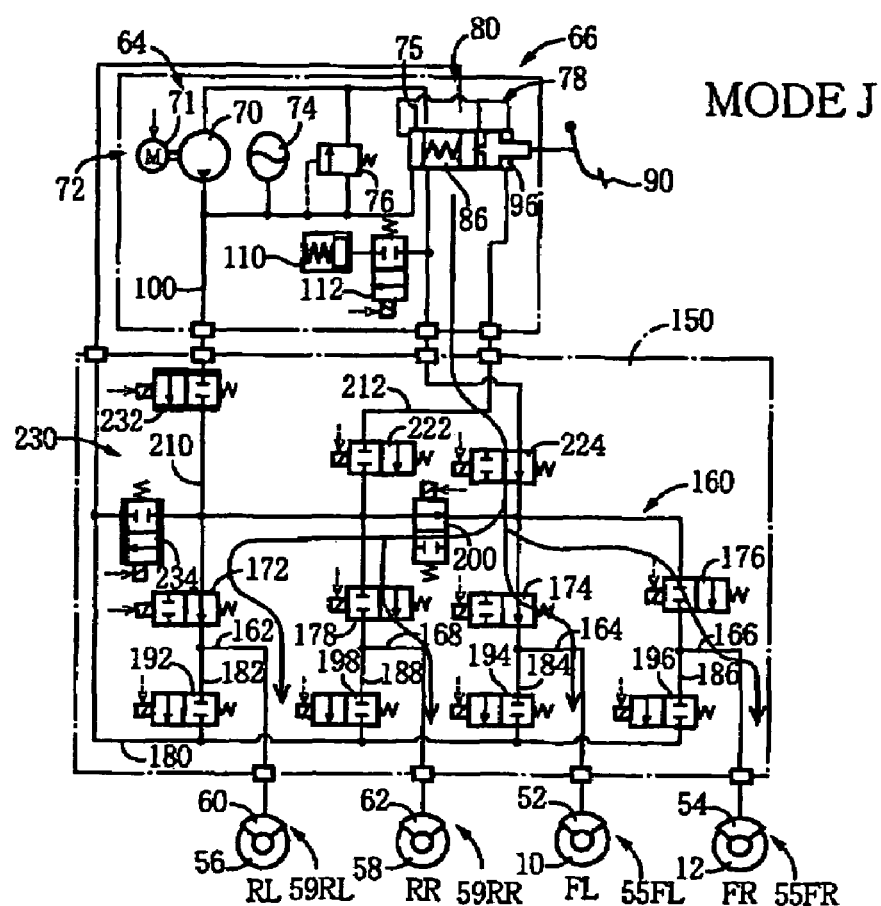
FIG. 23 is a view for explaining another operation mode, Mode J, of the hydraulic brake apparatus of FIG. 16.

In Mode J, shown in FIG. 23, the cylinder communication control valve 224 is open, the booster communication control valve 222 is closed (shut), the simulator control valve 112 is closed (shut), and the separating valve 200 is open. The four pressure-increase control valves 172 through 178 are open, and the four pressure-decrease control valves 192 through 198 are closed (shut). In Mode J, the four brake cylinders 52, 54 corresponding to all the four wheels 10, 12, 56, 58 are communicated with the master cylinder 80.

Figure 24:
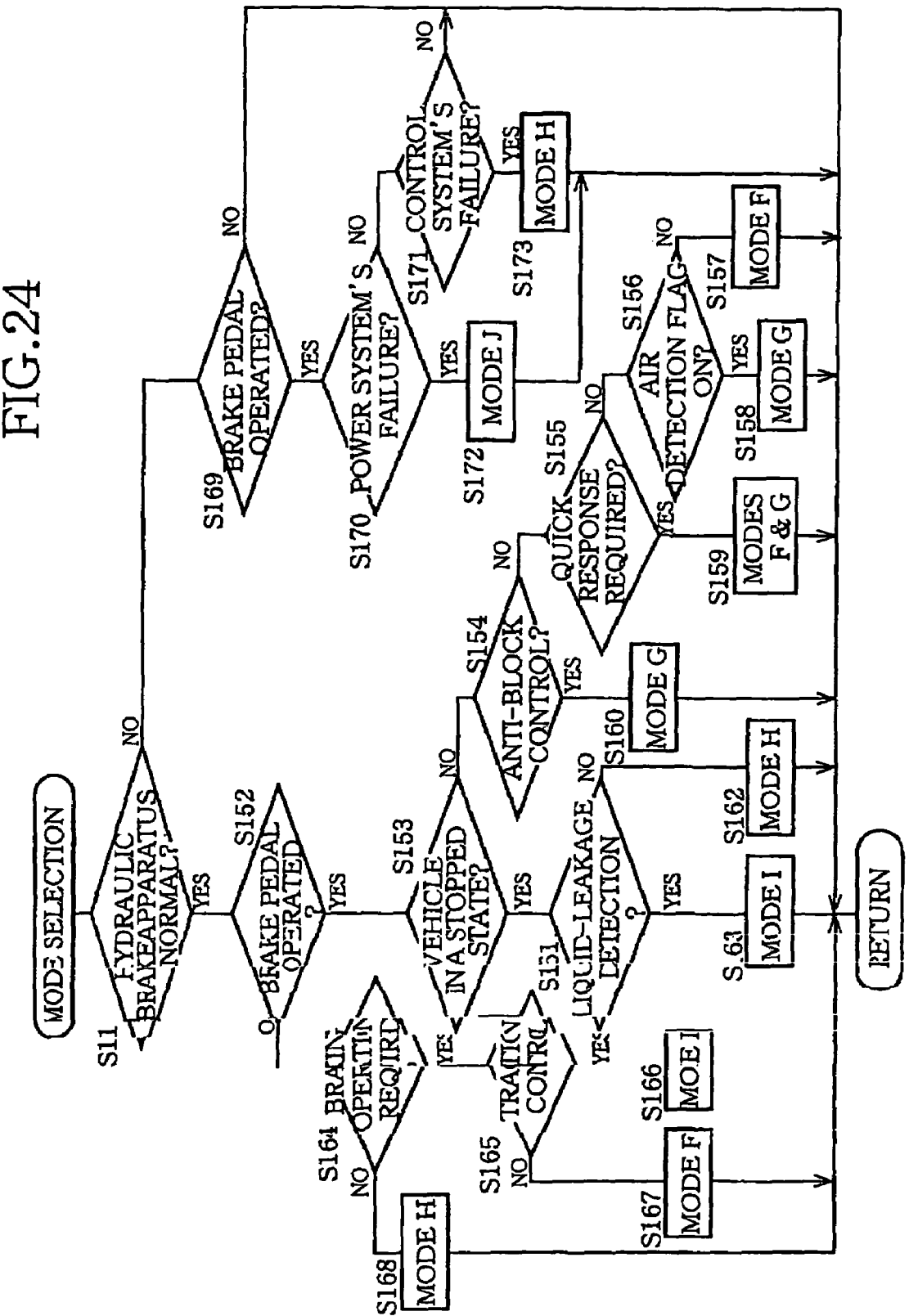
FIG. 24 is a flow chart corresponding to FIG. 11, representing a mode selection program that is stored by a storing portion of a brake ECU of the hydraulic brake apparatus of FIG. 16.

One or two appropriate modes of the above-described modes, Modes F through J, is or are selected according to a mode selection program represented by a flow chart shown in FIG. 24. The mode selection program is periodically implemented at a predetermined cycle time. According to the selected mode or modes, the supplying of respective electric currents to the respective solenoids of the solenoid-operated control valves, shown in the table of FIG. 18, are controlled. More specifically described, according to a control-valve control program represented by a flow chart shown in FIG. 25, the solenoid-operated control valves are controlled.

Figure 25:
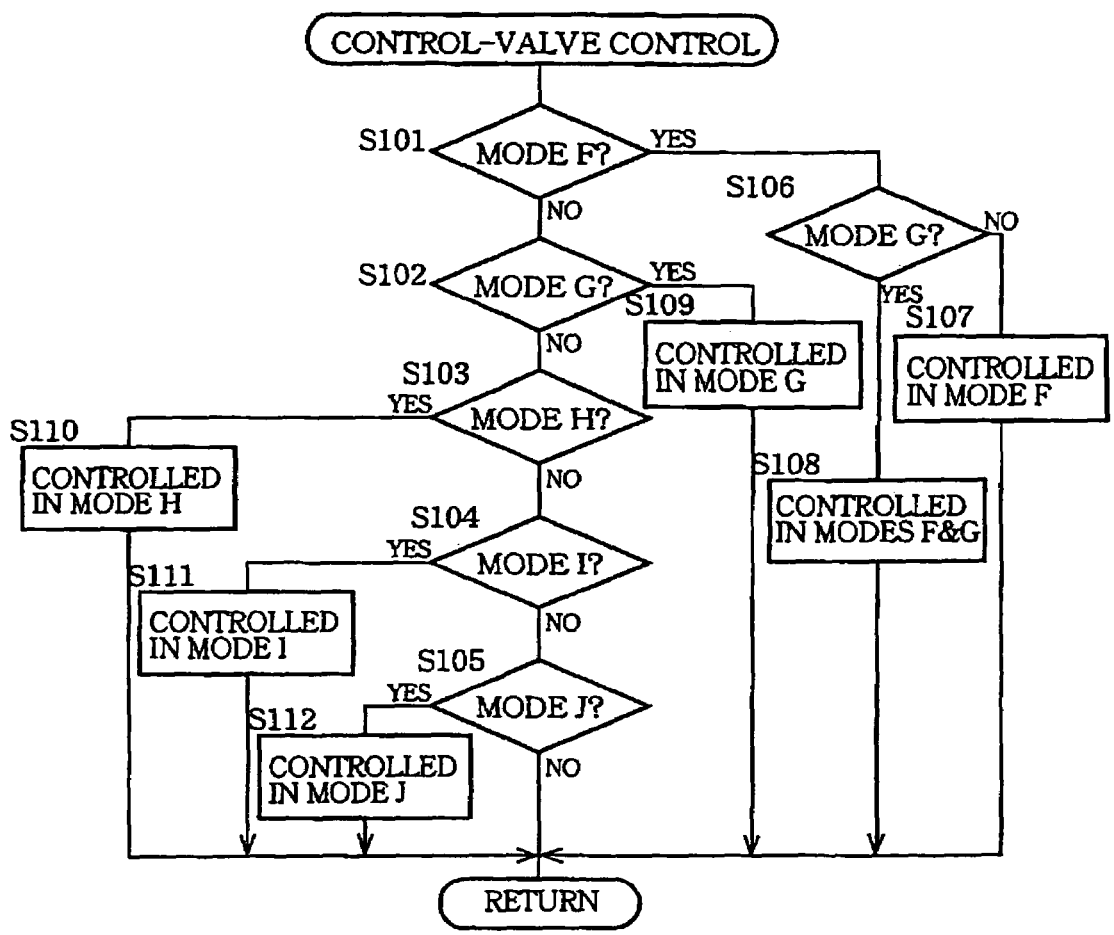
FIG. 25 is a flow chart corresponding to FIG. 12, representing a control-valve control program that is stored by the storing portion of the brake ECU.

The control-valve control program employed in the second embodiment, shown in FIG. 25, is similar to that employed in the first embodiment, shown in FIG. 12. According to the control-valve control program, at Steps S101, S102, S103, S104, and S105, the brake ECU 250 judges whether the selected mode or modes is or include Mode F, whether the selected mode or modes is or include Mode G, whether the selected mode is Mode H, whether the selected mode is Mode I, and whether the selected mode is Mode J, respectively. If a positive judgment is made at Step S101, the control goes to Step S106 to judge whether the selected mode or modes is or include Mode G.

According to the selected mode or modes, the respective electric currents supplied to the solenoid-operated control valves are controlled at Steps S107, S108, S109, S110, S111, and S112, as shown in the table of FIG. 18.

In the mode selection program, first, at Step S151, the brake ECU 250 judges whether the present hydraulic brake apparatus is normal (e.g., whether the present hydraulic brake apparatus can electrically control the hydraulic braking force) and, if a positive judgment is made at Step S151, the control goes to Step S152 to judge whether the brake pedal 90 is being operated.

If a positive judgment is made at Step S152, the control goes to Step S163 to judge whether the present vehicle is in a stopped state. If a negative judgment is made at Step S163, the control goes to Step S154 to judge whether the vehicle is under an anti-block (anti-lock) control. If a negative judgment is made at Step S154, the control goes to Step S155 to judge whether a quick response of the present hydraulic brake apparatus is required. If a negative judgment is made at Step S155, the control goes to Step S156 to judge whether an air-detection flag is set at an ON state.

At Step S153, the brake ECU 250 judges whether a running speed of the vehicle detected by the vehicle speed sensor 420 is not higher than a reference speed at which the vehicle can be regarded as being stopped and, if the detected vehicle speed is higher than the reference speed, judges that the vehicle is in the stopped state.

At Step S154, the brake ECU 250 judges whether an anti-block-control flag is set at an ON state and, if a positive judgment is made, judges that the vehicle is under the anti-block control. The anti-block control is performed according to an anti-block control program More specifically described, the brake ECU 250 detects, based on a speed detected by each of the four wheel-speed sensors 422, a slipping state of a corresponding one of the four wheels 10, 12, 56, 58 and, if an anti-block-control starting condition is met, for example, if an amount of slipping of the each wheel exceeds a reference value, the brake ECU 250 sets the anti-block-control flag to the ON state. Under the anti-block control the brake ECU 250 controls a corresponding one of the four pressure-increase control valves 172 through 178 and/or a corresponding one of the four pressure-decrease control valves 192 through 198, independent of the other pressure-increase control valves and the other pressure-decrease control valves, so as to control the hydraulic pressure in a corresponding one of the brake cylinders 52, 54, 60, 62 and thereby bring the each wheel into an appropriate slipping state. If an anti-block-control ending condition is met, for example, if the vehicle has been stopped, or if the slipping amount has sufficiently decreased, the brake ECU 250 resets the anti-block flag to an OFF state, and thereby ends the anti-block control.

At Step S155, the brake ECU 250 judges that the quick response is required, for example, if an increasing speed of the operating stroke of the brake pedal 90 is higher than a reference speed, if an increasing speed of the operating or depressing force applied to the brake pedal 90 is higher than a reference speed (the depressing force may be directly detected by an operating-force sensor, or may be indirectly detected by detecting the hydraulic pressure in the master cylinder 80), or if the actual brake-cylinder hydraulic pressure corresponding to the each wheel differs from a target hydraulic pressure by more than a reference amount (or if an actual deceleration differs from a target deceleration by more than a reference amount).

At Step S156, the brake ECU 250 judges whether the air-detection flag is set at the ON state. If an air detection program, not shown, is implemented and it is judged that there is air in the hydraulic systems, the air-detection flag is set at the ON state. For example, if an actual operating stroke of the brake pedal 90 relative to the actual brake-cylinder hydraulic pressures is larger than a reference operating stroke of the brake pedal 90 according to a predetermined relationship between operating stroke of the brake pedal 90 and brake-cylinder hydraulic pressure, it can be judged that there is air, because a larger amount of hydraulic liquid needs to be consumed to increase the brake-cylinder hydraulic pressures up to a certain value in the case where there is air than in the case where there is no air. The presence or absence of air may be detected by utilizing the hydraulic liquid accumulated in the accumulator 74 In addition, it is possible to detect whether there is air, with respect to each of the brake cylinders 52, 54, 60, 62.

If a negative judgment is made at each of Steps S153, S154, S155, and S156, the control goes to Step S157 to select Mode F.

In Mode F, the regeneration cooperative control can be performed like in Mode A employed in the first embodiment. However, in the case where the regeneration cooperative control is not performed, the actual brake-cylinder hydraulic pressures may be controlled to a value corresponding to the current operation state of the brake pedal 90, or the actual deceleration of the vehicle may be controlled to a target deceleration corresponding to the current operation state of the brake pedal 90. In the latter cases, the four pressure-increase control valves 172 through 178 are kept open, and the four pressure-decrease control valves 192 through 198 are kept closed, so that the respective hydraulic pressures in the four brake cylinders 52, 54, 60, 62 are controlled to a same or common hydraulic pressure. In the case where a collision preventing (or moderating) control (e.g., a braking assisting control) is performed, the respective hydraulic pressures in the four brake cylinders 52, 54, 60, 62 are controlled to a same or common hydraulic pressure.

On the other hand, in the case where a front-and-rear braking-force distributing control is performed, or in the case where a parking assisting control is performed, the four pressure-increase control valves 172 through 178 and the four pressure-decrease control valves 192 through 198 are individually controlled so as to control individually the respective hydraulic pressures in the four brake cylinders 52, 54, 60, 62.

If the air detection flag is set at the ON state, a positive judgment is made at Step S156, and the control goes to Step S158 to select Mode G.

As explained above, if there is air, the larger amount of hydraulic liquid needs to be consumed. In this case, if Mode J is selected and the brake cylinders 52, 54, 60, 62 are communicated with the master cylinder 80, the operating stroke of the brake pedal 90 needs to be increased. In contrast, if Mode G is selected and the brake cylinders 52, 54, 60, 62 are communicated with the booster chamber 96, the operating stroke of the brake pedal 90 can be prevented from being excessively increased. In addition, the amount of consumption of energy can be decreased as compared with the case where Mode F is selected.

If the quick response is required, a positive judgment is made at Step S155, and the control goes to Step S159 to select Mode F and Mode G. Thus, the brake cylinders 52, 54, 60, 62 are supplied with the hydraulic liquid from both the power pressure source 64 and the hydraulic booster 78, and the rate of increasing of the hydraulic pressures in the brake cylinders 52, 54, 60, 62 can be raised.

If the anti-block-control flag is set at the ON state, a positive judgment is made at Step S154, and the control goes to Step S160 to select Mode G. The respective hydraulic pressures in the brake cylinders 52, 54, 60, 62 are individually controlled by the individual pressure control valve devices 218, based on the hydraulic pressure in the hydraulic booster 78 provided on the upstream side of the control valve devices 218. Under the anti-block control, it is preferred that the hydraulic pressure on the upstream side of the control valve devices 218 have a value corresponding to the driver's operating force applied to the brake pedal 90. In addition, the brake cylinders 52, 54, 60, 62 do not need any hydraulic pressure values higher than the value corresponding to the operating force applied to the brake pedal 90. Thus, it is advantageous to use the hydraulic booster 78. Moreover, the amount of energy consumed can be decreased as compared with the case where Mode F is selected.

If the vehicle is in the stopped state, a positive judgment is made at Step S153, and the control goes to Step S161 to judge whether a liquid-leakage detecting operation is being performed. The liquid-leakage detecting operation is started if a predetermined liquid-leakage detecting condition is met. For, example, if the vehicle is in the stopped state, the operation state of the brake pedal 90 is stable, and the pump motor 71 is not operated, it can be judged that the liquid-leakage detecting condition is met. If a negative judgment is made at Step S161, the control goes to Step S162 to select Mode H. On the other hand, if a positive judgment is made at Step S161, the control goes to Step S163 to select Mode I.

In Mode H, the brake cylinders 52, 54 corresponding to the front left and right wheels 10, 12 are communicated with the master cylinder 80, and the brake cylinders 60, 62 corresponding to the rear left and right wheels 56, 58 are communicated with the booster chamber 96. If the vehicle is in the stopped state, it is not needed to control minutely the respective hydraulic pressures in the brake cylinders 52, 54, 60, 62, according to the operation state of the brake pedal 90. Thus, the four brake cylinders are communicated with the two pressure sources, i.e., the master cylinder 80 and the hydraulic booster 78. In Mode H, no electric currents are supplied to the respective solenoids of all the solenoid-operated control valves, and accordingly the energy consumption can be reduced.

In Mode I, the brake cylinders 52, 54 corresponding to the front left and right wheels 10, 12 are communicated with the master cylinder 80, and the brake cylinders 60, 62 corresponding to the rear left and right wheels 56, 58 are communicated with the power pressure source 64.

If a liquid leakage occurs to a rear-wheel hydraulic system corresponding to the rear wheels 56, 58, then the pressure detected by the accumulator pressure sensor 300 lowers. The liquid-leakage detecting operation is performed according to a liquid-leakage detection program represented by a flow chart shown in FIG. 26. First, at Step S199, the brake ECU 250 judges whether the vehicle is in the stopped state. Then, at Step S200, the brake ECU 250 judges whether the pump motor 71 is at rest, i.e., in a non-operation state. For example, if the hydraulic pressure in the accumulator 74 falls in a reference pressure range, then it can be judged that the pump motor 71 in the non-operation state. If a positive judgment is made at Step S200, the control goes to Step S201 to judge whether an absolute value of an amount of change, $\Delta$Pref, of a target hydraulic pressure, Pref, is not greater than a reference value, $\Delta P_S$. If a positive judgment is made at Step S201, the control goes to Step S202 to detect a hydraulic pressure in the accumulator 74, i.e., an accumulator pressure, $P_A$. Step S202 is followed by Step S203 to subtract the accumulator pressure, $P_{A(n)}$, detected at Step S202 in the current control cycle, from an accumulator pressure, $P_{A(n-1)}$, detected at Step S202 in the preceding control cycle. If the current accumulator pressure PAW has lowered from the preceding accumulator pressure $P_{A(n-1)}$ and a difference, $\Delta P_A$, of those pressure values is not greater than a reference value, $\Delta P_{AS}$, the brake ECU 250 makes a positive judgment at Step S204. Then, the control goes to Step S205 to judge that a liquid leakage has occurred to the rear-wheel hydraulic system corresponding to the rear wheels 56, 58. The rear-wheel hydraulic system includes the brake cylinders 60, 62, the liquid passages 162, 168, 182, 188, 202, 210, and the pressure-increase and pressure-decrease control valves 172, 178, 192, 198. However, it is possible to detect a leakage of the hydraulic liquid from the power-pressure passage 100 and/or the accumulator 74. In the latter case, the liquid leakage may be detected by a different method than the above-described method.

However, the occurrence of liquid leakage can be detected based on the operation state of the pump motor 71. For example, in the case where a relationship between the operation state of the pump motor 71 and the hydraulic-liquid outputting state of the pump 70 is known in advance, the occurrence of liquid leakage can be detected based on the change of the accumulator pressure relative to the outputting state of the pump 70.

However, it is not essentially required that the liquid-leakage detecting operation be performed in the state in which the vehicle is in the stopped state. That is, the liquid-leakage detecting operation may be performed in the state in which the vehicle is running.

If the brake pedal 90 is at rest, a negative judgment is made at Step S152, and the control goes to Step S164 to judge whether there is a need to operate the present hydraulic brake apparatus. For example, the brake ECU 250 judges whether any of respective flags corresponding to the traction control the vehicle stability control, the vehicular-distance control, and the collision preventing (or moderating) control is set at an ON state.

If a positive judgment is made at Step S164, the control goes to Step S165 to judge whether the flag corresponding to the traction control is set at the ON state. If a positive judgment is made at Step S165, the control goes to Step S166 to select Mode I. On the other hand, if a negative judgment is made at Step S165, the control goes to Step S167 to select Mode F.

If there is no need to operate the present hydraulic brake apparatus, a negative judgment is made at Step S164, and the control goes to Step S168 to select Mode H in which no electric currents are supplied to the respective solenoids of the solenoid-operated control valves.

The traction control is started when a driving-slip amount of each of the drive wheels 56, 58 exceeds a reference value, and the traction-control flag is set at the ON state. Thus, the hydraulic pressures in the brake cylinders 60, 62 corresponding to the drive wheels 56, 58 are controlled so that each of the drive wheels may be brought into an appropriate driving-slip state. In addition, the traction control is ended when the running speed of the vehicle exceeds a reference speed, or when the brake pedal 90 is operated, and the traction-control flag is reset to an OFF state.

It is the rear wheels 56, 58 as the drive wheels that are subjected to the traction control. Therefore, in the state in which the brake cylinders 60, 62 are shut off from the brake cylinders 52, 54, the respective hydraulic pressures in the brake cylinders 60, 62 are controlled by the linear valve device 230 based on the hydraulic pressure in the power pressure source 64. Though the brake cylinders 52, 54 corresponding to the front wheels 10, 12 are communicated with the master cylinder 80, no hydraulic pressure is present in the master cylinder 80, and accordingly the brake cylinders 52, 54 are communicated with the reservoir 75. Meanwhile, if the brake pedal 90 is operated, then a hydraulic pressure is produced in the master cylinder 80, so that the brake cylinders 52, 64 corresponding to the front wheels 10, 12 are supplied with the hydraulic pressure and the hydraulic brakes 55FL, 55FR are operated. Thus, in Mode I, the present hydraulic brake apparatus can prevent itself from delaying starting its operation, when the brake pedal 90 is operated under the traction control However, when the brake pedal 90 is operated under the traction control, it is possible to switch the booster communication control valve 222 to its closed state to its open state. In this case, the brake cylinders 60, 62 corresponding to the rear wheels 56, 58 can be supplied with the hydraulic pressure corresponding to the operating force applied to the brake pedal 90.

The vehicle stability control encompasses a spin restraining control and a drift-out restraining control. When a spin tendency of the vehicle becomes excessively high, the spin restraining control is started to increase, from zero in some cases, the respective hydraulic pressures in the two brake cylinders corresponding to an outer one of the two front wheels 10, 12 that are turning and an outer one of the two rear wheels 56, 68 that are also turning. When a drift-out tendency of the vehicle becomes excessively high, the drift-out restraining control is started to increase the respective hydraulic pressures in the two brake cylinders corresponding to an inner one of the two front wheels 10, 12 that are turning and an inner one of the two rear wheels 56, 58 that are also turning. Each of the spin restraining control and the drift-out restraining control can be performed irrespective of whether the brake pedal 90 is being operated.

Each of the above-described cruise control, the collision preventing (or moderating) control, and the parking assisting control can be performed irrespective of whether the brake pedal 90 is being operated.

When any one of the above-described controls is performed, a negative judgment is made at Step S165, and the brake ECU 250 selects, at Step S167, Mode F. When the respective hydraulic pressures in the four brake cylinders 52, 54, 60, 62 are commonly controlled, the four pressure-increase control valves 172 through 178 are open, and the four pressure-decrease control valves 192 through 198 are closed. On the other hand, when the respective hydraulic pressures in the four brake cylinders 52, 54, 60, 62 are individually controlled, the four pressure-increase control valves 172 through 178 and the four pressure-decrease control valves 192 through 198 are individually opened and/or closed If the present hydraulic brake apparatus is not normal, then a negative judgment is made at Step S151, and the control goes to Step S169 to judge whether the brake pedal 90 is being operated by the driver. If a positive judgment is made at Step S169, the control goes to Step S170 to judge whether the power system has failed, and then to Step S171 to judge whether the control system has failed.

At Step S170, the brake ECU 250 judges that the power system has failed, e.g., when the hydraulic pressure detected by the accumulator pressure sensor 300 is not higher than a reference value, or when the pump motor 71 has failed.

At Step S171, the brake ECU 250 judges that the control system has failed, e.g., when at least one of the linear control valve device 230 and the individual pressure control valve devices 218 has failed, or when the electric system has failed. Those failures are checked in the initial checking operation.

When the power system or the control system has failed, the regeneration cooperative control, or the control corresponding to the current operation state of the brake pedal 90 is ended.

If the power system has failed, i.e., if a positive judgment is made at Step S170, the control goes to Step S172 to select Mode J in which all the brake cylinders 52, 54, 60, 62 are communicated with the master cylinder 80. When the power system has failed, the hydraulic booster 78 cannot be supplied with the hydraulic liquid having a high pressure, and accordingly the booster 78 cannot produce a hydraulic pressure corresponding to the operating force applied to the brake pedal 90. In contrast, the master cylinder 80 produces a hydraulic pressure corresponding to the operating force applied to the brake pedal 90. Thus, all the brake cylinders 52, 54, 60, 62 are communicated with the master cylinder 80.

For example, in the case where a friction coefficient, μ, of a road surface on which the vehicle is running is low, and accordingly one or more (but not all) of the wheels 10, 12, 56, 58 is or are brought into a blocked (locked) state, the remaining wheel or wheels can be braked. For example, even if the front wheels 10, 12 may be brought into the blocked state, a braking force can be applied against a creep torque exerted to the rear wheels 56, 58 as the drive wheels, if the rear wheels 56, 68 are not in the blocked state. Thus, an amount of movement of the vehicle can be reduced.

When the control system has failed, no electric currents are supplied to the respective solenoids of all the solenoid operated control valves. In this case, a positive judgment is made at Step S171, and the control goes to Step S173 to select Mode H in which the two brake cylinders 52, 54 corresponding to the front left and right wheels 10, 12 are supplied with the hydraulic pressure from the master cylinder 80, and the other, two brake cylinders 60, 62 corresponding to the rear left and right wheel 56, 58 are supplied with the hydraulic pressure from the hydraulic booster 78. When the power system is normal, the booster 78 produces the hydraulic pressure corresponding to the operating force applied to the brake pedal 90. Thus, the operating stroke of the brake pedal 90 can be smaller in Mode H than in Mode J.

As is apparent from the foregoing description of the second embodiment, the booster communication control valve 222, the cylinder communication control valve 224, the pressure-increase linear control valve 232, portions of the brake ECU 250 that store and implement the mode selection program represented by the flow chart of FIG. 24, and portions of the brake ECU 250 that store and implement the control-valve control program represented by the flow chart of FIG. 15 cooperate with each other to constitute the pressure-source communication control device.

The pressure-source communication control device includes a stopped-state-related booster-and/or-cylinder communication portion that is constituted by portions of the brake ECU 250 that store and implement Steps S153, S162, S103, and S110; an anti-block-control-related booster communication portion that is constituted by portions of the brake ECU 250 that store and implement Steps S154, S160, S102, and S109; and a power-pressure-source communication portion, or a traction-control-related power-pressure-source communication portion, that is constituted by portions of the brake ECU 250 that store and implement Steps S1565 S166, S104, and S111.

The pressure-source communication control device further includes a failure-related cylinder-and/or-booster communication portion that is constituted by portions of the brake ECU 250 that store and implement Steps S110, S112, S170 through 173; and a booster-and-power-pressure-source communication portion that is constituted by portions of the brake ECU 250 that store and implement Steps S108, S155, and S159.

Figure 26:
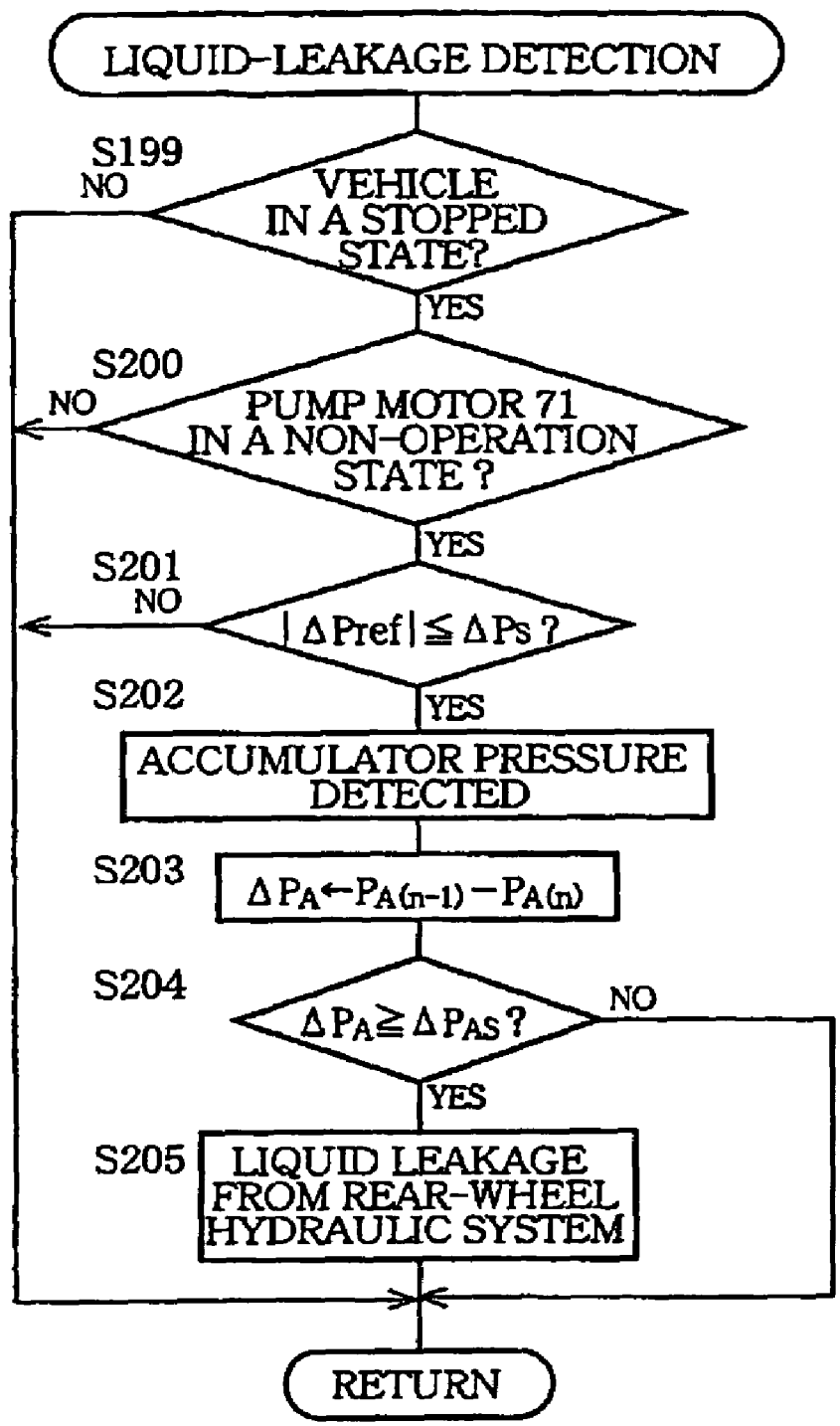
FIG. 26 is a flow chart representing a liquid-leakage detection program that is stored by the storing portion of the brake ECU.

Moreover, portions of the brake ECU 250 that store and implement Step S163 constitutes a shutting device; and portions of the brake ECU 250 that store and implement the liquid-leakage detection program represented by the flow chart of FIG. 26 constitutes a liquid-leakage detecting portion.

In each of the first and second embodiments, the hydraulic booster 78 is connected to the first hub portion 202, and the master cylinder 80 is connected to the second hub portion 204. However, it is possible to connect the master cylinder 80 to the first hub portion 202, and connect the hydraulic booster 78 to the second hub portion 204.

The electric-power storing device 36 may be of a different sort than the battery 36; such as a capacitor.

It is to be understood that the present invention may be embodied with other changes and improvements that may occur to a person skilled in the art, without departing from the spirit and scope of the invention defined in the appended claims.

What is claimed is:

1. A hydraulic brake apparatus for use in a vehicle having a plurality of wheels and a brake operating member manually operable by a driver of the vehicle, the apparatus comprising:
a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;
a power pressure source including at least a pumping device which produces, by utilizing a power, a third hydraulic pressure irrespective of whether the brake operating member is operated by the driver;
a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;
a hub portion which is connected to each of the respective brake cylinders of the hydraulic brakes and to which the hydraulic booster, the master cylinder, and the power pressure source are connected in parallel with each other; and
a pressure-source communication control device which selectively allows at least one of the hydraulic booster, the master cylinder, and the power pressure source to communicate with the hub portion,
wherein the power pressure source comprises a hydraulic-pressure control valve device which is provided between the pumping device and the hub portion and is connected to each of the pumping device and the hub portion, which includes at least one linear valve having a solenoid, and which can continuously control a pressure difference across itself, to a continuously changeable value corresponding to a continuously changeable electric current supplied to the solenoid, and
wherein the hydraulic brake apparatus further comprises a hydraulic-pressure-control-valve-device control portion which continuously controls the electric current supplied to the solenoid and thereby controls the hydraulic-pressure control valve device, so as to control a hydraulic pressure in the hub portion,
wherein the hydraulic pressure-control-valve-device control portion controls said at least one linear valve of the hydraulic-pressure control valve device to control the hydraulic pressure in the hub portion to a target value corresponding to a current condition of the vehicle.

2. The hydraulic brake apparatus according to claim 1, wherein the pressure-source communication control device comprises a mechanical booster-and-cylinder communication portion which mechanically shuts off the power pressure source from the hub portion and mechanically allows each of the hydraulic booster and the master cylinder to communicate with the hub portion.

3. The hydraulic brake apparatus according to claim 1, wherein the pressure-source communication control device comprises a booster-and/or-cylinder communication portion which, when the hydraulic brake apparatus has failed, shuts off at least the power pressure source from the hub portion and allows at least one of the hydraulic booster and the master cylinder to communicate with the hub portion.

4. The hydraulic brake apparatus according to claim 1, wherein the pressure-source communication control device comprises a failure-related booster-and/or-cylinder communication portion which, when the hydraulic pressure in at least one of the brake cylinders is not electrically controllable, shuts off at least the power pressure source from the hub portion and allows at least one of the hydraulic booster and the master cylinder to communicate with the hub portion.

5. The hydraulic brake apparatus according to claim 1, wherein the pressure-source communication control device comprises a non-control-related booster-and/or-cylinder communication portion which, when the respective hydraulic pressures in the brake cylinders are not electrically controlled, shuts off at least the power pressure source from the hub portion and allows at least one of the hydraulic booster and the master cylinder to communicate with the hub portion.

6. The hydraulic brake apparatus according to claim 1, wherein the pressure-source communication control device comprises a stopped-state-related booster-and/or-cylinder communication portion which, when the vehicle is in a stopped state, shuts off at least the power pressure source from the hub portion and allows at least one of the hydraulic booster and the master cylinder to communicate with the hub portion.

7. The hydraulic brake apparatus according to claim 1, wherein the pressure-source communication control device comprises a failure-related cylinder communication portion which, when the power pressure source has failed to produce the third hydraulic pressure, shuts off the hydraulic booster and the power pressure source from the hub portion and allows the master cylinder to communicate with the hub portion.

8. The hydraulic brake apparatus according to claim 1, wherein the pressure-source communication control device comprises a cylinder-and/or-power-pressure-source communication portion which, when the hydraulic booster has mechanically failed, shuts off at least the hydraulic booster from the hub portion and allows at least one of the master cylinder and the power pressure source to communicate with the hub portion.

9. The hydraulic brake apparatus according to claim 1, further comprising:
a communication device which receives information sent from an external device; and
an information-dependent hydraulic-pressure control device which controls, based on the information received by the communication device, the hydraulic pressure in each of the brake cylinders by utilizing the third hydraulic pressure produced by the power pressure source,
wherein the pressure-source communication control device comprises a booster-and/or-power-pressure-source communication portion which, when the communication device has failed to normally receive the information, shuts off at least the master cylinder from the hub portion and allows at least one of the hydraulic booster and the power pressure source to communicate with the hub portion.

10. The hydraulic brake apparatus according to claim 1, wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel,
wherein the hydraulic brake apparatus further comprises:
a communication device which receives, from the regenerative-braking-force control device, information representing an actual regenerative braking force applied to said at least one drive wheel; and
a regeneration cooperative control device which controls, based on the actual regenerative braking force represented by the information received by the communication device, the hydraulic pressure in at least one of the brake cylinders that corresponds to said at least one drive wheel, so that a total braking force including the regenerative braking force and the hydraulic braking force that are applied to said at least one drive wheel may be equal to a required braking force corresponding to a current operation state of the brake operating member, and
wherein the pressure-source communication control device comprises a failure-related booster-and/or-power-pressure-source communication portion which, when the regenerative-braking-force control device has failed, shuts off at least the master cylinder from the hub portion and allows at least one of the hydraulic booster and the power pressure source to communicate with the hub portion.

11. The hydraulic brake apparatus according to claim 1, wherein the pressure-source communication control device comprises a booster-and-power-pressure-source communication portion which, when a quick response of the hydraulic brakes is being required, shuts off the master cylinder from the hub portion and allows each of the hydraulic booster and the power pressure source to communicate with the hub portion.

12. The hydraulic brake apparatus according to claim 1, wherein the pressure-source communication control device comprises an anti-block-control-related booster communication portion which, when an anti-block control is being performed, shuts off the master cylinder and the power pressure source from the hub portion and allows the hydraulic booster to communicate with the hub portion.

13. The hydraulic brake apparatus according to claim 1, wherein the pressure-source communication control device comprises an air-detection-related booster communication portion which, when an air has been detected, shuts off the master cylinder and the power pressure source from the hub portion and allows the hydraulic booster to communicate with the hub portion.

14. The hydraulic brake apparatus according to claim 1, wherein the pressure-source communication control device comprises a traction-control-related power-pressure-source communication portion which, when a traction control is being performed, allows each of (a) at least one of the hydraulic booster and the master cylinder, and (b) the power pressure source to communicate with the hub portion.

15. The hydraulic brake apparatus according to claim 1, further comprising at least one of (a) an operation-state detecting device which detects a value representing an operation state of the brake operating member, (b) a cylinder-pressure sensor which detects a value representing the second hydraulic pressure produced by the master cylinder, and (c) a power-pressure sensor which detects a value representing the third hydraulic pressure produced by the power pressure source, and wherein the pressure-source communication control device comprises a failure detecting portion which detects a failure of the hydraulic brake apparatus based on the value detected by said at least one of (a) the operation-state detecting device, (b) the cylinder-pressure sensor, and (c) the power-pressure sensor.

16. The hydraulic brake apparatus according to claim 1, further comprising:

a plurality of individual pressure control valve devices each of which controls the hydraulic pressure in at least one of the brake cylinders that corresponds to said each individual pressure control valve device; and a brake-cylinder communication control device which selectively controls at least one of the individual pressure control valve devices so as to allow at least one of the brake cylinders that corresponds to said at least one individual pressure control valve device, to communicate with the hub portion.

17. The hydraulic brake apparatus according to claim 1, wherein the hub portion includes a first hub section and a second hub section, and a separating device which is provided between the first and second hub sections and which is selectively switchable to a first operation state thereof in which the separating device allows the first and second hub sections to communicate with each other, and a second operation state thereof in which the separating device shuts off the first and second hub sections from each other.

18. The hydraulic brake apparatus according to claim 17, wherein the brake cylinders include a first cylinder group including at least one first-group brake cylinder that is connected to the first hub section, and a second cylinder group including at least one second-group brake cylinder that is connected to the second hub section.

19. The hydraulic brake apparatus according to claim 17, wherein two pressure sources of three pressure sources consisting of the hydraulic booster, the master cylinder, and the power pressure source are connected to the first hub section, and an other pressure source of the three pressure sources is connected to the second hub section.

20. The hydraulic brake apparatus according to claim 17, further comprising:

a plurality of individual pressure control valve devices each of which controls the hydraulic pressure in at least one of the brake cylinders that corresponds to said each individual pressure control valve device; and a brake-cylinder communication control device which controls the separating device and controls at least one of the individual pressure control valve devices, so as to selectively allow at least one of the brake cylinders that corresponds to said at least one individual pressure control valve device, to communicate with said at least one of the hydraulic booster, the master cylinder, and the power pressure source.

21. The hydraulic brake apparatus according to claim 20, wherein the brake cylinders include a first cylinder group including at least one first-group brake cylinder that is connected to the first hub section, and a second cylinder group including at least one second-group brake cylinder that is connected to the second hub section, wherein two pressure sources of three pressure sources consisting of the hydraulic booster, the master cylinder, and the power pressure source are connected to the first hub section, and an other pressure source of the three pressure sources is connected to the second hub section, wherein the pressure-source communication control device comprises a one-pressure-source communication portion which shuts off the two pressure sources from the first hub section and allows the other pressure source to communicate with the second hub section, and wherein the brake-cylinder communication control device comprises a cross communication portion which switches the separating device to the first operation state thereof to allow the first and second hub sections to communicate with each other, and controls at least one of the individual pressure control valve devices that corresponds to said at least one first-group brake cylinder, to allow said at least one first-group brake cylinder to communicate with the first hub section, and thereby allow said at least one first-group brake cylinder to communicate with the other pressure source connected to the second hub portion.

22. The hydraulic brake apparatus according to claim 20, wherein the brake cylinders include a first, a second, a third, and a fourth brake cylinder corresponding to a front left, a front right, a rear left, and a rear right wheel of the vehicle, respectively, wherein the first and fourth brake cylinders are connected to the first hub section, and the second and third brake cylinders are connected to the second hub section, wherein the pressure-source communication control device comprises a cylinder communication portion which shuts off the hydraulic booster and the power pressure source from the hub portion and allows the master cylinder to communicate with the hub portion, and wherein the brake-cylinder communication control device comprises a front-left-and-right-wheel-brake-cylinder communication portion which switches the separating device to the first operation state thereof to allow the first and second hub sections to communicate with each other, and controls the individual pressure control valve devices to shut off the third and fourth brake cylinders from the second and first hub sections, respectively, and allow the first and second brake cylinders to communicate with the first and second hub sections, respectively, and thereby shut off the third and fourth brake cylinders from the master cylinder and allow the first and second brake cylinders to communicate with the master cylinder.

23. The hydraulic brake apparatus according to claim 17, wherein the master cylinder is connected to one of the first hub section and the second hub section, and the hydraulic booster is connected to an other of the first and second hub sections.

24. The hydraulic brake apparatus according to claim 17, wherein the hydraulic booster and the power pressure source are connected to the first hub section, and the master cylinder is connected to the second hub section.

25. The hydraulic brake apparatus according to claim 17, wherein the brake cylinders include four brake cylinders consisting a first, a second, a third, and a fourth brake cylinder corresponding to a front left, a front right, a rear left, and a rear right wheel of the vehicle, respectively, wherein the first and second brake cylinders are connected to one of the first hub section and the second hub section, and the third and fourth brake cylinders are connected to an other of the first and second hub sections, wherein the pressure-source communication control device comprises a cylinder-and-power-pressure-source communication portion which allows the master cylinder and the power pressure source to communicate with different ones of the first and second hub sections, respectively, and wherein the hydraulic brake apparatus further comprises:
  a shutting-off device which controls the separating device to the second operation state thereof to shut off the first and second hub sections from each other;
  a power-pressure sensor which detects a value representing the third hydraulic pressure produced by the power pressure source; and
  a liquid-leakage detecting portion which detects, based on the value detected by the power-pressure sensor, whether a hydraulic liquid has leaked from at least one hydraulic system connected to the two brake cylinders connected to the power pressure source.

26. The hydraulic brake apparatus according to claim 17, wherein the brake cylinders include two drive-wheel brake cylinders corresponding to two drive wheels of the vehicle, respectively, and two non-drive-wheel brake cylinders corresponding to two non-drive wheels of the vehicle, respectively, wherein the drive-wheel brake cylinders are connected to the first hub section and the non-drive-wheel brake cylinders are connected to the second hub section, wherein the pressure-source communication control device comprises a traction-control-related cylinder-and-power-pressure-source communication portion which, when a traction control is being performed, allows the power pressure source to communicate with the first hub section and allows the master cylinder to communicate with the second hub section.

27. The hydraulic brake apparatus according to claim 17, wherein the hub portion includes a liquid passage to which the hydraulic booster, the master cylinder, and the power pressure source are connected, and which is connected to the brake cylinders, wherein the separating device is provided in the liquid passage and separates the liquid passage into two portions as the first and second hub sections.

28. The hydraulic brake apparatus according to claim 18, wherein the brake cylinders include a first, a second, a third, and a fourth brake cylinder corresponding to a front left, a front right, a rear left, and a rear right wheel of the vehicle, respectively, wherein one of the first and second cylinder groups includes the first and fourth brake cylinders, and an other of the first and second cylinder groups includes the second and third brake cylinders.

29. The hydraulic brake apparatus according to claim 18, wherein the brake cylinders include a first, a second, a third, and a fourth brake cylinder corresponding to a front left, a front right, a rear left, and a rear right wheel of the vehicle, respectively, wherein one of the first and second cylinder groups includes the first and second brake cylinders, and an other of the first and second cylinder groups includes the third and fourth brake cylinders.

30. The hydraulic brake apparatus according to claim 1, further comprising:
  a plurality of individual pressure control valve devices each of which includes a pressure-increase control valve provided between the hub portion and at least one of the brake cylinders that corresponds to said each individual pressure control valve device, and additionally includes a pressure-decrease control valve provided between said at least one brake cylinder and a reservoir which reserves a hydraulic liquid, and each of which controls the hydraulic pressure in said at least one brake cylinder, and wherein each of the respective pressure-increase valves of the individual pressure control valve devices comprises a normally open solenoid-operated control valve.

31. The hydraulic brake apparatus according to claim 1, further comprising:
  a plurality of individual pressure control valve devices each of which controls the hydraulic pressure in at least one of the brake cylinders that corresponds to said each individual pressure control valve device; and
  an individual-pressure-control-valve-device-control hydraulic-pressure control device which controls said each individual pressure control valve device so that the hydraulic pressure in said at least one brake cylinder may take a value corresponding to a current condition of the vehicle.

32. The hydraulic brake apparatus according to claim 1, wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel,
  wherein the hydraulic brake apparatus further comprises:
    a communication device which receives, from the regenerative-braking-force control device, information representing an actual regenerative braking force applied to said at least one drive wheel; and
    a regeneration cooperative control device which controls, based on the actual regenerative braking force represented by the information received by the communication device, the hydraulic pressure in at least one of the brake cylinders that corresponds to said at least one drive wheel, so that a total braking force including the regenerative braking force and the hydraulic braking force that are applied to said at least one drive wheel may be equal to a required braking force corresponding to a current operation state of the brake operating member.

33. The hydraulic brake apparatus according to claim 20, wherein the pressure-source communication control device comprises a power-pressure-source communication portion which shuts off the hydraulic booster and the master cylinder from the hub portion and allows the power pressure source to communicate with the hub portion, and wherein the brake-cylinder communication control device comprises an each-brake-cylinder communication portion which switches the separating device to the first operation state thereof to allow the first and second hub sections to communicate with each other, and controls the individual pressure control valve devices to allow each of the brake cylinders to communicate with the hub portion.

34. The hydraulic brake apparatus according to claim 1, wherein the hydraulic-pressure-control-valve-device control portion comprises at least one of (a) a first control portion which controls the hydraulic-pressure control valve device based on a requested hydraulic pressure determined under a regeneration cooperative control and (b) a second control portion which controls the hydraulic-pressure control valve device based on a requested hydraulic pressure determined based on an operation state of the brake operating member by the driver.

35. The hydraulic brake apparatus according to claim 1, wherein the hydraulic-pressure-control-valve-device control portion comprises at least one of (c) a third control portion which controls the hydraulic-pressure control valve device based on a requested hydraulic pressure determined under a traction control, (d) a fourth control portion which controls the hydraulic-pressure control valve device based on a requested hydraulic pressure determined under a vehicle stability control, (e) a fifth control portion which controls the hydraulic-pressure control valve device based on a requested hydraulic pressure determined under a vehicular-distance control, (f) a sixth control portion which controls the hydraulic-pressure control valve device based on a requested hydraulic pressure determined under a collision preventing or moderating control, and (g) a seventh control portion which controls the hydraulic-pressure control valve device based on a requested hydraulic pressure determined under a parking assisting control.

36. The hydraulic brake apparatus according to claim 1, wherein a number of the pumping device of the power pressure source is one.

37. A hydraulic brake apparatus for use in a vehicle having a plurality of wheels and a brake operating member manually operable by a driver of the vehicle, the apparatus comprising:
- a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;
- a power pressure source which produces, by utilizing a power, a third hydraulic pressure irrespective of whether the brake operating member is operated by the driver;
- a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;
- a hub portion which is connected to each of the respective brake cylinders of the hydraulic brakes and to which the hydraulic booster, the master cylinder, and the power pressure source are connected in parallel with each other;
- a pressure-source communication control device which selectively allows at least one of the hydraulic booster, the master cylinder, and the power pressure source to communicate with the hub portion;
- a communication device which receives information sent from an external device; and
- an information-dependent hydraulic-pressure control device which controls, based on the information received by the communication device, the hydraulic pressure in each of the brake cylinders by utilizing the third hydraulic pressure produced by the power pressure source,
- wherein the pressure-source communication control device comprises a booster-and/or-power-pressure-source communication portion which, when the communication device has failed to normally receive the information, shuts off at least the master cylinder from the hub portion and allows at least one of the hydraulic booster and the power pressure source to communicate with the hub portion.

38. A hydraulic brake apparatus for use in a vehicle having a plurality of wheels and a brake operating member manually operable by a driver of the vehicle, the apparatus comprising:
- a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;
- a power pressure source which produces, by utilizing a power, a third hydraulic pressure irrespective of whether the brake operating member is operated by the driver;
- a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;
- a hub portion which is connected to each of the respective brake cylinders of the hydraulic brakes and to which the hydraulic booster, the master cylinder, and the power pressure source are connected in parallel with each other; and
- a pressure-source communication control device which selectively allows at least one of the hydraulic booster, the master cylinder, and the power pressure source to communicate with the hub portion,
- wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel,
- wherein the hydraulic brake apparatus further comprises: a communication device which receives, from the regenerative-braking-force control device, information representing an actual regenerative braking force applied to said at least one drive wheel; and
- a regeneration cooperative control device which controls, based on the actual regenerative braking force represented by the information received by the communication device, the hydraulic pressure in at least one of the brake cylinders that corresponds to said at least one drive wheel, so that a total braking force including the regenerative braking force and the hydraulic braking force that are applied to said at least one drive wheel may be equal to a required braking force corresponding to a current operation state of the brake operating member, and
- wherein the pressure-source communication control device comprises a failure-related booster-and/or-power-pressure-source communication portion which, when the regenerative-braking-force control device has failed, shuts off at least the master cylinder from the hub portion and allows at least one of the hydraulic booster and the power pressure source to communicate with the hub portion.

39. A hydraulic brake apparatus for use in a vehicle having a plurality of wheels and a brake operating member manually operable by a driver of the vehicle, the apparatus comprising:
- a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;
- a power pressure source which produces, by utilizing a power, a third hydraulic pressure irrespective of whether the brake operating member is operated by the driver;
- a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion which is connected to each of the respective brake cylinders of the hydraulic brakes and to which the hydraulic booster, the master cylinder, and the power pressure source are connected in parallel with each other; and a pressure-source communication control device which selectively allows at least one of the hydraulic booster, the master cylinder, and the power pressure source to communicate with the hub portion, wherein the pressure-source communication control device comprises a booster-and-power-pressure-source communication portion which, when a quick response of the hydraulic brakes is being required, shuts off the master cylinder from the hub portion and allows each of the hydraulic booster and the power pressure source to communicate with the hub portion.

40. A hydraulic brake apparatus for use in a vehicle having a plurality of wheels and a brake operating member manually operable by a driver of the vehicle, the apparatus comprising:

a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;

a power pressure source which produces, by utilizing a power, a third hydraulic pressure irrespective of whether the brake operating member is operated by the driver;

a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion which is connected to each of the respective brake cylinders of the hydraulic brakes and to which the hydraulic booster, the master cylinder, and the power pressure source are connected in parallel with each other; and a pressure-source communication control device which selectively allows at least one of the hydraulic booster, the master cylinder, and the power pressure source to communicate with the hub portion, wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel, wherein the hydraulic brake apparatus further comprises:

a communication device which receives, from the regenerative-braking-force control device, information representing an actual regenerative braking force applied to said at least one drive wheel; and a regeneration cooperative control device which controls, based on the actual regenerative braking force represented by the information received by the communication device, the hydraulic pressure in at least one of the brake cylinders that corresponds to said at least one drive wheel, so that a total braking force including the regenerative braking force and the hydraulic braking force that are applied to said at least one drive wheel may be equal to a required braking force corresponding to a current operation state of the brake operating member.

41. The hydraulic brake apparatus according to claim 40, wherein the power pressure source comprises an output-pressure control device which controls the third hydraulic pressure as an output hydraulic pressure of the power pressure source, and wherein the regeneration cooperative control device comprises a control portion which controls, based on the actual regenerative braking force, the output-pressure control device so as to control the output hydraulic pressure of the power pressure source.

42. A hydraulic brake apparatus for use in a vehicle having a plurality of wheels and a brake operating member manually operable by a driver of the vehicle, the apparatus comprising:

a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;

a power pressure source which produces, by utilizing a power, a third hydraulic pressure irrespective of whether the brake operating member is operated by the driver;

a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion which is connected to each of the respective brake cylinders of the hydraulic brakes and to which the hydraulic booster, the master cylinder, and the power pressure source are connected in parallel with each other; and a pressure-source communication control device which selectively allows at least one of the hydraulic booster, the master cylinder, and the power pressure source to communicate with the hub portion, wherein the power pressure source comprises an output-pressure control device which controls the third hydraulic pressure as an output hydraulic pressure of the power pressure source, wherein when the output-pressure control device is normal, the pressure-source communication control device allows the power pressure source to communicate with the hub portion, and the output-pressure control device controls the output hydraulic pressure of the power pressure source so as to control a hydraulic pressure in the hub portion and, when the output-pressure control device has failed, the pressure-source communication control device shuts off the power pressure source and the master cylinder from the hub portion and allows the hydraulic booster to communicate with the hub portion.

43. A hydraulic brake apparatus for use in a vehicle having a plurality of wheels and a brake operating member manually operable by a driver of the vehicle, the apparatus comprising:

a manual pressure source including (a) a hydraulic booster which boosts an operating force applied by the driver to the brake operating member and produces a first hydraulic pressure corresponding to the boosted operating force, and (b) a master cylinder which produces a second hydraulic pressure corresponding to the boosted operating force as an output of the hydraulic booster;

a power pressure source which produces, by utilizing a power, a third hydraulic pressure irrespective of whether the brake operating member is operated by the driver;

a plurality of hydraulic brakes which are provided in association with the plurality of wheels, respectively, and include respective brake cylinders, and each of which, upon supplying of a hydraulic pressure to a corresponding one of the brake cylinders, applies a hydraulic braking force to a corresponding one of the wheels;

a hub portion which is connected to each of the respective brake cylinders of the hydraulic brakes and to which the hydraulic booster, the master cylinder, and the power pressure source are connected in parallel with each other; and a pressure-source communication control device which selectively allows at least one of the hydraulic booster, the master cylinder, and the power pressure source to communicate with the hub portion, wherein the power pressure source comprises an output-pressure control device which controls the third hydraulic pressure as an output hydraulic pressure of the power pressure source, wherein the vehicle has a regenerative braking device which applies, owing to regenerative braking of an electric motor connected to at least one drive wheel of the wheels, a regenerative braking force to said at least one drive wheel; and a regenerative-braking-force control device which controls the regenerative braking force applied to said at least one drive wheel, wherein the hydraulic brake apparatus further comprises: a communication device which receives, from the regenerative-braking-force control device, information representing an actual regenerative braking force applied to said at least one drive wheel; and a regeneration cooperative control device which controls, based on the actual regenerative braking force represented by the information received by the communication device, the hydraulic pressure in at least one of the brake cylinders that corresponds to said at least one drive wheel, so that a total braking force including the regenerative braking force and the hydraulic braking force that are applied to said at least one drive wheel may be equal to a required braking force corresponding to a current operation state of the brake operating member, wherein when the regeneration cooperative control device is normal, the pressure-source communication control device allows the power pressure source to communicate with the hub portion, and the output-pressure control device controls the output hydraulic pressure of the power pressure source so as to control a hydraulic pressure in the hub portion and, when the regeneration cooperative control device has failed, the pressure-source communication control device shuts off the power pressure source and the master cylinder from the hub portion, and allows the hydraulic booster to communicate with the hub portion.

* * * * *